US011792833B2

(12) United States Patent
Hormis et al.

(10) Patent No.: US 11,792,833 B2
(45) Date of Patent: Oct. 17, 2023

(54) ANALOG PHASED-ARRAY REPEATERS WITH DIGITALLY-ASSISTED FREQUENCY TRANSLATION AND PHASE ADJUSTMENT

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/857,009

(22) Filed: Apr. 23, 2020

(65) Prior Publication Data

US 2020/0367257 A1     Nov. 19, 2020

Related U.S. Application Data

(60) Provisional application No. 62/847,676, filed on May 14, 2019.

(51) Int. Cl.
*H04W 72/541*     (2023.01)
*H04B 7/155*      (2006.01)
(Continued)

(52) U.S. Cl.
CPC ......... *H04W 72/541* (2023.01); *H04B 7/155* (2013.01); *H04L 7/0331* (2013.01); *H04L 25/0202* (2013.01); *H04W 72/0453* (2013.01)

(58) Field of Classification Search
CPC ............. H04W 72/082; H04W 72/541; H04W 72/0453; H04B 7/155; H04L 7/0331; H04L 25/0202
See application file for complete search history.

(56) References Cited

U.S. PATENT DOCUMENTS 5,852,629 A     12/1998  Iwamatsu
7,200,134 B2    4/2007   Proctor, Jr. et al.
(Continued)

FOREIGN PATENT DOCUMENTS

CN       1578168 A      2/2005
CN     101489153 A      7/2009
(Continued)

OTHER PUBLICATIONS

Partial International Search Report—PCT/US2020/029754—ISA/EPO—dated Jul. 20, 2020.
(Continued)

*Primary Examiner* — Abdeltif Ajid
(74) *Attorney, Agent, or Firm* — Holland & Hart LLP / QUALCOMM Incorporated

(57) ABSTRACT

Methods, systems, and devices for wireless communications are described. A repeater may apply a frequency translation and a phase rotation adjustment to a transmitted signal to avoid radio frequency interference. For instance, wireless repeater may receive a signal from a first device on a first carrier frequency. The wireless repeater may identify one or more interfering signals affecting the reception or transmission of the signal. The wireless repeater may then perform a frequency translation from the first carrier frequency to the second carrier frequency, and may also apply a phase rotation adjustment corresponding to the frequency translation. The wireless repeater may retransmit the signal including the phase rotation adjustment over the second carrier frequency to a second device in the wireless network.

74 Claims, 26 Drawing Sheets

(51) Int. Cl.
*H04L 25/02* (2006.01)
*H04L 7/033* (2006.01)
*H04W 72/0453* (2023.01)

(56) References Cited

U.S. PATENT DOCUMENTS

| | | | |
|---|---|---|---|
| 8,244,175 B2 | 8/2012 | Rofougaran |
| 8,254,304 B2 | 8/2012 | Carmel |
| 8,295,371 B2 | 10/2012 | Rick et al. |
| 8,489,019 B2 | 7/2013 | Rofougaran |
| 8,514,970 B2 | 8/2013 | Imamura et al. |
| 8,638,867 B2 | 1/2014 | Roman et al. |
| 8,750,789 B2 | 6/2014 | Baldemair et al. |
| 9,002,260 B2 | 4/2015 | Martin |
| 9,014,622 B2 | 4/2015 | Rofougaran |
| 9,253,662 B1 | 2/2016 | Marupaduga et al. |
| 9,503,134 B2 | 11/2016 | Sadek |
| 9,692,489 B1 | 6/2017 | Rofougaran et al. |
| 10,608,678 B1 | 3/2020 | Hormis et al. |
| 2006/0019604 A1 | 1/2006 | Hasarchi |
| 2006/0133527 A1 | 6/2006 | Yu et al. |
| 2007/0224953 A1 | 9/2007 | Nakagawa et al. |
| 2009/0086796 A1 | 4/2009 | Rofougaran |
| 2010/0266077 A1 | 10/2010 | Li et al. |
| 2013/0083828 A1* | 4/2013 | Rofougaran ....... H04B 7/15542 375/211 |
| 2014/0177607 A1 | 6/2014 | Li et al. |
| 2015/0236777 A1* | 8/2015 | Akhtar ................ H04W 48/20 455/438 |
| 2016/0057708 A1 | 2/2016 | Siomina et al. |
| 2016/0241426 A1 | 8/2016 | Opitz |
| 2016/0248451 A1 | 8/2016 | Weissman et al. |
| 2016/0269219 A1* | 9/2016 | Wang ................ H04L 27/2621 |
| 2018/0352444 A1 | 12/2018 | Sridharan et al. |
| 2019/0059056 A1 | 2/2019 | Islam et al. |
| 2020/0195310 A1 | 6/2020 | Abedini et al. |
| 2020/0280127 A1 | 9/2020 | Hormis et al. |
| 2020/0280355 A1 | 9/2020 | Abedini et al. |
| 2020/0280365 A1 | 9/2020 | Abedini et al. |
| 2020/0280887 A1 | 9/2020 | Abedini et al. |
| 2020/0295914 A1 | 9/2020 | Hormis et al. |
| 2020/0314601 A1 | 10/2020 | Hormis et al. |
| 2020/0322037 A1 | 10/2020 | Abedini et al. |
| 2020/0336168 A1 | 10/2020 | Hormis et al. |
| 2020/0382208 A1 | 12/2020 | Hormis et al. |
| 2020/0403689 A1* | 12/2020 | Rofougaran ........ H04W 52/245 |
| 2021/0036764 A1 | 2/2021 | Li et al. |
| 2021/0037457 A1 | 2/2021 | Li et al. |
| 2021/0037459 A1 | 2/2021 | Li et al. |
| 2021/0037460 A1 | 2/2021 | Li et al. |
| 2021/0037574 A1 | 2/2021 | Li et al. |
| 2021/0044412 A1 | 2/2021 | Li et al. |
| 2022/0085951 A1* | 3/2022 | Lee .......................... H04L 1/18 |

FOREIGN PATENT DOCUMENTS

| | | |
|---|---|---|
| CN | 103688479 A | 3/2014 |
| CN | 104811412 A | 7/2015 |
| CN | 105721008 A | 6/2016 |
| WO | WO-2008009007 A2 | 1/2008 |
| WO | WO-2010068919 A2 | 6/2010 |
| WO | WO-2015021481 A2 | 2/2015 |
| WO | WO-2015157190 A1 | 10/2015 |

OTHER PUBLICATIONS

International Search Report and Written Opinion—PCT/US2020/0297546—ISA/EPO—dated Sep. 28, 2020.

* cited by examiner

ANALOG PHASED-ARRAY REPEATERS WITH DIGITALLY-ASSISTED FREQUENCY TRANSLATION AND PHASE ADJUSTMENT

CROSS REFERENCE

The present application for patent claims the benefit of U.S. Provisional Patent Application No. 62/847,676 by Hormis et al., entitled "ANALOG PHASED-ARRAY REPEATERS WITH DIGITALLY-ASSISTED FREQUENCY TRANSLATION AND PHASE ADJUSTMENT," filed May 14, 2019, assigned to the assignee hereof, and expressly incorporated by reference in its entirety herein.

FIELD OF TECHNOLOGY

The following relates generally to wireless communications and more specifically to frequency translation and phase adjustment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications is described. The method may include receiving, at a first antenna array of a first device (e.g., a repeating device, a repeater), a signal at a first carrier frequency from a second device in a wireless network and identifying one or more interfering signals affecting at least one of the first antenna array or a second antenna array of the first device. In some examples, the method may include performing a frequency translation of the received signal from the first carrier frequency to a second carrier frequency based on the one or more interfering signals. The method may also include transmitting, by the second antenna array of the first device, the translated signal to a third device in the wireless network, the translated signal being transmitted at the second carrier frequency.

An apparatus for wireless communications is described. The apparatus may include a processor and memory coupled with the processor, the processor and memory configured to receive, at a first antenna array of a first device, a signal at a first carrier frequency from a second device in a wireless network. In some examples, the processor and memory may be configured to identify one or more interfering signals affecting at least one of the first antenna array or a second antenna array of the first device and perform a frequency translation of the received signal from the first carrier frequency to a second carrier frequency based on the one or more interfering signals. In some examples, the processor and memory may be configured to transmit, by the second antenna array of the first device, the translated signal to a third device in the wireless network, the translated signal being transmitted at the second carrier frequency.

Another apparatus for wireless communications is described. The apparatus may include means for receiving, at a first antenna array of a first device, a signal at a first carrier frequency from a second device in a wireless network and identifying one or more interfering signals affecting at least one of the first antenna array or a second antenna array of the first device. The apparatus may also include means for performing a frequency translation of the received signal from the first carrier frequency to a second carrier frequency based on the one or more interfering signals and transmitting, by the second antenna array of the first device, the translated signal to a third device in the wireless network, the translated signal being transmitted at the second carrier frequency.

A non-transitory computer-readable medium storing code for wireless communications is described. The code may include instructions executable by a processor to receive, at a first antenna array of a first device, a signal at a first carrier frequency from a second device in a wireless network and identify one or more interfering signals affecting at least one of the first antenna array or a second antenna array of the first device. The code may also include instructions executable by the processor to perform a frequency translation of the received signal from the first carrier frequency to a second carrier frequency based on the one or more interfering signals, and transmit, by the second antenna array of the first device, the translated signal to a third device in the wireless network, the translated signal being transmitted at the second carrier frequency.

In some examples of the method, apparatuses, and non-transitory computer-readable medium described herein, performing the frequency translation may include operations, features, means, or instructions for determining that a difference between the first carrier frequency and the second carrier frequency satisfy a first threshold, and performing analog heterodyning of the received signal from the first carrier frequency to the second carrier frequency based on the determination.

In some examples of the method, apparatuses, and non-transitory computer-readable medium described herein, the first carrier frequency may be associated with a first radio frequency spectrum band and the second carrier frequency may be associated with a second radio frequency spectrum band different from the first radio frequency spectrum band.

Some examples of the method, apparatuses, and non-transitory computer-readable medium described herein may further include operations, features, means, or instructions for applying a phase rotation adjustment to the received signal based on the frequency translation of the received signal, the phase rotation adjustment corresponding to the second carrier frequency, where the translated signal includes the phase rotation adjustment.

Some examples of the method, apparatuses, and non-transitory computer-readable medium described herein may further include operations, features, means, or instructions for determining that a difference between the first carrier frequency and the second carrier frequency satisfy a second threshold, and performing digital heterodyning of the received signal from the first carrier frequency to the second carrier frequency based on the determination.

In some examples of the method, apparatuses, and non-transitory computer-readable medium described herein, the first carrier frequency and the second carrier frequency may be associated with a same radio frequency spectrum band.

Some examples of the method, apparatuses, and non-transitory computer-readable medium described herein may further include operations, features, means, or instructions for receiving, at the first antenna array, control information including a configuration for the first device, where one or more of the frequency translation or the phase rotation adjustment may be based on the configuration.

In some examples of the method, apparatuses, and non-transitory computer-readable medium described herein, the configuration includes an indication of one or more transmission directions, one or more gains, a beam width for one or more transmission beams, a beam width for one or more receive beams, or a combination thereof.

Some examples of the method, apparatuses, and non-transitory computer-readable medium described herein may further include operations, features, means, or instructions for downconverting the received signal to a baseband signal, identifying a first analog filter for the received signal, and filtering the received signal using the first analog filter based on the one or more interfering signals.

In some examples of the method, apparatuses, and non-transitory computer-readable medium described herein, the first analog filter includes one or more of a microwave filter, an intermediate frequency filter, a surface acoustic wave filter, a bulk acoustic wave filter, or a film bulk acoustic resonator filter.

Some examples of the method, apparatuses, and non-transitory computer-readable medium described herein may further include operations, features, means, or instructions for identifying a second analog filter for the received signal, the second analog filter including one or more of an intermediate frequency filter, a surface acoustic wave filter, a bulk acoustic wave filter, or a film bulk acoustic resonator filter, and filtering, during the downconverting, the received signal using the second analog filter based on the one or more interfering signals.

Some examples of the method, apparatuses, and non-transitory computer-readable medium described herein may further include operations, features, means, or instructions for converting the received signal to a digital signal, and filtering the digital signal based on the one or more interfering signals.

In some examples of the method, apparatuses, and non-transitory computer-readable medium described herein, performing the frequency translation of the received signal may include operations, features, means, or instructions for digitally heterodyning the digital signal from the first carrier frequency to the second carrier frequency.

Some examples of the method, apparatuses, and non-transitory computer-readable medium described herein may further include operations, features, means, or instructions for demodulating the received signal, identifying one or more reference signals, one or more synchronization signal blocks, or a combination thereof, based on the demodulated signal, and performing carrier frequency tracking based on the one or more reference signals, the one or more synchronization signal blocks, or a combination thereof, where the phase rotation adjustment may be applied based on the carrier frequency tracking.

Some examples of the method, apparatuses, and non-transitory computer-readable medium described herein may further include operations, features, means, or instructions for acquiring symbol timing information for each of one or more symbol periods of the received signal, where the phase rotation adjustment may be applied to the one or more symbol periods based on the symbol timing information.

Some examples of the method, apparatuses, and non-transitory computer-readable medium described herein may further include operations, features, means, or instructions for receiving control information for the first device via a secondary link with another device, the secondary link being different from a link associated with the first antenna array, identifying a clock signal associated with the secondary link, and performing the carrier frequency tracking based on the identified clock signal.

In some examples of the method, apparatuses, and non-transitory computer-readable medium described herein, the carrier frequency tracking may be performed using one or more a phase-locked loop circuits.

In some examples of the method, apparatuses, and non-transitory computer-readable medium described herein, a first phase-locked loop circuit of the one or more phase-locked loop circuits operates at a frequency including a difference between the first carrier frequency and the second carrier frequency, and a second phase-locked loop circuit of the one or more phase-locked loop circuits operates at the first carrier frequency.

Some examples of the method, apparatuses, and non-transitory computer-readable medium described herein may further include operations, features, means, or instructions for selecting the second carrier frequency based on a first voltage control oscillator of a first phase-locked loop circuit and second voltage control oscillator of a second phase-locked loop circuit, where the second carrier frequency may be selected to avoid interference between the first voltage control oscillator and the second voltage control oscillator.

In some examples of the method, apparatuses, and non-transitory computer-readable medium described herein, demodulating the received signal may include operations, features, means, or instructions for performing a channel estimation and equalization on the received signal.

Some examples of the method, apparatuses, and non-transitory computer-readable medium described herein may further include operations, features, means, or instructions for converting the received signal from an analog signal to a digital signal, where applying the phase rotation adjustment includes applying the phase rotation adjustment to the digital signal based at least in part on the second carrier frequency.

In some examples of the method, apparatuses, and non-transitory computer-readable medium described herein, the phase rotation adjustment may be based on an equation including $e^{-j2\pi f_n t_{start,l}^\mu + N_{CP,l}^\mu T_c}$. In some examples of the method, apparatuses, and non-transitory computer-readable medium described herein, $t_{start,l}^\mu$ includes a starting position of a symbol l for a subcarrier spacing configuration $\mu$ in a subframe, $N_{CP,l}^\mu$ includes a cyclic prefix length in samples for the symbol l, and $T_c$ includes a sampling interval in a baseband.

Some examples of the method, apparatuses, and non-transitory computer-readable medium described herein may further include operations, features, means, or instructions for determining a first antenna gain associated with the first antenna array, determining a second antenna gain associated with the second antenna array, and performing digital gain control for the first antenna array, the second antenna array, or a combination thereof, based on the first antenna gain and the second antenna gain.

In some examples of the method, apparatuses, and non-transitory computer-readable medium described herein, the transmitting the translated signal may include operations, features, means, or instructions for upconverting the received signal from baseband using a zero intermediate frequency architecture, low-intermediate frequency architecture, or a super-heterodyne architecture.

Some examples of the method, apparatuses, and non-transitory computer-readable medium described herein may further include operations, features, means, or instructions for downconverting the received signal to an intermediate frequency signal, and filtering the intermediate frequency signal using an analog filter, a surface acoustic wave filter, a bulk acoustic wave filter, a film bulk acoustic wave resonator filter, a digital filter, or a combinations thereof.

In some examples of the method, apparatuses, and non-transitory computer-readable medium described herein, the received signal may be downconverted using a zero intermediate frequency architecture, low-intermediate frequency architecture, or a super-heterodyne architecture.

In some examples of the method, apparatuses, and non-transitory computer-readable medium described herein, the transmitting the translated signal may include operations, features, means, or instructions for transmitting the translated signal as a beamformed signal based on analog beamforming, digital beamforming, or a combination thereof, where one or more of the first antenna array or the second antenna array include a phased antenna array.

A method of wireless communications at a base station is described. The method may include determining a configuration of a first device, the configuration being based on communicating with one or more user equipment (UEs) and transmitting, to the repeating device, a beamformed signal including an indication of the configuration.

An apparatus for wireless communications at a base station is described. The apparatus may include a processor and memory coupled with the processor, the processor and memory configured to determine a configuration of a repeating device, the configuration being based on communicating with one or more UEs and transmit, to the repeating device, a beamformed signal including an indication of the configuration.

Another apparatus for wireless communications at a base station is described. The apparatus may include means for determining a configuration of a repeating device, the configuration being based on communicating with one or more UEs and transmitting, to the repeating device, a beamformed signal including an indication of the configuration.

A non-transitory computer-readable medium storing code for wireless communications at a base station is described. The code may include instructions executable by a processor to determine a configuration of a repeating device, the configuration being based on communicating with one or more UEs and transmit, to the repeating device, a beamformed signal including an indication of the configuration.

In some examples of the method, apparatuses, and non-transitory computer-readable medium described herein, the beamformed signal includes control information indicating the configuration.

In some examples of the method, apparatuses, and non-transitory computer-readable medium described herein, the configuration includes one or more transmission directions, one or more gains, a beam width for one or more transmission beams, a beam width for one or more receive beams, or a combination thereof.

DETAILED DESCRIPTION

Figure 1:
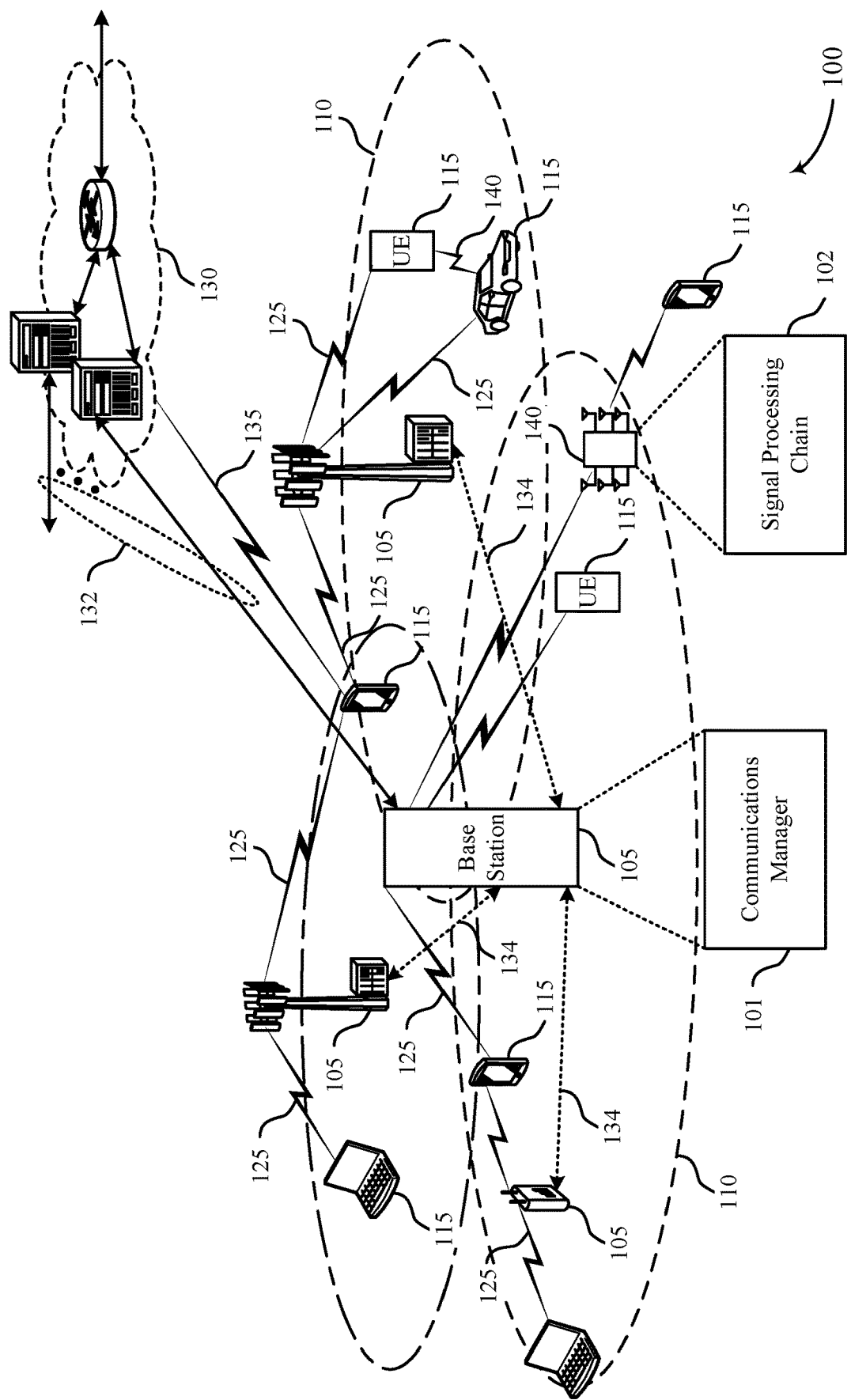
FIG. 1 illustrates an example of a system for wireless communications that supports analog phased-array repeaters with digitally-assisted frequency translation and phase adjustment in accordance with one or more aspects of the present disclosure.

In a wireless communications system, a base station may communicate with a UE over a wireless link. For instance, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. However, the transmission of a signal (such as a beamformed signal) between the base station and the UE may not be possible or may be interfered with due to a physical barrier or a radio frequency (RF) jammer. In these cases, a repeating device (e.g., a wireless repeater, a mmW repeater, or the like) may be used to repeat or relay the transmission from the base station to the UE, and vice versa, thereby enabling efficient communication in the presence of RF jammers.

A wireless repeater may repeat, extend, or redirect wireless signals received from a base station to a UE, from the UE to the base station, or between other wireless devices. For example, the repeater may receive a signal from a base station and retransmit the signal to a UE, or the repeater may receive a signal from a UE and retransmit the signal to the base station. Additionally, various phase rotations may be applied to signals transmitted between wireless devices, where, for example, a base station may transmit a signal on a first carrier frequency and with a phase rotation (e.g., a pre-rotation). In cases where transmissions from the base station to the UE (and vice versa) are blocked due to an RF jammer, the RF jammer may corrupt particular frequencies, and those frequencies (such as the frequency used for transmission by the base station) may therefore not be reliable for transmission. As such, a wireless repeater may be used to transmit (or retransmit) the signal after amplifying the signal and performing a frequency translation (e.g., heterodyning) of a first carrier frequency to a second carrier frequency. The second carrier frequency may be different from the frequency that was used to transmit the signal to the repeater, and may be unaffected by interference from the RF jammer.

However, heterodyning the signal may also affect the phase rotation associated with the signal. For instance, the phase rotation may be predefined (e.g., in accordance with a wireless communications standard) and based on a frequency on which the signal is transmitted. Therefore, heterodyning the carrier frequency may shift the carrier frequency that is used for retransmission of the signal, thereby causing an error in phase rotation for a signal received at a receiving device. Such errors in the phase rotation may, for example, cause the transmission waveform to be dependent on the size of a fast Fourier transform (FFT) size and a location of an RF local oscillator (LO). As such, an additional phase rotation or phase rotation correction may be used to account for the frequency translation of the heterodyned signal.

In various aspects of the present disclosure, a wireless repeater may use directional beams for receiving and retransmitting signals. Such techniques may be employed, in some examples, in systems that use mmW communications. In some cases, repeaters may perform interference mitigation to further enhance the reliability of communications between a UE and a base station. According to various aspects of the present disclosure, wireless repeaters may perform digital filtering or a combination of digital and analog filtering on a signal to reduce or eliminate interference from physical obstacles, jamming devices, radiation leakage of the repeater itself, or any combinations thereof.

Moreover, the repeater may support heterodyning received signals, and the repeater may further perform a phase rotation adjustment based on the heterodyning of the signal to avoid RF jammers or other interference. For instance, the repeater may receive a first signal (e.g., from a base station or UE) at a first carrier frequency. The repeater may identify nearby interference that may affect a retransmitted signal over the first carrier frequency. To avoid the interference from the RF jammer or other blocker, the repeater may perform a frequency translation from the first carrier frequency to a second carrier frequency. Additionally, the repeater may apply a phase rotation adjustment to the signal, where the phase rotation adjustment may be determined based on the frequency translation (e.g., the second carrier frequency) and the phase rotation error that may be associated with the frequency translation. Accordingly, the repeater may be configured to perform frequency translation and phase rotation correction to reduce or minimize other signals from interfering with the repeater's own transmission to another device. In some cases, the repeater may be configured (e.g., by a base station) using control signaling included with a beamformed transmission, or via a secondary link that is separate from the link used to receive beamformed transmissions.

In some cases, and as described herein, the wireless repeater may support analog heterodyning, digital heterodyning, or both. For example, in cases where a first frequency is translated to a second frequency in a different RF spectrum band, then the repeater may utilize analog heterodyning. The use of analog heterodyning may result in improved isolation of received and transmitted signals at the repeater, allowing for increased forward gain. In other cases, if the first and second frequency are within a same RF spectrum band, the repeater may utilize digital heterodyning. Such digital heterodyning may reduce the complexity of the repeater and further avoid spurious tones within the device.

Aspects of the disclosure are initially described in the context of a wireless communications system. Additional aspects are then described with reference to filtering techniques and circuit diagrams that support efficient digital and analog heterodyning, as well as phase correction, by a repeater. Aspects of the disclosure are further illustrated by and described with reference to process flows, apparatus diagrams, system diagrams, and flowcharts that relate to analog phased-array repeaters with digitally-assisted frequency translation and phase adjustment.

FIG. 1 illustrates an example of a wireless communications system 100 that supports analog phased-array repeaters with digitally-assisted frequency translation and phase adjustment in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical)

communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some examples, base station 105 may wirelessly communicate with one or more repeaters 140 (e.g., repeating devices, wireless repeaters) that may support the retransmission, amplification, frequency translation, etc. of signaling to one or more other devices, such as a UE 115. Similarly, a repeater may be used to retransmit signaling from a UE 115 to a base station 105.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a repeater 140 may be a MTC or IoT device that is controlled by a base station 105 or UE 115 via a low-band or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). In some examples, a UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super-high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105, or both.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within a synchronization signal block (SSB) on respective directional beams, where one or more SSBs may be included within a synchronization signal burst.

Wireless communications system 100 may include one or more repeaters 140 (e.g., wireless repeaters 140). Wireless repeaters 140 may include functionality to repeat, extend, and redirect wireless signals transmitted within a wireless communications system. In some cases, wireless repeaters 140 may be used in line of sight (LOS) or non-line of sight (NLOS) scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 140 may be used to receive a signal from a base station 105 and transmit a signal to UE 115, or receive a signal from a UE 115 and transmit the signal to the base station 105. Beamforming, filtering, gain control, and phase correction techniques may be utilized by the wireless repeater 140 to improve signal quality and avoid RF interference with the transmitted signal. Phase rotation adjustment may be applied by the wireless repeater 140 to the signal to correct for phase rotation error caused by the frequency translation by the repeater 140.

A wireless repeater 140 may include an array of reception antennas and an array of transmission antennas. In some cases, the wireless repeater 140 may include digital filtering, and the wireless repeater 140 may include a signal processing chain 102 connected (e.g., coupled, linked, attached) between the array of reception of antennas and the array of transmission antennas. The signal processing chain 102 may be implemented as an RF integrated circuit (RFIC), which may include RF/microwave components such as one or more phase shifters, low noise amplifiers (LNAs), power amplifiers (PAs), PA drivers, heterodyning mixers, carrier tracking circuits, gain controllers, power detectors, filters, or other circuitry, in conjunction with a digital component that may include one or more of digital filters, processors, analog-to-digital (A/D) converters, digital-to-analog (D/A) converters, or other circuitry. The phase shifters may be controlled by one or more beam controllers for beamforming to reduce signal interference. The heterodyning mixers may downconvert a frequency of a received signal to an intermediate frequency (IF) or baseband frequency, that may be filtered by the one or more filters, and the heterodyning mixers may upconvert the filtered signal back to the higher frequency. The signal processing chain 102 may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming, filtering, and gain control, signal quality (e.g., mmW signals) may be improved in LOS and NLOS scenarios.

Further, wireless repeater 140 may apply a phase rotation adjustment to the signal prior to transmission to adjust for the phase rotation error caused by heterodyning the frequency of the signal. For instance, the wireless repeater 140 may be configured to apply a phase rotation adjustment to a heterodyned signal based on the carrier frequency that is used for transmitted the signal. More specifically, the wireless repeater 140 may perform digital or analog heterodyning of a signal to a different carrier frequency and a phase rotation adjustment that allows the OFDM waveform of the signal to remain independent of an FFT or inverse fast Fourier transform (IFFT) size and location of an RF LO. In some cases, the phase rotation adjustment may be selected from a set of phase rotation adjustments, which may be indexed, for example, in a table of phase rotation adjustments.

As described, the wireless repeater 140 may include components (e.g., antenna arrays and signal processing chain circuitry) in the analog/RF domain, as well as one or more digital filters, or both analog and digital filters. Further, in some cases the wireless repeater 140 may include digital circuitry for receiving control information (e.g., for receiving remote configuration of gain, direction, and LO tracking via sub-6 or via mmW signals). In cases where the control information is not received via the mmW signals, the control information may be received using a different radio access technology than used between the base station 105 and UE 115. For example, one or more side channels may be used to provide control information and implemented as Bluetooth, ultra-wide band, wireless LAN, etc. protocols, and as such, the repeater 140 may include circuitry or processors or both for receiving and processing signals received via those protocols and controlling beamforming at the RF components based on those signals received at the side channel.

One or more of the base stations 105 may include a communications manager 101, which may determine a configuration of a repeating device, the configuration being based on communicating with one or more UEs 115 and transmit, to the repeating device, a beamformed signal including an indication of the configuration.

Repeaters 140 may include a signal processing chain 102 that supports digital or analog heterodyning and phase rotation correction. The signal processing chain 102 may receive, from a first antenna array of a repeating device, a signal at a first carrier frequency from a first device in a wireless network, identify one or more interfering signals affecting at least one of the first antenna array or a second antenna array of the repeating device, apply a phase rotation adjustment to the received signal based on a frequency translation of the received signal, the phase rotation adjustment corresponding to a second carrier frequency, perform the frequency translation of the received signal from the first carrier frequency to the second carrier frequency based on the one or more interfering signals. In some cases, the repeater 140 may transmit, by the second antenna array of the repeating device, the translated signal including the phase rotation adjustment to a second device in the wireless network (e.g., a UE 115, a base station 105, etc.), the translated signal being transmitted at the second carrier frequency.

Figure 2:
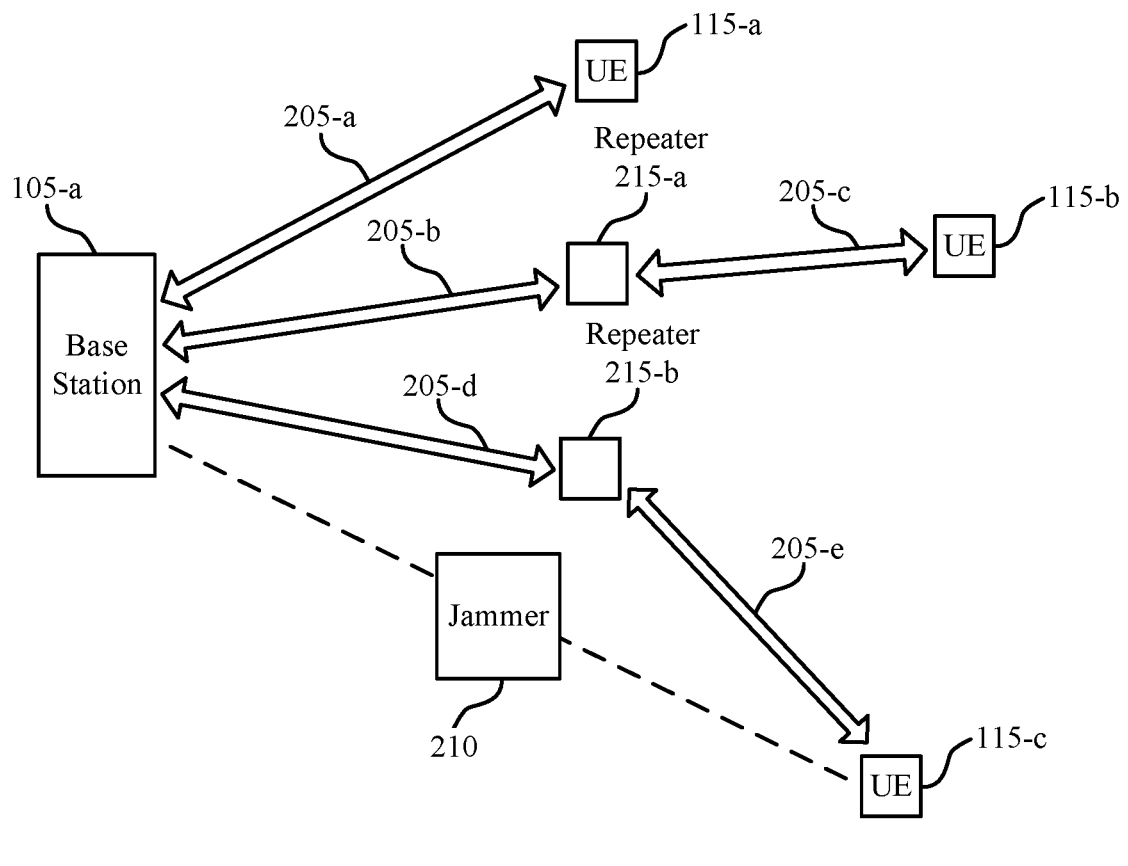
FIG. 2 illustrates an example of a wireless communications system that supports analog phased-array repeaters with digitally-assisted frequency translation and phase adjustment in accordance with one or more aspects of the present disclosure.

FIG. 2 illustrates an example of a wireless communications system 200 that supports analog phased-array repeaters with digitally-assisted frequency translation and phase adjustment in accordance with one or more aspects of the present disclosure. In some examples, Wireless communications system 200 may implement aspects of wireless communications system 100. For instance, wireless communications system 200 may include a base station 105-*a* and UEs 115-*a*, 115-*b*, and 115-*c*, which may be examples of a base station 105 and UEs 115 as described with reference to FIG. 1. Base station 105-*a* may communicate with UEs 115 by transmitting signals 205. In some cases, signals 205 may be relayed from base station 105-*a* to UEs 115 by one or more repeaters 215 (e.g., wireless repeaters), which may be an example of a repeater 140 described with reference to FIG. 1. Repeaters 215 may relay signals 205 to UEs 115 to avoid interference by a jammer 210. Wireless communications system 200 may support the use of repeaters that include functionality for heterodyning received signals and apply phase rotation corrections based on the heterodyned signal.

Base station 105-*a* may transmit signal 205-*a* to UE 115-*a*. This signal may not be interfered with by a jammer 210 or obstructed by a physical object. In this case, the signal 205-*a* may be transmitted directly to UE 115-*a* without being relayed by a repeater (e.g., a repeater 215). Base station 105-*a* may transmit signal 205-*a* using a particular frequency (e.g., $f_0$) and a phase rotation (e.g., $\varphi_0$).

In many cases, a base station 105 may apply a phase rotation to a signal before the signal is transmitted in a wireless communications system. Phase rotations used by base station 105-*a* may involve a phase rotation of OFDM symbols in a signal transmission, which may be applied to the symbols before they are transformed from the frequency domain to the time domain. The phase rotation may be based on the RF, where the complex valued OFDM baseband signal may be described according to the following equation:

$$Re\{s_l^{(p,\mu)}(t)e^{j2\pi f_0(t-t_{start,l}^\mu - N_{CP,l}^\mu T_c)}\} \quad (1)$$

In the above equation, $t_{start,l}^\mu$ is defined as:

$$t_{start,l}^\mu = \begin{cases} 0, l = 0 \\ t_{start,l-1}^\mu + (N_u^\mu + N_{CP,l-1}^\mu)T_c \end{cases} \quad (2)$$

Further, p is an antenna port, $\mu$ is a subcarrier frequency, $N_{CP}^\mu$ is the cyclic prefix (CP) length in samples for the $l^{th}$ symbol, $N_u^\mu$ is an OFDM symbol length in units of $T_c$, $T_c$ is the sampling interval in the baseband frequency, $f_0$ is the carrier frequency, and l is the symbol index.

Based on Equations 1 and 2, the phase rotation term for the $l^{th}$ symbol in a signal may be defined as:

$$\varphi_0 \triangleq e^{-j2\pi f_0(t_{start,l}^\mu + N_{CP,l}^\mu T_c)} \quad (3)$$

The phase rotation may allow the frequency waveform to be independent of and unaffected by the FFT size or IFFT size, and independent of the location of the RF LO. The same frequency (e.g., $f_0$) may be applied for the TDD transmissions for all UEs 115 in a coverage region. For instance, base station 105-*a* may use the same frequency for all TDD transmissions to multiple different UEs 115. The same phase rotation $\varphi_{0,l}$ may also be applied on all tones within symbol l, that may also be applied to transmissions to different UEs 115.

Phase rotation may be applied for different frequency bands or frequency ranges. For example, phase rotation of the frequency by base station 105-*a* may be used for the sub-6 frequency band (i.e., frequency range 1 (FR1), 450 to 6000 megahertz (MHz)) and the mmW frequency band (i.e., frequency range 2 (FR2), 24250 to 52600 MHz).

The baseband phase rotation may depend on a single RF carrier frequency (e.g., $f_0$). The phase-rotation may not depend on the sub-carrier index with a set of OFDM symbols or within a particular OFDM symbol. In cases where RF translation by a repeater 215 is used (e.g., where line-of-sight and non-line of sight channels may be limited by RF jammers 210), repeaters 215 may heterodyne signals to different frequency bands.

In some cases, there may be an object blocking a signal 205 being transmitted from the base station 105 to the UE 115. The object may be a physical object or in some cases may be a frequency jammer, such as an RF jammer 210. An RF jammer 210 may function by targeting, interfering with, blocking, or jamming, particular frequencies that transmissions are sent on. As an example, an RF jammer 210 may include another wireless device (e.g., other base stations 105, UEs 115, etc.), other types of transmissions or signals (e.g., radar, satellite, etc.), or the like. RF jammers (e.g., RF jammer 210) may include RF jammers that affect transmissions through adjacent channel selectivity (ACS) jamming, in-band blocking (IBB), and out-of-band (OOB) jamming. ACS jamming may include high power transmission by an RF jammer on a frequency adjacent to the frequency targeted for jamming, such that the power of the transmission on the adjacent frequency may interfere with transmission on the targeted frequency. IBB jamming may include transmission by a jammer on the targeted band. OOB jamming may include transmission by the jammer on a frequency band outside of the targeted band, which may still interfere with the targeted band. Repeaters 215 may heterodyne signals to different frequency bands to avoid interference from RF jammers 210 or other interfering signals.

Heterodyning may include the generation of a different frequency by mixing two or more RF signals. Repeaters 215 may perform heterodyning to produce a different frequency on which to relay the initial transmission, to both avoid physical obstructions and RF jammers 210 that may be blocking the direct transmission from base station 105-*a* to the UE 115. RF jammers 210 may, in some cases, also block the relayed signal 205 from the repeater 215, if the repeater 215 uses the same frequency as the initial transmission from base station 105-*a*.

Heterodyning by the repeater 215 may translate the signal 205 to a different RF band, which may be away from the RF band that is interfered with by the jammer 210. Frequency translation by a repeater 215 may also be tunable to avoid RF jammers 210 set to different frequencies in different situations. Base station 105-a may control parameters such as direction, frequency gains, and frequency translation of the repeater 215 in a coverage region. In some cases, the configuration of the repeaters 215 may be indicated to the repeaters 215 via signaling from base station 105-a.

In some cases, repeaters 215 may function by utilizing wideband analog heterodyning. This heterodyning process may be used in cases where the repeater 215 does not have the functionality to perform digital heterodyning, or in cases where the frequency translation used to avoid interference meets a particular threshold. For example, wideband analog heterodyning may by performed by repeater 215 when the frequency translation applied is wider than a particular threshold.

In an example of analog heterodyning, base station 105-a may transmit a signal 205-b to UE 115-b. Base station 105-a may apply a first phase rotation $\varphi_0$ to signal 205-b, which may be transmitted over a first frequency $f_0$. The phase rotation applied by the base station 105 may be determined in accordance with equations 1, 2, and 3, as described herein. However, a line-of-sight (LOS) transmission may be blocked by an RF Jammer 210. Thus, for UE 115-b to receive the transmission, signal 205-b may be retransmitted by repeater 215-a via signal 205-c. Before signal 205-c is relayed, repeater 215-a may amplify received signal 205-b, filter out RF interference, and may heterodyne $f_0$ to determine a frequency $f_1$ on which to transmit signal 205-c to UE 115-b, so that it may not be blocked by jammer 210.

The transmission of signal 205-c by repeater 215-a may be associated with a phase rotation error. When repeater 215-a heterodynes $f_0$ to transmit signal 205-c over $f_1$, an error in the phase rotation may occur, where the error may reintroduce a dependency of OFDM waveform on FFT size and RF LO location. This error may be represented by the following equation:

$$\varphi_1 \triangleq e^{-j2\pi(f_1-f_0)(t_{start,l}^{\mu}+NCP_s l^{\mu}T_c)} \quad (4)$$

Once the repeater 215 heterodynes the frequency from a first frequency $f_0$ to a second frequency (e.g., $f_1$ or $f_2$), the change in frequency may not be accounted for by the phase rotation (e.g., $\varphi_0$) that was applied by base station 105-a. The change in frequency may cause an error in phase rotation as shown by the below equation (for the example of heterodyning from $f_0$ to $f_2$):

$$\varphi_2 \triangleq e^{-j2\pi(f_1-f_0)(t_{start,l}^{\mu}+NCP_s l^{\mu}T_c)} \quad (5)$$

where $\varphi_2$ is the error difference from the initial phase rotation $\varphi_0$ due to the heterodyning from $f_0$ to $f_2$. In some cases, base station 105 may apply a phase rotation correction to adjust for the error caused by heterodyning the frequency from a first carrier frequency to a second carrier frequency, as indicated in error equations 4 and 5. In other cases, and as described in further detail below, one or more of the repeaters 215 may apply the phase rotation correction prior to retransmitting a signal to another device in addition to performing the heterodyning. For example, a repeater 215 may be capable of performing digital heterodyning, analog heterodyning, or a combination thereof, of a signal, where the repeater may also apply a phase rotation adjustment based on the frequency used for retransmission of the signal (e.g., $f_1$ or $f_2$, as described herein). In such cases, the repeater may be configured to perform the heterodyning and phase rotation correction, among other functions.

In some cases, the heterodyning may include digital or analog heterodyning. For instance, the repeater 215 may perform narrowband digital heterodyning. This digital heterodyning process may occur in cases where the frequency translation used to avoid interference from other signals meets a threshold. For instance, in cases where the second carrier frequency (e.g., $f_1$) is relatively larger or relatively smaller than the first carrier frequency (e.g., $f_0$) by a first threshold, then digital heterodyning may be used. In such cases, $f_1$ may be in the same RF spectrum band as $f_2$. Additionally or alternatively, if the second carrier frequency (e.g., $f_1$) is much larger or much smaller than the first carrier frequency (e.g., $f_0$) by a second threshold that is greater than the first threshold, then analog heterodyning may be used. In such cases, $f_1$ and $f_2$ may be in different RF spectrum bands (e.g., $f_1$=28 GHz and $f_2$=39 GHz). Thus, narrowband digital heterodyning may be performed by repeater 215 when the frequency translation applied is narrower than a threshold. This may occur for cases where the interfering signal is a close-in jammer, which may interfere on a frequency band close to the frequency band of the desired signal. In cases where repeater 215 utilizes narrowband digital heterodyning, or any other digital heterodyning, repeater 215 may also apply a phase rotation correction to the transmitted signal. In other cases, wideband analog heterodyning may be performed when the frequency translation is greater than the threshold.

Wideband analog heterodyning may also avoid voltage controlled oscillator (VCO) injection pulling due to a relatively wide separation of $f_0$ and $f_1$. However, wideband analog heterodyning may utilize separate VCO and phase-locked loop (PLL) circuits to translate, for example, a first frequency ($f_0$–$f_1$) to another, desired, frequency ($f_1$). Wideband analog heterodyning may also be used to avoid combining unwanted RF interference (e.g., mixing spurious tones) from dual VCOs (e.g., where $nf_0 \pm mf_1$ and where n, m=1, 2, 3 . . . ).

PLL may describe a circuit that includes a feedback loop that functions to maintain the same phase and frequency of a feedback signal as the signal that is input into the loop. When there is a phase difference between the input to the PLL and the feedbacked output of the PLL, the circuit may generate a level of voltage which may change the VCO. A wireless repeater conducting wideband analog heterodyning may utilize a different VCO and PLL, due to the wide difference in translated frequency.

Further, digital narrowband heterodyning may utilize single PLL and VCO, as the difference in translated frequency may be relatively small. VCO injection pulling may not be used due to a relatively narrow separation between $f_0$ and $f_1$ and a wireless repeater conducting narrowband digital heterodyning may operate to utilize RF isolation techniques. Further, narrowband digital heterodyning may not have a risk of combining unwanted RF interference (e.g., mixing spurs) due to the single VCO. Narrowband digital heterodyning may also be impacted by an analog feedback loop from the transmit antenna array of the wireless repeater to the receive antenna array of the wireless repeater 215. Thus, the wireless repeater 215 may implement a combination of beamforming, a PA feedback path, automatic gain control (AGC), and echo cancelation (as described further below in reference to FIG. 3) to maintain loop stability.

In an example, base station 105-a may transmit a signal 205-d to UE 115-c. Signal 205-d may not be transmitted directly to UE 115-c, and may be relayed as signal 205-c by repeater 215-b due to interference from an interfering signal (e.g., from RF jammer 210). Signal 205-d may be transmitted by base station 105-a using a frequency $f_0$ and a phase rotation $\varphi_0$. Repeater 215-b may apply filtering techniques to reduce the influence of RF jammer 210 on the signal followed by a heterodyning process which heterodynes $f_0$ to $f_2$. The repeater 215 may then apply a phase rotation correction based on the frequency $f_2$ used to retransmit the relayed signal 205-e. Signal 205-e may then be received by UE 115-b with a phase rotation $\varphi_2$ and over carrier frequency $f_2$. The phase rotation $\varphi_2$ and the frequency $f_2$ of the signal 205-e received by UE 115-b may be different from the phase rotation $\varphi_0$ and frequency $f_0$ used by base station 105-a to transmit signal 205-d.

Some wireless repeaters 215 (e.g., those that are configured to apply a phase rotation adjustment) may have increased functionality. These wireless repeaters 215 may be configurable to handle frequency interference at various frequencies, to handle different types of jammers operating at different frequencies, and other interference scenarios. Filtering and frequency translation at the wireless repeater 215 may decrease the amount of filtering used by a UE 115 after it receives signaling from the base station 105. Decreased use of filtering at a UE 115 may also decrease the amount of power used by the UE 115, and therefore may increase efficiency. Further, the application of a phase rotation adjustment in some cases may correct for phase rotation error caused by heterodyning the signal. The phase rotation error may cause dependencies of the waveform on the size of the FFT, and may also ensure compliance with some wireless communications standards. Thus, the phase rotation adjustment applies by a digital repeater 215 may avoid these dependencies on compliance issues.

Figure 3:
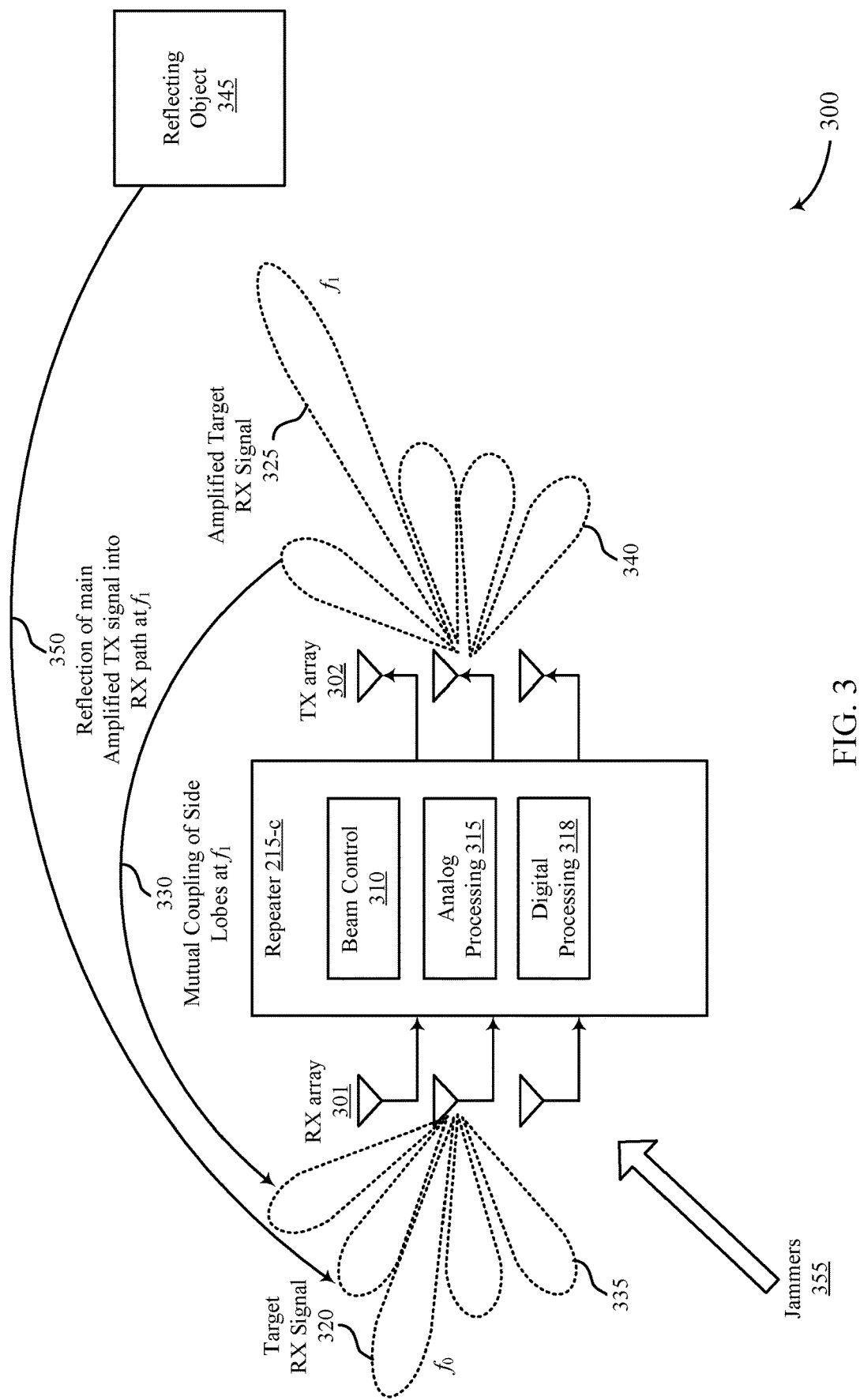
FIG. 3 illustrates an example of a block diagram of a configurable repeater that supports analog phased-array repeaters with digitally-assisted frequency translation and phase adjustment in accordance with one or more aspects of the present disclosure.

FIG. 3 illustrates an example of a block diagram 300 of a configurable repeater 215-c that supports analog phased-array repeaters with digitally-assisted frequency translation and phase adjustment in accordance with one or more aspects of the present disclosure. In some examples, the devices and components of FIG. 3 may implement aspects of wireless communications systems 100 and 200. The repeater 215-c may include a reception antenna array 301 and transmission antenna array 302. One or both of the reception antenna array 301 or the transmission antenna array 302 may be an example of a phased antenna array (e.g., an electronically scanned array) that may be capable of forming beams which are steered in various directions. For instance, the repeater 215-c may beamform received signal via various beam directions (or scan angles). Lobes (e.g., lobes 320 and 335) illustrate the effective spatial shape of the received signal power after beamforming within the repeater. The lobe 320 (e.g., main lobe) may be directed to a target reception signal, which may be transmitted by a UE 115 or a base station 105. The target reception signal may correspond to the signal to be retransmitted to another device such as a UE 115 or base station 105. Lobes (e.g., lobes 325 and 340) illustrate the effective spatial shape of a transmitted signal power after beamforming within the repeater.

In some examples, a beam controller 310 may adjust the beam configuration such that the reception antenna array 301 receives a higher quality target signal. In some cases, a jamming device may transmit a jamming signal 355 that may cause interference with a received signal at repeater 215-c. In some cases, an analog processing 315 at repeater 215-c (e.g., implemented via analog components or analog chain) may perform beamforming (e.g., using phase shifters, LNAs, etc.), and downconvert a received signal to a baseband signal, which may be filtered at digital processing 318 (e.g., implemented using one or more digital processing and control components) to reduce or eliminate interference (e.g., from the jamming signal 355, reflections 350, mutual coupling 330, or combinations thereof). Analog processing 315 component may then upconvert the filtered signal back to the RF mmW frequency, and retransmit the signal to a UE 115 or base station 105.

In some cases, the interfering signals from the jamming signal 355 may be present at a different frequency than a frequency of the target reception signal. For example, the repeater 215-c may operate in a relatively well-regulated frequency band that prevents concurrent transmissions of devices at the same frequency. However, in some cases, the jamming signal 355 may have a significantly higher power than the target reception signal, which may drive one or more receive chains associated with the reception antenna array 301 into gain compression. Further, even though the jamming signal 355 may be non-overlapping in frequency with the target reception signal, it may cause the one or more receive chains to generate inter-modulation terms that may overlap with the target reception signals and degrade the signal-to-noise ratio (SNR). Techniques such as those discussed herein may reduce such interference and thereby enhance the SNR of the repeated signal from the repeater 215-c. In some cases, carrier tracking and filter coefficient selection may be performed by the repeater 215-c. In some cases, repeater 215-c may support analog filtering and frequency translation. Additionally or alternatively, repeater 215-c may be support digital frequency translation to avoid interference and may also apply a phase rotation adjustment to correct for phase rotation errors due to the frequency translation.

Various examples of the components of repeater 215-c and operations of the repeater 215-c are described in further detail in the examples of FIGS. 7 through 15. Further, circuitry of repeater 215-c may be configured in layouts or architectures similar to or different from the layouts or architectures illustrated in FIGS. 8 through 15. In some cases, the beam controller 310 may further adjust the beam configuration of the transmission antenna array 302 such that the target device receives a higher quality signal. In some cases, a transmit or receive beam is amplified for better reception or retransmission of the target signal. In some cases, the gain, beamforming configuration, or both, may be configured based on information from the remote configuration by processor/memory component(s).

As illustrated, there may be signal reception and retransmission interference via mutual coupling 330 (e.g., signal leakage) of side lobes of the respective beam configurations of the reception antenna array 301 and the transmission antenna array 302. In some cases, the beam controller 310 may adjust beam width, direction, or both, to avoid the mutual coupling. Further, in some cases, the analog processing 315 may implement gain control techniques to improve stability and reduce interference in the repeater 215-c.

Reflections 350 may represent a reflection of an amplified signal (e.g., lobe 325) from a reflecting object 345 and to the signal reception beam configuration, which may cause signal interference or leakage. The beam controller 310 may adjust beam width, direction, or both to avoid interference via reflection. In some cases, the analog processing 315, digital processing 318, or combinations thereof may be implemented as a RFIC. In some cases, the aspects of this disclosure may be implemented using digital systems and components.

In some cases, digital processing 318 components, in conjunction with processor/memory, may demodulate and decode one or more synchronization signal blocks (SSBs) or reference signals and perform channel estimation and equalization, to identify control information and perform carrier tracking. For example, beamforming control information may be determined based on information in an SSB, which may be used to set receive and transmit beamforming parameters (e.g., to set direction, gain and beam-width of transmission and reception beams). Further, carrier tracking may be based on one or more reference signals received from the base station 105 at mmW frequencies, for example, via the reception antenna array 301.

Additionally, digital processing 318 may utilize one or more digital filters that may perform filtering of one or more interfering signals, such as the mutual coupling of side lobes as indicated by mutual coupling 330. In some cases, filtering coefficients for mutual coupling, as well as for stationary clutter, may be pre-computed or predetermined based on a beam configuration. In some cases, the beam configuration may be configured in a one-time or periodic off-line calibration stage. Filtering by components of repeater 215-c may decrease filtering at other wireless devices (e.g., a receiving UE 115) which may decrease power usage at other devices and increase efficiency. Filtering and heterodyning by repeater 215-c may avoid RF interference at reception and transmission at repeater 215-c, and may also avoid interference at the devices that repeater 215-c communicates with, such as a receiving UE 115. In some cases, repeater 215-c may dynamically change the frequency it heterodynes to transmit on based on different detected RF interference, either at repeater 215-c or at a receiving device. Dynamic filtering and heterodyning may increase the reliability of signal transmissions and robustness of communications in a wireless network. For instance, as described herein, repeater 215-c may support analog or digital frequency translation techniques used to mitigate interfering signals. Moreover, repeater 215-c may support phase rotation correction that is based on the frequency translation, where a phase rotation may be corrected based on a carrier frequency used to retransmit signals (e.g., to a UE 115) via transmission antenna array 302.

Figure 4:
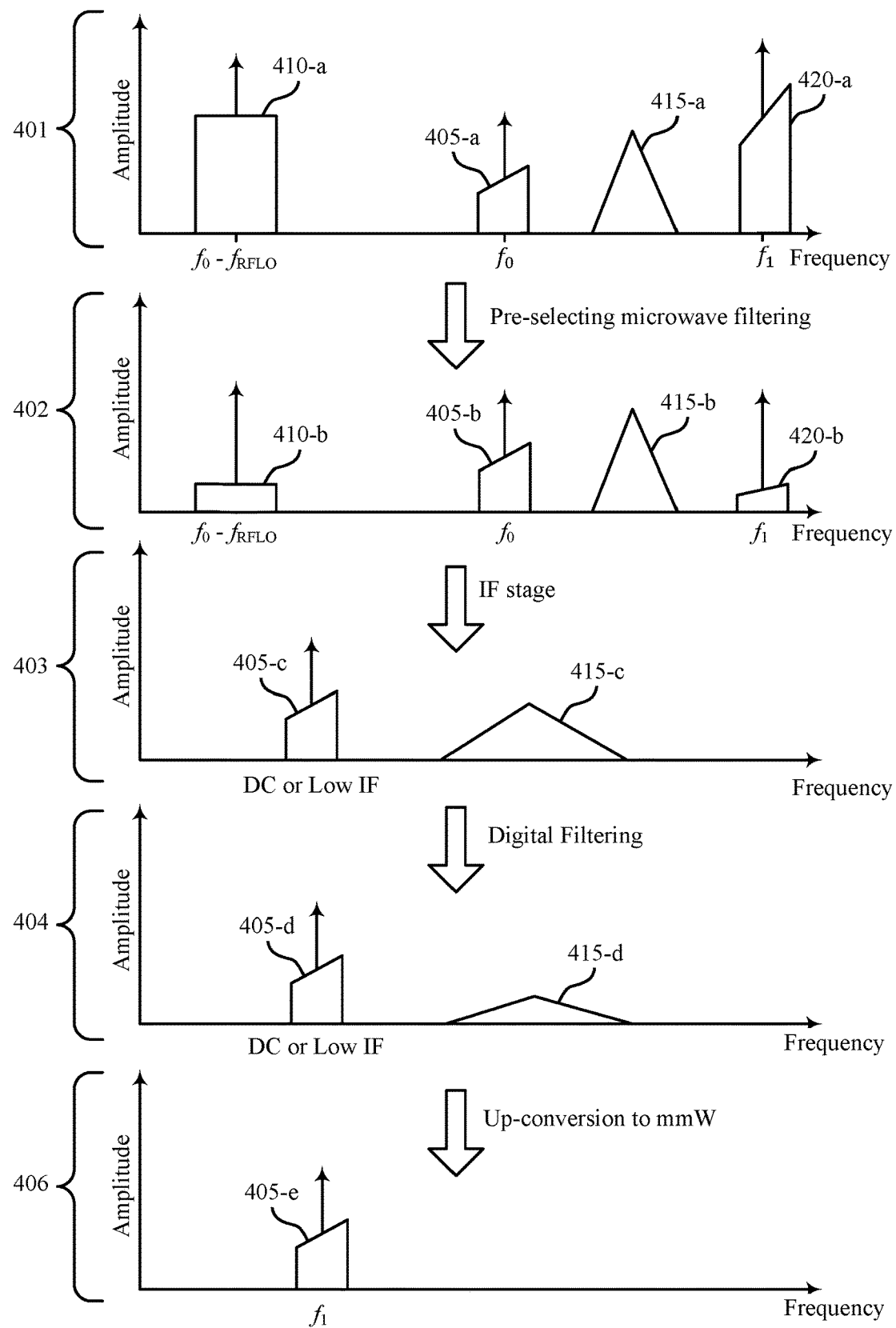
FIGS. 4 and 5 illustrate examples of filtering techniques that support analog phased-array repeaters with digitally-assisted frequency translation and phase adjustment in accordance with one or more aspects of the present disclosure.

FIG. 4 illustrates an example of a filtering technique 400 that supports analog phased-array repeaters with digitally-assisted frequency translation and phase adjustment in accordance with one or more aspects of the present disclosure. In some examples, filtering technique 400 may implement aspects of wireless communications systems 100 and 200. In filtering technique 400, a repeater (e.g., a repeater 140, a repeater 215, etc.) may utilize wideband analog heterodyning to perform a frequency translation to avoid interference from external signals.

A repeater may detect a set of RF signals 401. RF signals 401 may include a received desired signal 405-a (e.g., a signal including data that is to be repeated by the repeater, and retransmitted to another device), which may be received from a base station 105 or from a UE 115, or from another device. The repeater may also detect a set of interfering signals including a first interfering signal 410-a, (e.g., from a reflected image), a second interfering signal 415-a (e.g., from an RF jammer), and a transmission leakage RF signal 420-a (e.g., interference from transmissions by the repeater 215). Although each of these interfering signals are illustrated in filtering technique 400, the repeater may, in some cases, detect some of the signals, or one or more of each of these interfering signals. The examples given are for illustrative purposes and should not be considered limiting.

In some cases, filtering technique 400 may be utilized with wideband analog heterodyning techniques described herein, where a frequency used to receive a signal is significantly different from (e.g., in a different RF spectrum band) a frequency that is used to retransmit the signal (e.g., $f_0 \gg f_1$ or $f_1 \gg f_0$). Wideband analog heterodyning may describe a wireless repeater performing analog heterodyning rather than digital heterodyning. Filtering technique 400 associated with the wideband analog heterodyning may be applicable in scenarios where the wireless repeater is configured for performing a wideband frequency translation (e.g., where the difference between $f_0$ and $f_1$ satisfies a threshold). Wideband frequency translation may be utilized in some cases based on the frequency of one or more interfering signals and the frequency of the signal transmitted from the wireless device to the wireless repeater. In some cases, the wireless repeater may be configured (e.g., by a base station 105) for wideband analog heterodyning, and in other cases the wireless repeater may determine to perform wideband analog heterodyning.

In filtering technique 400, desired signal 405-a may in some cases be transmitted by a base station 105 or a UE 115 to the wireless repeater, and may have a center frequency at $f_0$. Interfering signal 410-a (e.g., an external image) may be detected by the wireless repeater and may have a center frequency $f_0 - f_{RFLO}$, where $f_{RFLO}$ is the RF of an LO. Interfering signal 415-a may also be detected by the repeater, which may be an example of RF jammer signals (e.g., one or more signals from an RF jammer). The wireless repeater may also detect a transmission leakage RF signal 420-a that may have a center frequency $f_1$. The interfering signals 415 may, for example, be generated from reflections due to clutter, mutual coupling, one or more jammers, or combinations thereof.

As illustrated, the repeater may first perform filtering using a microwave filter (e.g., a pre-selected microwave filter), which may filter the signals shown in 401 into the signals shown in 402. The microwave filter may partially reject nearby RF jammers, but may also have a low quality factor (Q factor) (e.g., a low-Q filter). For instance, through the performed microwave filtering, interfering signal 410-a may be reduced to interfering signal 410-b, which may a have a smaller amplitude, such that interfering signal 410-a no longer interferes (or has relatively less interference) with desired signal 405-b. The microwave filtering may also reduce the amplitude of transmission leakage RF signal 420-b, so that it also no longer interferes (or has relatively less interference) with desired signal 405-b. In some cases, the frequency and amplitude of interfering signal 415-a may remain unaffected, as shown by interfering signal 415-b.

The repeater may perform RF downconversion (e.g., by mixing the received RF signals with an output of an LO) to generate baseband signals. In such cases, the repeater may apply (e.g., during downconversion for more efficient processing) an intermediate frequency (IF) stage filter, transforming signals 402 into signals 403. In some cases, the IF stage filter may have a relatively higher Q factor (e.g., as compared to the microwave filter), and may yield improved rejection of adjacent channel blockers (such as interfering signal 415-a). The IF stage filtering may transform desired signal 405-b at $f_0$ so that the desired signal 405-b occurs at a different frequency, which may be at a low IF or a DC frequency. In some examples, the IF stage filtering may partially reject the interfering signal 415-b (e.g., the close-in jammer). For instance, the signal of interfering signal 415-c may be reduced in amplitude, but may still interfere with desired signal 405-c.

To further reduce the interference of interfering signal 415-c, the repeater may apply digital filtering to signals 403, resulting in signals 404. In some cases, the digital filtering may not affect desired signal 405-c, as desired signal 405-d may be at a DC or low IF frequency (e.g., due to the downconversion). The digital filtering by the repeater may further reduce the amplitude of interfering signal 415-c so that interfering signal 415-d no longer impacts desired signal 405-d.

Lastly, a repeater conducting wideband analog heterodyning may upconvert the desired signal 405-d to transform signals 404 to signals 406. The upconversion may translate the frequency of desired signal 405-d from a DC or low IF frequency into desired signal 405-e having a center frequency at $f_1$. The upconversion may in some cases translate the frequency of desired signal 405-e to the mmW frequency band.

Thus, through filtering technique 400, a repeater may remove interfering signals 410, 415, and 420 and heterodyne desired signal 405 from $f_0$ to $f_1$. Filtering technique 400 used with wideband analog heterodyning may be applicable in scenarios where a large frequency shift from $f_0$ to $f_1$ or vice versa (e.g., where $f_0$ and $f_1$ are relatively far apart) is appropriate or used to avoid interference from RF jammers, external images (e.g., physical blockers) or TX leakage. In other cases, where the difference between $f_0$ and $f_1$ may be relatively smaller due to the environment and the frequency interference within the environment, narrowband digital heterodyning may be utilized by a wireless repeater, as described herein in reference to filtering technique 500.

Figure 5:
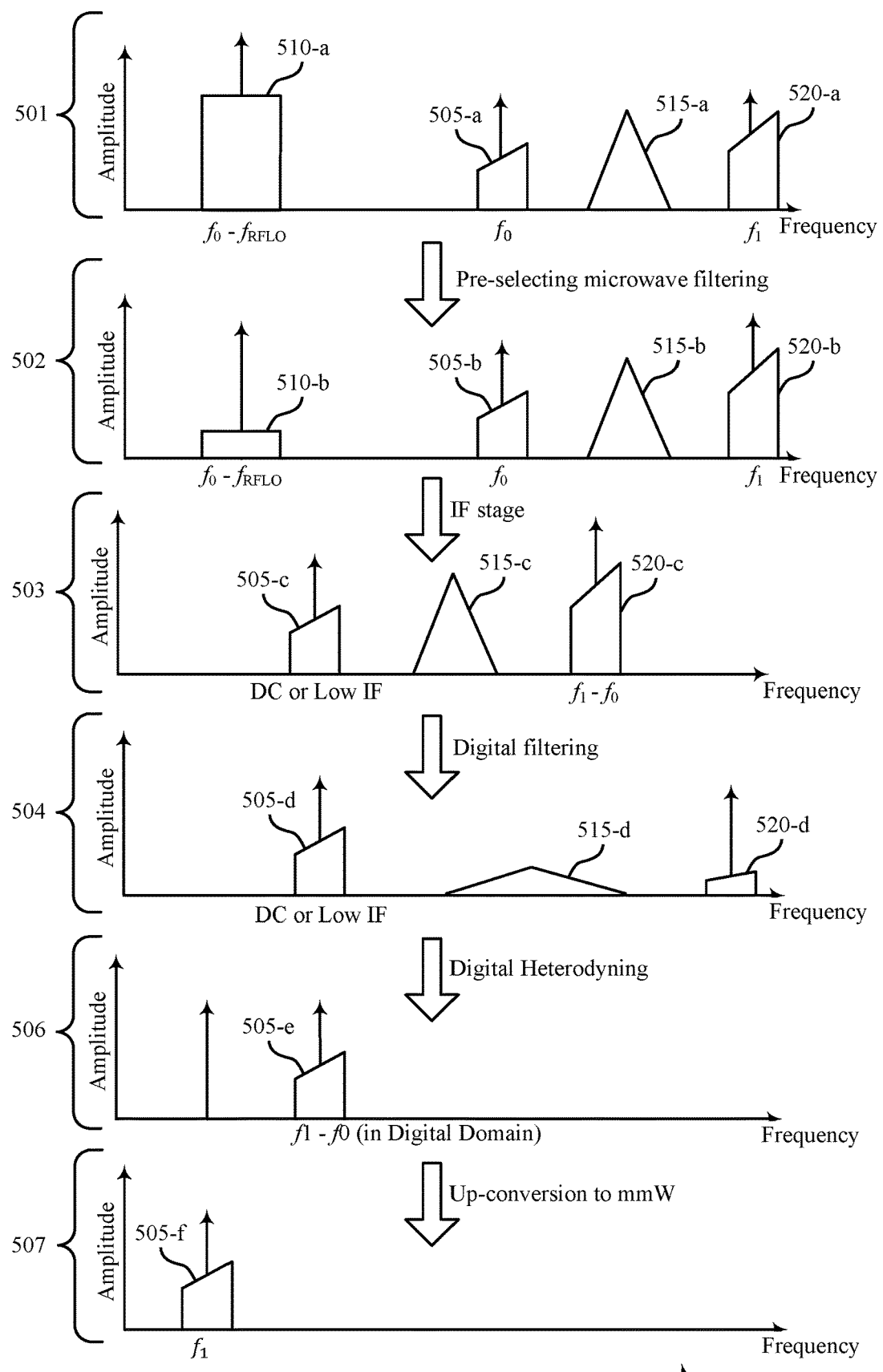

FIG. 5 illustrates an example of a filtering technique 500 that supports analog phased-array repeaters with digitally-assisted frequency translation and phase adjustment in accordance with one or more aspects of the present disclosure. In some examples, filtering technique 500 may implement aspects of wireless communications systems 100 and 200. In filtering technique 500, a repeater (e.g., a repeater 140, a repeater 215, or the like) may utilize narrowband digital heterodyning to perform a frequency translation to avoid interference from external signals.

A repeater may receive the set of RF signals 501. RF signals 501 may include desired signal 505-a (e.g., a signal including data that is to be repeated by the repeater, and retransmitted to another device), and the wireless repeater may also detect a set of interfering signals including a first interfering signal 510-a, (e.g., from a reflected image), a second interfering signal 515-a (e.g., from an RF jammer), and a transmission leakage RF interfering signal 520-a (e.g., interference from transmissions by the repeater 215). Although each of these interfering signals are illustrated in filtering technique 500, it is possible that only some of the signals, or one or more of each of the interfering signals, may be detected by the repeater.

In some cases, filtering technique 400 may be utilized with narrowband digital heterodyning techniques described herein, where a carrier frequency used to receive a signal at the repeater is different from, but relatively close to (e.g., in a same RF spectrum band), a carrier frequency that is used to retransmit the signal. For instance, the difference between a carrier Narrowband digital heterodyning may describe a wireless repeater performing digital heterodyning rather than analog heterodyning. Filtering technique 500 may be applicable in scenarios where the wireless repeater is configured for performing a narrowband frequency translation (e.g., where the difference between $f_0$ and $f_1$ satisfies a threshold). Narrowband frequency translation may be utilized in some cases depending on the frequency of the interfering signal and the frequency of the signal transmitted from the wireless device to the wireless repeater. In some examples, the wireless repeater may be configured (e.g., by a base station 105) for narrowband digital heterodyning, and in other cases the wireless repeater may determine to perform narrowband digital heterodyning. In some cases, narrowband digital heterodyning may also include the wireless repeater digitally applying a phase rotation correction to the transmitted signal prior to transmission to correct for phase rotation error caused by heterodyning the frequency from a first carrier frequency to a second carrier frequency.

Desired signal 505-a may be transmitted from a base station 105 or UE 115 to the wireless repeater at a center frequency of $f_0$. The wireless repeater may also detect external image interfering signal 510-a at a frequency $f_0 - f_{RFLO}$, where $f_{RFLO}$ is the frequency of the LO. The wireless repeater may also detect an interfering signal 515-a (e.g., from an RF jammer) and a transmission leakage interfering signal 520-a having a center frequency at $f_1$. A transmission leakage interfering signal 520 may be caused by a transmission from the wireless repeater interfering with reception by the wireless repeater at the receive antenna array of the wireless repeater.

A digital wireless repeater may perform microwave filtering of RF signals 501, which may be completed using a pre-selected microwave filter, which may filter the RF signals shown in 501 into the signals shown in 502. After the repeater pre-selects microwave filtering, interfering signal 510-a may be reduced to interfering signal 510-b, which may have a smaller amplitude, such that interfering signal 510-b no longer interferes with desired signal 505-b. In some examples, the microwave filtering may filter out the amplitudes or frequencies of interfering signal 515-b and 520-b.

The repeater may next apply an IF stage filter such that signals 503 may illustrate the result of the IF stage filtering. The IF stage filtering may transform desired signal 505-b at $f_0$ so that desired signal 505-c occurs at a different frequency, which may be at low IF or at a DC tone. The IF stage filtering may also shift the frequency of interfering signal 520-b at $f_1$ to interfering signal 520-c at a second frequency $f_1 - f_0$.

The repeater may next apply digital filtering to signals 503 to transform the signals 503 to signals 504. The digital filtering may not affect desired signal 505-c as desired signal 505-d may be at a DC or low IF. The digital filtering by the repeater may reduce the amplitude of interfering signal 515-c such that interfering signal 515-d no longer interferes with desired signal 505-d. The digital filtering by the repeater may also greatly decrease the amplitude of the transmission leakage interfering signal 520-c, so that the transmission leakage interfering signal 520-d also no longer interferes with desired signal 505-d.

As desired signal 505-d was transformed to a DC or low IF signal, the repeater may conduct digital heterodyning of signal 504 to translate signals 504 to signals 506. As the interfering signals 510, 515, and 520 have been filtered, only the desired signal 505-d may be affected by the digital heterodyning by the repeater. Desired signal 505-d may be translated to desired signal 505-e. The digital heterodyning may not change the amplitude of the desired signal 505-e, but may change the frequency of desired signal 505-e from a DC or low IF to a frequency $f_1 - f_0$ in the digital domain. As described herein, the digital heterodyning from desired signal 505-d to desired signal 505-e may also include a phase rotation correction to accommodate for the phase rotation error that may occur due to the change in frequency from the received frequency to the transmitted frequency within the digital repeater. The phase rotation error may be described with respect to Equation 4 and 5, and the phase rotation adjustment may be applied to counteract that phase rotation error. The phase rotation adjustment may be determined by the wireless repeater according to the following equation $$e^{-j2\pi f_n(t_{start,l}^\mu + N_{CP,l}^\mu T_c)} \quad (6)$$

where $f_n$ may be the frequency that the corresponding repeater transmits over. Further, $t_{start,l}^\mu$ is a starting position of an OFDM symbol l for a subcarrier spacing configuration $\mu$ in a subframe, $N_{CP,l}^\mu$ is a CP length in samples for the OFDM symbol l, and $T_c$ is the sampling interval in the baseband.

To complete the frequency translation of desired signal 505, the repeater may upconvert desired signal 505-e to translate the signals 506 to signals 507. The upconversion performed by the repeater may change the frequency of desired signal 505-e to a frequency within the mmW frequency band. The upconversion by the repeater may cause the frequency of desired signal 505-f to be adjusted to $f_1$, which may be the frequency at which the wireless repeater transmits the signal to another device, such as a UE 115 or base station 105. In some cases, the repeater may be configured with or dynamically adjust frequencies used for heterodyning a received signal based on different detected RF interference.

Figure 6:
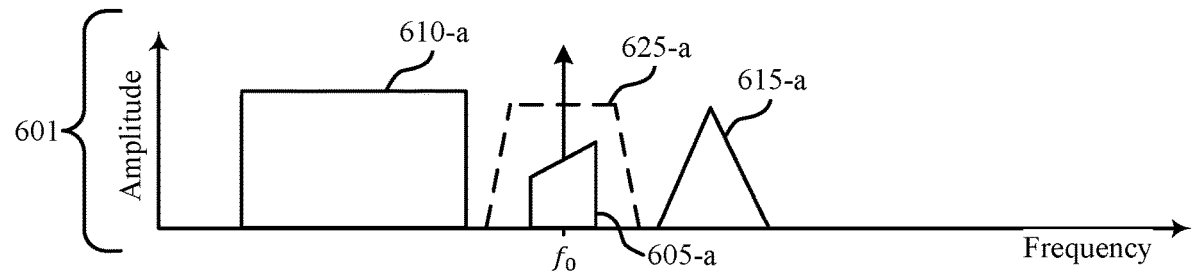
FIG. 6 illustrates an example of signaling that support analog phased-array repeaters with digitally-assisted frequency translation and phase adjustment in accordance with one or more aspects of the present disclosure.
Figure 6:
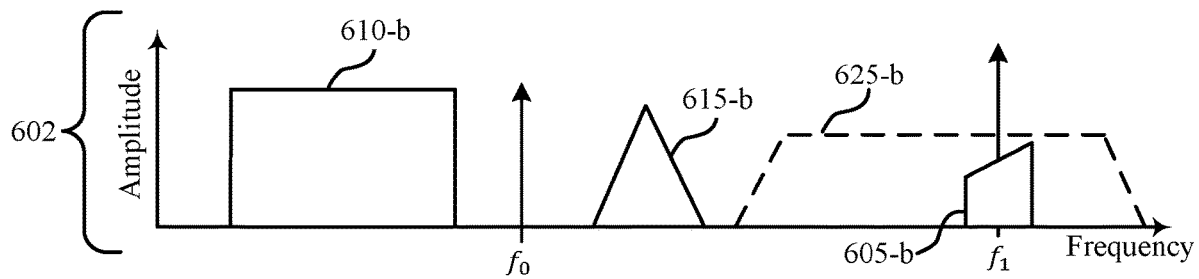

FIG. 6 illustrates an example of signaling 600 that supports analog phased-array repeaters with digitally-assisted frequency translation and phase adjustment in accordance with one or more aspects of the present disclosure. In some examples, signaling 600 may implement aspects of wireless communications systems 100 and 200. Signaling 600 may illustrate RF signals 601 and 602 received at a receiving device in cases where frequency translation is not performed and when frequency translation is performed, respectively. In the latter case, frequency translation may include digital heterodyning or analog heterodyning by a repeater, as described herein.

RF signals 601 may be received at a device, such as a UE 115 or base station 105. RF signals 601 may include desired signal 605-a, and a set of interfering signals including a first interfering signal 610-a, (e.g., from a reflected image) and a second interfering signal 615-a (e.g., from an RF jammer). Interfering signal 610-a and 615-a may interfere with reception at the device. For instance, the interfering signals 610-a and 615-a may represent signals at a UE 115 that affect the reception of a retransmitted signal sent from a repeater (e.g., a repeater 140, a repeater 215, etc.) to the UE 115. RF signals 601 may illustrate a set of RF signals 601 in cases where frequency translation is not performed by the repeater. In such cases, the filtering 625-a of a signal sent to the UE 115 may require a filter having a relatively narrow passband (e.g., such as a high-Q filter), which may, in some cases, be associated with higher complexity in tuning the filter to account for interfering signal 610-a and 615-a.

Alternatively, in cases where a repeater translates a frequency of a signal for the UE 115, relaxed filtering 625-b may be utilized. For instance, as illustrated by the RF signals 602, a desired signal 605-b may be translated from $f_0$ to $f_1$. Relaxed filtering 625-b (e.g., using a low-Q filter) may be utilized when the desired signal 605-b is heterodyned, where a wider passband (as compared to, for example, a high-Q filter) may be used in the presence of the interfering signals 610-b and 615-b. As such, the frequency translation applied to the desired signal 605-b may improve signal processing at a receiving device to reduce the impact of interfering signals 610-b and 615-b, thereby improving signal quality at the receiving device and increasing communications efficiency (e.g., due to fewer dropped or scrambled packets).

Figure 7:
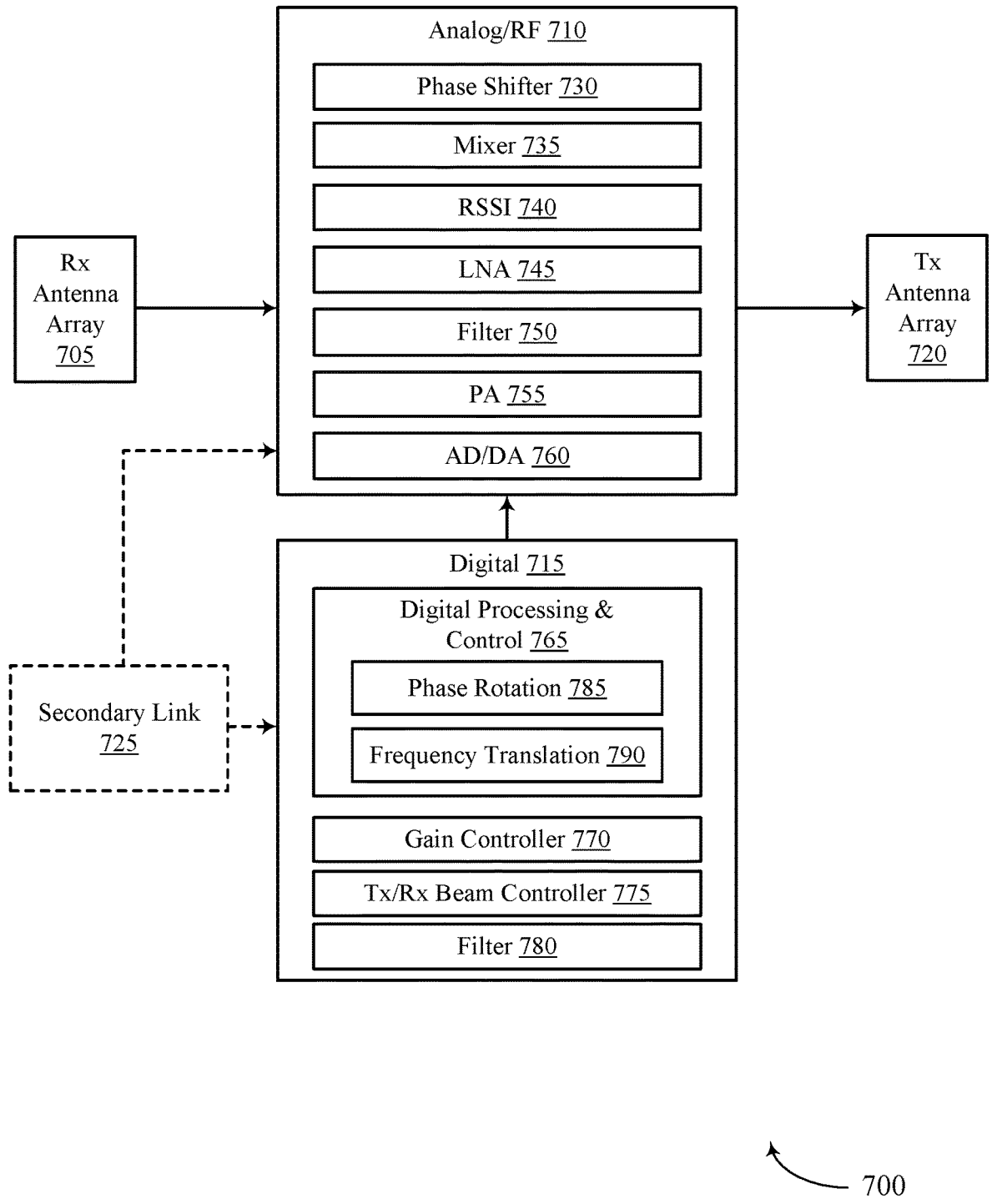
FIG. 7 illustrates an example of a diagram of an architecture that supports analog phased-array repeaters with digitally-assisted frequency translation and phase adjustment in accordance with one or more aspects of the present disclosure.

FIG. 7 illustrates an example of a diagram of an architecture 700 that supports analog phased-array repeaters with digitally-assisted frequency translation and phase adjustment in accordance with one or more aspects of the present disclosure. In some examples, Architecture 700 may be implemented by a repeater (e.g., a repeater 140, a repeater 215), as described with reference to FIGS. 1 and 2.

Architecture 700 may illustrate one or more aspects of a signal processing chain that supports analog heterodyning, digital heterodyning, and phase rotation adjustment. For instance, architecture 700 may include a receiving antenna array 705 (e.g., one or more antennas for receiving signals from another device), analog or RF circuit 710, digital circuit 715, and a transmitting antenna array 720 (e.g., one or more antennas for transmitting signals to another device). In some examples, receiving antenna array 705 or transmitting antenna array 720 may be examples of a phased array. In some cases, the receiving antenna array 705 and the transmitting antenna array 720 may include the same set of dual-pole antennas, where the dual pole antennas function in a first polarization (e.g., a vertical polarity or V-pol) as the array of reception antennas and the dual pole antennas function in a second polarization as the array of transmission antennas (e.g., a horizontal polarity or H-pol).

Architecture 700 may optionally include a secondary link component 725, which may be used for receiving information at the repeater over a link that is different from the link used for communicating over receiving antenna array 705 and TX antenna array. For instance, the secondary link component 725 may utilize wireless communications at a lower frequency than mmW communications received at receiving antenna array 705. As an example, the secondary link component may operate at RF spectrum bands for NB-IoT communications, Bluetooth communications, or the like. In any case, the repeater may receive control information (such as a configuration of the repeater, including beam direction, frequency gains, phase rotation, and frequency translation performed by the repeater) via the secondary link component 725. Additionally or alternatively, the configuration may be received as part of control signaling included in beamformed transmissions received via receiving antenna array 705.

As described in further detail with reference to FIGS. 8-15, the analog or RF circuit 710 may include various component used within a signal processing chain at a repeater. For example, the analog or RF circuit may include phase shifters 730, mixers 735, received signal strength indicator (RSSI) components 740, LNAs 745, filters 750, PAs 755, or analog to digital (A/D) converters or digital to analog (D/A) converters 760, or a combination thereof. In some cases, the analog or RF circuit 710 may be an example of the analog processing 315 described with reference to FIG. 3.

Further, the digital circuit 715 may include various components for signal processing with a signal processing chain at a repeater. As an example, digital circuit 715 may include one or more of digital processing and control circuitry 765, a gain controller 770, a transmit (TX)/receive (RX) beam controller 775 (which may, for example, be the same or different components), and filters 780. In some examples, the digital processing and control circuitry 765 may further include functionality for phase rotation 785 and frequency translation 790. In some cases, digital processing and control circuitry may be an example of the digital processing 318 as described with reference to FIG. 3. Additionally or alternatively, digital circuit 715 may be an example of the digital processing and control circuitry described with reference to FIGS. 8-15.

Additionally or alternatively, architecture 700 may include one or more of an interference manager, a phase rotation manager, a frequency translation manager, a configuration manager, a downconversion component, an analog filter component, a demodulator, a carrier frequency tracking manager, a link manager, a channel estimation component, and an upconversion component. Each of these modules may communicate, directly or indirectly, with one another (e.g., via one or more buses).

In some examples, the interference manager may identify one or more interfering signals affecting at least one of the first antenna array or a second antenna array of the repeating device. In some examples, the phase rotation manager (e.g., performing aspects of phase rotation 785) may acquire symbol timing information for each of one or more symbol periods of the received signal, where the phase rotation adjustment is applied to the one or more symbol periods based on the symbol timing information. In some cases, the phase rotation adjustment is based on Equation 6.

The frequency translation manager (e.g., performing aspects of phase rotation 785) may perform the frequency translation of the received signal from the first carrier frequency to the second carrier frequency based on the one or more interfering signals. In some examples, the frequency translation manager may determine that a difference between the first carrier frequency and the second carrier frequency satisfies a first threshold. In some examples, the frequency translation manager may perform analog heterodyning of the received signal from the first carrier frequency to the second carrier frequency based on the determination.

In some examples, the frequency translation manager may determine that a difference between the first carrier frequency and the second carrier frequency satisfies a second threshold. In some examples, the frequency translation manager may perform digital heterodyning of the received signal from the first carrier frequency to the second carrier frequency based on the determination. In some examples, the frequency translation manager may digitally heterodyne the digital signal from the first carrier frequency to the second carrier frequency. In some cases, the first carrier frequency is associated with a first radio frequency spectrum band and the second carrier frequency is associated with a second radio frequency spectrum band different from the first radio frequency spectrum band. In some cases, the first carrier frequency and the second carrier frequency are associated with a same radio frequency spectrum band.

The configuration manager may receive control information including a configuration for the repeater, where one or more of the frequency translation 790 or the phase rotation 785 is based on the configuration. In some cases, the configuration includes an indication of one or more transmission directions, one or more gains, a beam width for one or more transmission beams, a beam width for one or more receive beams, or a combination thereof.

The downconversion component may downconvert the received signal to a baseband signal. In some examples, the downconversion component may downconvert the received signal to an intermediate frequency signal. In some cases, the received signal is downconverted using a zero intermediate frequency (ZIF) architecture, low-IF architecture, or a super-heterodyne architecture. The analog filter component (e.g., performing aspects of filtering using filters 750) may identify a first analog filter for the received signal. In some examples, the analog filter component may filter the received signal using the first analog filter based on the one or more interfering signals.

In some examples, the analog filter component may identify a second analog filter for the received signal, the second analog filter including one or more of an intermediate frequency filter, a surface acoustic wave (SAW) filter, a bulk acoustic wave (BAW) filter, or a film bulk acoustic resonator (FBAR) filter. In some examples, the analog filter component may filter, during the downconverting, the received signal using the second analog filter based on the one or more interfering signals. In some examples, the analog filter component may filter the intermediate frequency signal using an analog filter, a SAW filter, a BAW filter, an FBAR filter, a digital filter, or a combinations thereof. In some cases, the first analog filter includes one or more of a microwave filter, an intermediate frequency filter, a SAW filter, a BAW filter, or a FBAR filter.

The A/D converter (e.g., included in AD/DA converters 760) may convert the received signal to a digital signal. In some examples, converting the received signal from an analog signal to a digital signal, where applying the phase rotation adjustment includes. The digital filter component (e.g., performing aspects of filtering using filters 780) may filter the digital signal based on the one or more interfering signals. The demodulator may demodulate the received signal. The carrier frequency tracking manager may identify one or more reference signals, one or more synchronization signal blocks, or a combination thereof, based on the demodulated signal. In some examples, the carrier frequency tracking manager may perform carrier frequency tracking based on the one or more reference signals, the one or more synchronization signal blocks, or a combination thereof, where the phase rotation adjustment is applied based on the carrier frequency tracking.

In some examples, the carrier frequency tracking manager may select the second carrier frequency based on a first VCO of a first PLL circuit and second VCO of a second PLL circuit, where the second carrier frequency is selected to avoid interference between the first VCO and the second VCO. In some cases, the carrier frequency tracking is performed using one or more PLL circuits. In some cases, a first PLL circuit of the one or more PLL circuits operates at a frequency including a difference between the first carrier frequency and the second carrier frequency.

In some cases, a second PLL circuit of the one or more PLL circuits operates at the first carrier frequency. The link manager (e.g., performing aspects of or included in TX/RX beam controller 775) may receive control information for the repeating device via a secondary link with another device, the secondary link being different from a link associated with the first antenna array. In some examples, the link manager may identify a clock signal associated with the secondary link. In some examples, the link manager may perform the carrier frequency tracking based on the identified clock signal.

The channel estimation component may perform a channel estimation and equalization on the received signal. The antenna gain manager (e.g., performing aspects of gain controller 770) may determine a first antenna gain associated with the first antenna array. In some examples, the antenna gain manager may determine a second antenna gain associated with the second antenna array. In some examples, the antenna gain manager may perform digital gain control for the first antenna array, the second antenna array, or a combination thereof, based on the first antenna gain and the second antenna gain. The upconversion component may upconvert the received signal from baseband using a ZIF architecture, IF architecture, or a super-heterodyne architecture.

A repeater implementing aspects of architecture 700 may include functionality of a base station 105 or UE 115 for repeating, extending, or redirecting wireless signals. In some cases, the wireless repeater may be used in LOS or NLOS scenarios. In a LOS scenario, transmissions, such as mmW transmissions, may be limited by path-loss through air, which may be overcome using beamforming techniques at the wireless repeater. In a NLOS scenario, such as in an urban area or indoors, mmW transmissions may be limited by signal blocking or signal interfering physical objects. A mmW beamforming repeater may be utilized to receive a signal from a base station 105 and transmit the signal to the UE 115 or receive a signal from a UE 115 and transmit the signal to the base station 105.

Moreover, a repeater implementing one or more aspects of architecture 700 may support phase rotation adjustments to received signals to adjust for the phase rotation error caused by heterodyning the frequency of the signal. For instance, the wireless repeater may be configured to apply, using architecture 700, a phase rotation adjustment to a heterodyned signal based on the carrier frequency that is used for transmitted the signal. More specifically, the wireless repeater may perform digital or analog heterodyning of a signal using one or more of the components of architecture 700. In some cases, the phase rotation adjustment may be selected from a set of phase rotation adjustments, which may be indexed, for example, in a table of phase rotation adjustments. The heterodyning, phase rotation correction, beamforming, filtering, and gain control techniques supported by architecture 700 may be utilized to improve signal quality between the base station 105, repeater, and UE 115 by isolating signals (e.g., via beamforming) and improving or maintaining stability within a signal processing chain of the repeater (e.g., via filtering, gain control, or combinations thereof).

In some cases, architecture 700, or its sub-components, may be implemented in hardware, code (e.g., software or firmware) executed by a processor, or any combination thereof. If implemented in code executed by a processor, the functions of the architecture 700, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The architecture 700, or its sub-components, may be physically located at various positions, including being distributed such that portions of functions are implemented at different physical locations by one or more physical components. In some examples, the architecture 700, or its sub-components, may be a separate and distinct component in accordance with various aspects of the present disclosure. In some examples, the architecture, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 8:
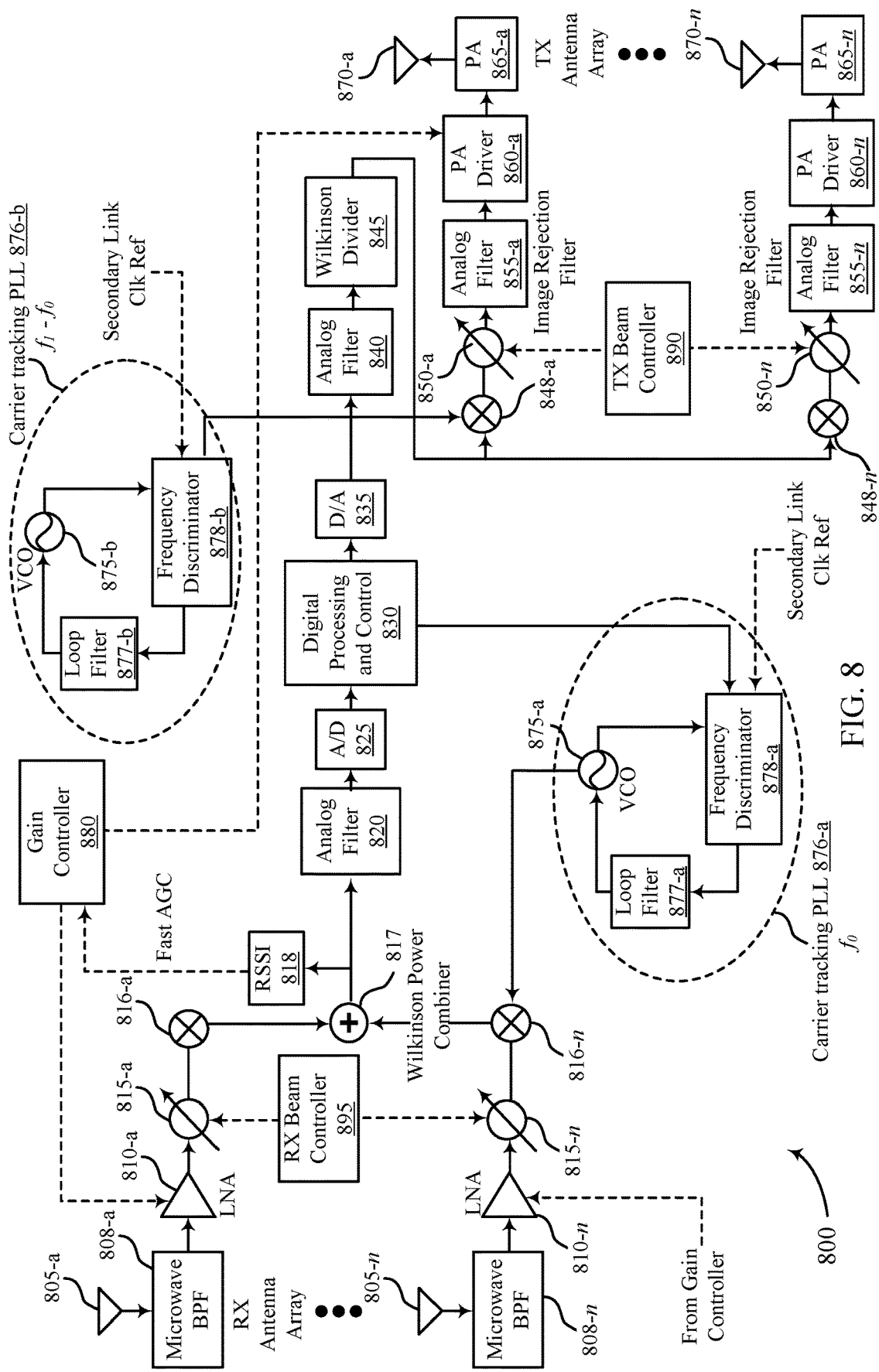
FIGS. 8 through 13 illustrate examples of circuit diagrams of signal processing chains that support analog phased-array repeaters with digitally-assisted frequency translation and phase adjustment in accordance with one or more aspects of the present disclosure.

FIG. 8 illustrates an example of a circuit diagram of a signal processing chain 800 that supports analog phased-array repeaters with digitally-assisted frequency translation and phase adjustment in accordance with one or more aspects of the present disclosure. In some examples, the circuit diagram of a signal processing chain 800 may implement aspects of wireless communications systems 100 and 200. Additionally, the aspects of the circuit diagram of the signal processing chain 800 may be an example of the architecture 700 described with reference to FIG. 7. For example, the circuit diagram of a signal processing chain 800 may be implemented in a repeater (e.g., a wireless repeater 215) in aspects of wireless communications system 200. The signal processing chain 800 includes a number of components between a receive antenna array including one or more antennas 805 and a transmit antenna array including one or more antennas 870, and may also include one or more microwave bandpass filter (BPF) 808 components, one or more low noise amplifier (LNA) 810 components, one or more phase shifter 815 components, one or more mixers 816 (e.g., downconversion mixers). The circuit diagram of a signal processing chain 800 may support digital frequency tracking, analog frequency translation, digital filtering and digital phase correction.

As illustrated, associated antennas 805-$a$ through 805-$n$ may receive a beamformed signal, which may be filtered through the microwave BPFs 808-$a$ through 808-$n$ and then routed to the LNAs 810-$a$ through 810-$n$, and phase shifters 815-$a$ through 815-$n$. The signal may be downconverted at mixers 816-$a$ through 816-$n$. The downconverted signal may be provided to combiner circuit 817, which may be an example of a Wilkinson power combiner or other RF signal combining circuit, that combines the instances of the received signal from the receive antennas 805 into a combined signal.

An analog filter 820 may be located after the combiner circuit 817, and may provide an indication of an RSSI 818 that may be used for fast AGC (e.g., and provided to a gain controller 880). The analog filter 820 may output a filtered signal to an A/D converter 825. The A/D converter 825 may convert the filtered signal to a digital filtered signal, which may be provided to digital processing and control circuitry 830. The digital processing and control circuitry 830 may perform digital processing, such as digital filtering, demodulation and decoding, channel estimation, carrier tracking, or combinations thereof, on the received filtered digital signal to output a processed digital signal. Additionally, the digital processing and control circuitry 830 may apply a phase rotation adjustment of the received signal. For example, the phase rotation adjustment may account for heterodyning of the received signal from a first carrier frequency to a second carrier frequency. In such cases, the phase rotation adjustment may be determined, for example, using Equation 6. In some cases, the digital processing and control circuitry 830 may output the processed digital signal to a D/A converter 835 that converts the estimate to an analog signal that is filtered by an analog filter 840. In some cases, filtering may use a combination of analog, piezo-electric (SAW/BAW/FBAR), and digital filters.

The signal may then be provided to a divider circuit 845, which may be an example of a Wilkinson power divider or other RF signal dividing circuit, which may divide the output of the analog filter 840 to a one or more transmit paths corresponding to the one or more antennas 870 of the transmit antenna array. Each transmit path may include a mixer 848 (e.g., an upconversion mixer), a phase shifter 850, an analog filter 855, a PA driver 860, and PA 865. In some examples, each analog filter (e.g., analog filter 855-$a$ through 855-$n$) may perform image rejection of microwave signals. In some examples, the gain controller 880 may adjust a gain of one or more of the PA drivers 860, the gain of the LNAs 810, or any combinations thereof. This adjustment may be based on the monitored output and the RSSI 818. Accordingly, the gain controller 880 may increase or maintain stability of signal transmission within the signal processing chain.

In some cases, components between the RX antenna array including antennas 805 and the TX antenna array including antennas 870 may be considered the signal processing chain and may be implemented using an RFIC, one or more digital processing components, or combinations thereof. The baseband signals may be downconverted or upconverted by mixing a signal at an LO frequency that is generated by a VCO 875. For instance, at the one or more mixers 816, the downconversion may include mixing a signal generated by a VCO 875. In this example, a first carrier tracking PLL 876-a may tune the VCO 875-a using a first loop filter 877-a and a first frequency discriminator 878-a, where the first carrier tracking PLL 876-a may be associated with a first carrier frequency (e.g., $f_0$). Likewise, the upconversion of the signal at the one or more mixers 848 may mix a signal generated by a VCO 875. Here, a second carrier tracking PLL 876-b may tune the VCO 875-a using a first loop filter 877-b and second frequency discriminator 878-b, where the first carrier tracking PLL may be associated with a difference between the first carrier frequency and a second carrier frequency (e.g., $f_1-f_0$), which may translate the receive signal to a desired carrier frequency (e.g., $f_1$). In such cases, a difference between the first carrier frequency and second carrier frequency may be large enough to avoid VCO injection pulling while enabling analog heterodyning of a received signal. As an example, the carrier frequency the signal was received on (e.g., $f_0$) may be far enough away (e.g., enabling better filtering) from a second frequency that the signal is to be heterodyned to (e.g., $f_1$), that more than one carrier tracking PLL 876 may be used by the repeater.

In some cases, and as described herein, an optional secondary link may be used, and may provide a clock reference for each carrier tracking PLL 876. For instance, the secondary link may be provided between a base station 105 and the repeater, and may be used as a reference by which to produce the frequency generated by one or both of the first carrier tracking PLL 876-a and 876-b. In such cases, the use of the reference clock from the secondary link may enable a reduced amount of digital processing (e.g., beam modulation) at the repeater, thus improving the efficiency of the signal processing chain 800.

In some cases, the upconversion and downconversion may be performed with ZIF, low-IF, or super-heterodyne RF architectures. Different frequency synthesizers (e.g., different from the carrier tracking PLLs 876 illustrated) may be used for the upconversion, downconversion, or heterodyning of a signal by the repeater.

In some cases, an RX beam controller 890 may provide signals applied to respective phase shifters 815 (e.g., phase shifters 815-a through 815-n). Likewise, TX beam controller 895 may provide signals applied to respective phase shifters 850 (e.g., phase shifters 850-a through 850-n). In some examples, the phase shifters 815 and mixers 816 (or the phase shifters 850 and mixers 848) may be combined within a single component. Further, the location of the various components may be different from that shown. For instance, the one or more mixers 816 may be located at a different location of the signal processing chain 800.

The circuit diagram of a signal processing chain 800 may include various aspects and components as described in architecture 700. The particular architecture selected to implement a circuit such as signal processing chain 800 may be based on desired linearity, range, die-size, power of RF components, or any combinations thereof. The example architecture provided for signal processing chain is just one example, and as described herein, other configurations may be utilized, in addition to those not explicitly described herein.

Figure 9:
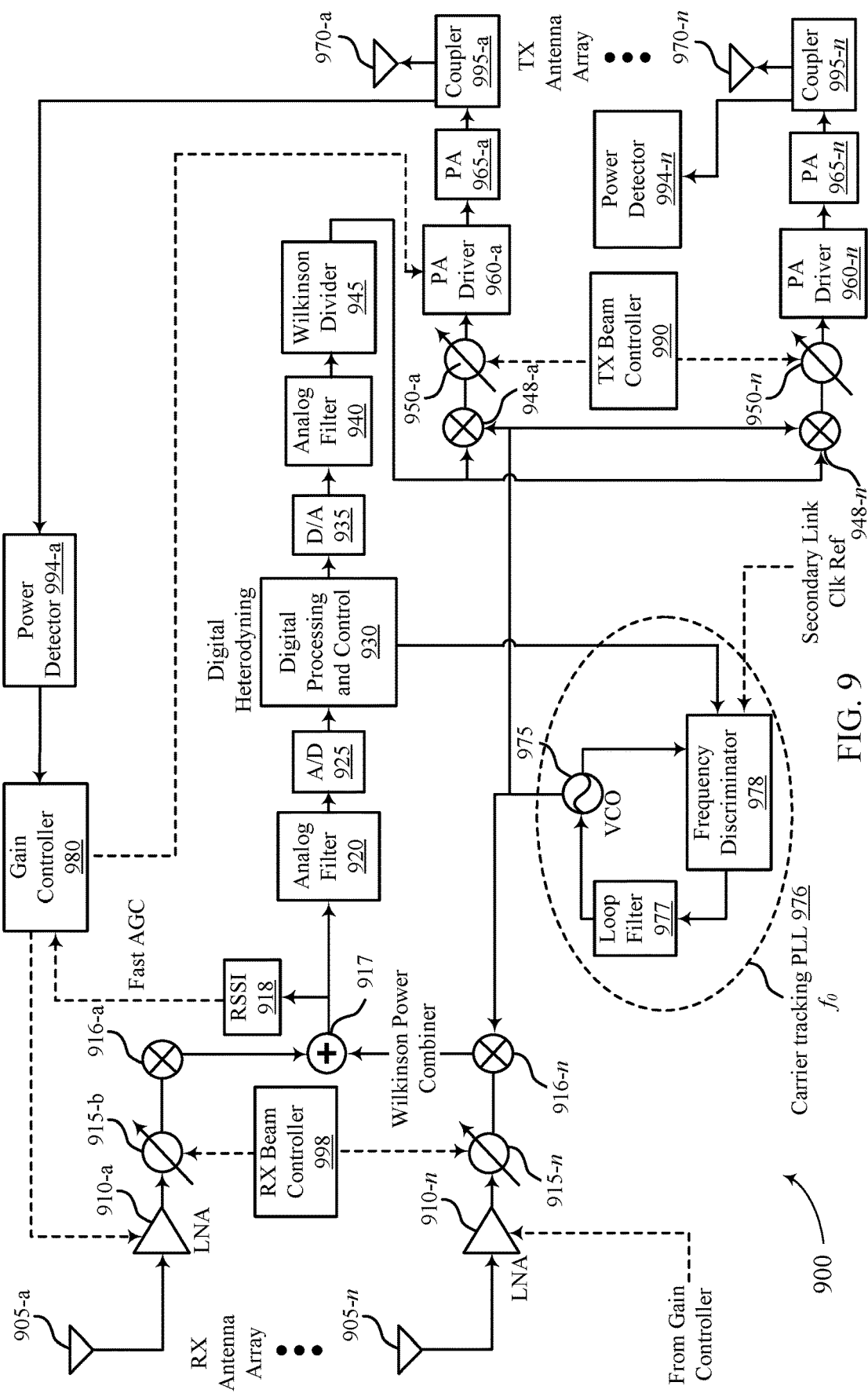

FIG. 9 illustrates an example of a circuit diagram of a signal processing chain 900 that supports analog phased-array repeaters with digitally-assisted frequency translation and phase adjustment in accordance with one or more aspects of the present disclosure. In some examples, the circuit diagram of a signal processing chain 900 may implement aspects of wireless communications systems 100 and 200. Additionally, the aspects of the circuit diagram of the signal processing chain 900 may be an example of the architecture 700 described with reference to FIG. 7. For example, the circuit diagram of a signal processing chain 900 may be implemented in a repeater (e.g., a wireless repeater 215) in aspects of wireless communications system 200. The signal processing chain 900 includes a number of components between a receive antenna array including one or more antennas 905 and a transmit antenna array including one or more antennas 970, and may further include one or more LNA 910 components, one or more phase shifter 915 components, one or more mixers 916 (e.g., downconversion mixers). The circuit diagram of a signal processing chain 900 may support digital frequency tracking, digital frequency translation and phase-rotation, digital filtering, and digital control via mmW link.

The signal processing chain 900 in this example may use dual LNA, single PLL, and dual PA for receiving and transmitting signals, and includes a number of components between a receive antenna array (e.g., including antenna(s) 905) and a transmit antenna array (e.g., including antenna(s) 970). As illustrated, associated antennas 905-a through 905-n may receive a beamformed signal, which may be routed to the LNAs 910-a through 910-n, and phase shifters 915-a through 915-n. The signal may be downconverted at mixers 916-a through 916-n. The downconverted signal may be provided to combiner circuit 917, which may be an example of a Wilkinson power combiner or other RF signal combining circuit, that combines the instances of the received signal from the receive antennas 905 into a combined signal.

An analog filter 920 may be located after the combiner circuit 917, which may also provide an indication of an RSSI 918 that may be used for fast AGC (e.g., and provided to a gain controller 980). The analog filter 920 may output a filtered signal to an A/D converter 925. The A/D converter 925 may convert the filtered signal to a digital filtered signal, which may be provided to digital processing and control circuitry 930. The digital processing and control circuitry 930 may perform digital processing, such as digital filtering, demodulation and decoding, channel estimation, carrier tracking, or combinations thereof, on the received filtered digital signal to output a processed digital signal. Additionally, the digital processing and control circuitry 930 may apply a phase rotation adjustment of the received signal. For example, the phase rotation adjustment may account for heterodyning of the received signal from a first carrier frequency to a second carrier frequency. In such cases, the phase rotation adjustment may be determined using Equation 6. In some cases, the digital processing and control circuitry 930 may output the processed digital signal to a D/A converter 935 that converts the estimate to an analog signal that is filtered by an analog filter 940. In some cases, filtering may use a combination of analog, piezo-electric (SAW/BAW/FBAR), and digital filters.

The signal may then be provided to a divider circuit 945, which may be an example of a Wilkinson power divider or other RF signal dividing circuit, which may divide the output of the analog filter 940 to a one or more transmit paths corresponding to the one or more antennas 970 of the transmit antenna array. Each transmit path may include a mixer 948 (e.g., an upconversion mixer), a phase shifter 950, an analog filter 955, a PA driver 960, PA 965, and coupler 995. In some examples, the gain controller 980 may adjust a gain of one or more of the PA drivers 960, the gain of the LNAs 910, or any combinations thereof. This adjustment may be based on the monitored output and the RSSI 918. Accordingly, the gain controller 980 may increase or maintain stability of signal transmission within the signal processing chain. In some cases, each coupler 995 may transmit output information to a power detector 994. For example, coupler 995-*a* may transmit to a power detector 994-*a* which may transmit signaling to gain controller 980, where the power detector(s) 994-*a* may be coupled to each of the transmit paths via the couplers 995-*a* and monitor the output of the PAs 965 of each transmit path. The couplers 995 and power detectors 994 may include respective feedback paths, which are coupled to the gain controller 980. This path may aid in determining the power of received RF signals, including interfering signals.

In some cases, components between the RX antenna array including antennas 905 and the TX antenna array including antennas 970 may be considered the signal processing chain and may be implemented using an RFIC, one or more digital processing components, or combinations thereof. The baseband signals may be downconverted or upconverted by mixing a signal at an LO frequency that is generated by a VCO 975. For instance, at the one or more mixers 916, the downconversion may include mixing a signal generated by a VCO 975. In this example, a carrier tracking PLL 976 may tune the VCO 975 using a loop filter 977 and a first frequency discriminator 978, where the carrier tracking PLL 976 may be associated with a first carrier frequency (e.g., $f_0$).

In some cases, and as described herein, an optional secondary link may be used, and may provide a clock reference for each carrier tracking PLL 976. For instance, the secondary link may be provided between a base station 105 and the repeater, and may be used as a reference by which to produce the frequency generated by carrier tracking PLL 976. In such cases, the use of the reference clock from the secondary link may enable a reduced amount of digital processing (e.g., beam modulation) at the repeater, thus improving the efficiency of the signal processing chain 900.

In some cases, the upconversion and downconversion may be performed with ZIF, low-IF, or super-heterodyne RF architectures. Different frequency synthesizers (e.g., different from the carrier tracking PLL 976 illustrated) may be used for the upconversion, downconversion, or heterodyning of a signal by the repeater.

In some cases, an RX beam controller 998 may provide signals applied to respective phase shifters 915 (e.g., phase shifters 915-*a* through 915-*n*). Likewise, TX beam controller 990 may provide signals applied to respective phase shifters 950 (e.g., phase shifters 950-*a* through 950-*n*). In some examples, the phase shifters 915 and mixers 916 (or the phase shifters 950 and mixers 948) may be combined within a single component. Further, the location of the various components may be different than that shown. For instance, the one or more mixers 916 may be located at a different location of the signal processing chain 900.

The particular architecture selected to implement a circuit such as signal processing chain 900 may be based on desired linearity, range, die-size, power of RF components, or any combinations thereof. The example architecture provided for signal processing chain is just one example, and as described herein, other configurations may be utilized, in addition to those not explicitly described herein.

Figure 10:
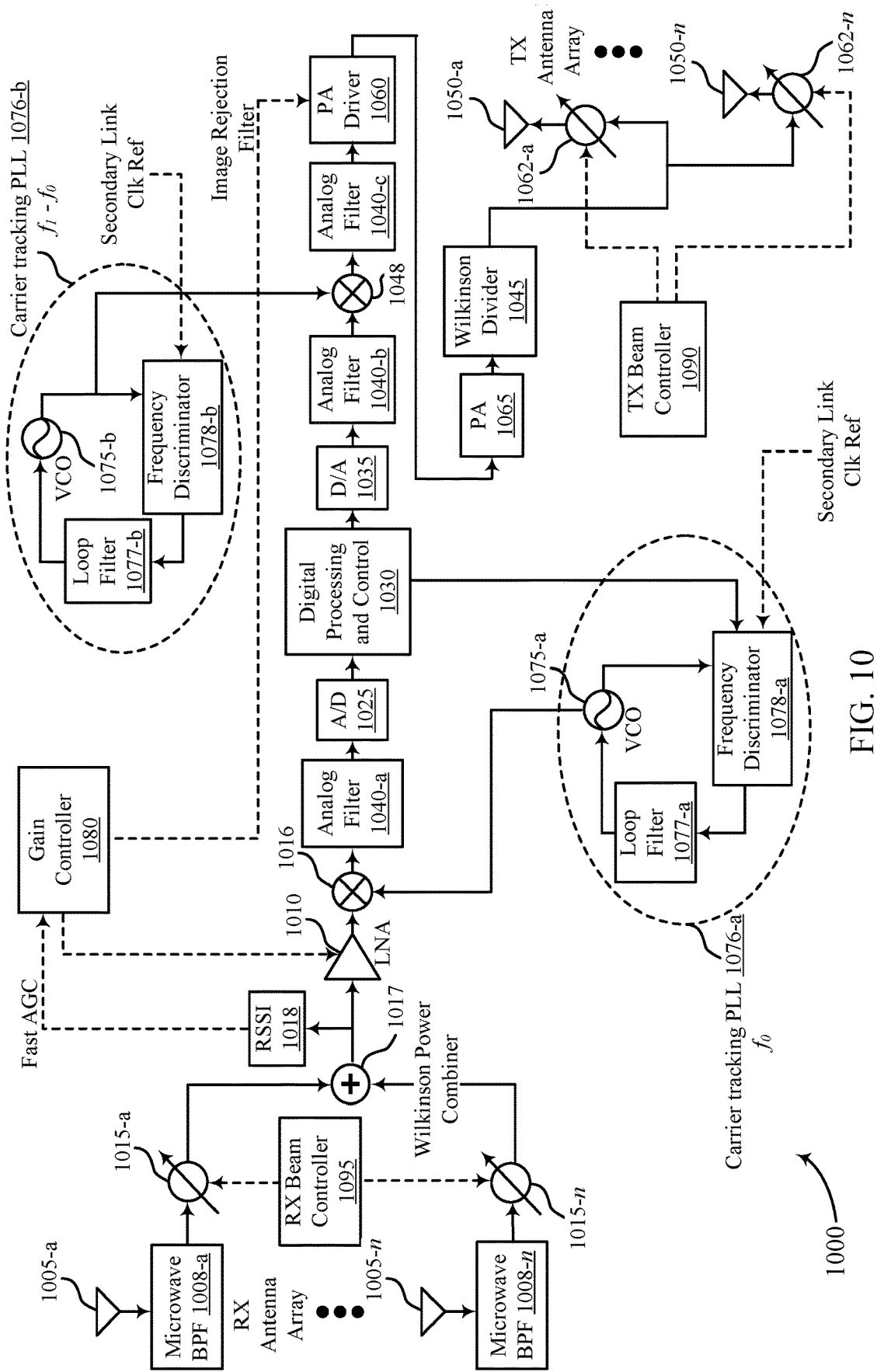

FIG. 10 illustrates an example of a circuit diagram of a signal processing chain 1000 that supports analog phased-array repeaters with digitally-assisted frequency translation and phase adjustment in accordance with one or more aspects of the present disclosure. In some examples, the circuit diagram of a signal processing chain 1000 may implement aspects of wireless communications systems 100 and 200. Additionally, the aspects of the circuit diagram of the signal processing chain 1000 may be an example of the architecture 700 described with reference to FIG. 7. For example, the circuit diagram of a signal processing chain 1000 may be implemented in a repeater (e.g., a wireless repeater 215) in aspects of wireless communications system 200. The signal processing chain 1000 includes a number of components between a receive antenna array including one or more antennas 1005 and a transmit antenna array including one or more antennas 1050, and may further include one or more BPF 1008 components, one or more LNA 1010 components, one or more phase shifter 1015 components, one or more mixers 1016 (e.g., downconversion mixers). The circuit diagram of a signal processing chain 1000 may support the use of a single RF chain, digital frequency tracking, digital time tracking, analog frequency translation, digital phase-rotation adjustment, digital filtering, and may optionally support digital control signaling over a mmW link.

The signal processing chain 1000 in this example uses single LNA, dual PLL, and dual PA for receiving and transmitting signals, and includes a number of components between a receive antenna array (e.g., including antenna(s) 1005) and a transmit antenna array (e.g., including antenna(s) 1050). As illustrated, antennas 1005-*a* through 1005-*n* may receive a beamformed signal, which may be filtered through the BPFs 1008-*a* through 1008-*n* (e.g., microwave BPFs). In this example, phase shifters 1015-*a* through 1015-*n* may be associated with each antenna 1005 (e.g., an antenna element) of the receive antenna array. In some examples, the RX beam controller 1095 may route the signals to a combiner 1017, which may be an example of a Wilkinson Power Combiner or other RF signal combining circuit that combines the instances of the signal into a combined signal. The combined signal may be provided to an estimator for RSSI 1018, which may determine, for example, RSSI for fast AGC. An LNA 1010 may receive the combined signal and amplify the signal based on input from gain controller 1080.

A mixer 1016 may receive the amplified signal, along with inputs from carrier tracking PLL 1076-*a*. Mixer 1016 may output the signal to analog filter 1040, which may output a filtered signal to an A/D converter 1025. The A/D converter 1025 may convert the filtered signal to a digital filtered signal, which may be provided to digital processing and control circuitry 1030. The digital processing and control circuitry 1030 may perform digital processing, such as digital filtering, demodulation and decoding, channel estimation, carrier tracking, or combinations thereof, on the received filtered digital signal to output a processed digital signal. Additionally, the digital processing and control circuitry 1030 may apply a phase rotation adjustment of the received signal. For example, the phase rotation adjustment may account for heterodyning of the received signal from a first carrier frequency to a second carrier frequency. In such cases, the phase rotation adjustment may be determined using Equation 6. In some cases, the digital processing and control circuitry 1030 may output the processed digital signal to a D/A converter 1035 that converts the estimate to an analog signal that is filtered by an analog filter 1040-*b*. In some cases, filtering may use a combination of analog, piezo-electric (SAW/BAW/FBAR), and digital filters.

The signal from analog filter 1040-*a* may be transmitted to a mixer 1048, which may output the signal to another analog filter 1040-*c*. The signal may then be provided to a PA driver 1060 and a PA 1065, and then to divider circuit 1045, which may be an example of Wilkinson power divider or other RF signal dividing circuit, which may divide the output of the analog filter 1040 to a one or more transmit paths corresponding to the one or more antennas 1050 of the transmit antenna array. Each transmit path may include a phase shifter 1062. In some examples, the gain controller 1080 may adjust a gain of PA driver 1060, the gain of LNA 1010, or any combinations thereof. This adjustment may be based on the monitored output and the RSSI 1018. Accordingly, the gain controller 1080 may increase or maintain stability of signal transmission within the signal processing chain.

In some cases, components between the RX antenna array including antennas 1005 and the TX antenna array including antennas 1050 may be considered the signal processing chain and may be implemented using an RFIC, one or more digital processing components, or combinations thereof. The baseband signals may be downconverted or upconverted by mixing a signal at an LO frequency that is generated by a VCO 1075. For instance, at mixer 1016, the downconversion may include mixing a signal generated by a VCO 1075-*a*. In this example, a first carrier tracking PLL 1076-*a* may tune the VCO 1075-*a* using a first loop filter 1077-*a* and a first frequency discriminator 1078-*a*, where the first carrier tracking PLL 1076-*a* may be associated with a first carrier frequency (e.g., $f_0$). Likewise, the upconversion of the signal at the one or more mixers 1048 may mix a signal generated by a VCO 1075. Here, a second carrier tracking PLL 1076-*b* may tune the VCO 1075-*b* using a first loop filter 1077-*b* and second frequency discriminator 1078-*b*, where the first carrier tracking PLL 1076-*b* may be associated with a difference between the first carrier frequency and a second carrier frequency (e.g., $f_1 - f_0$), which may translate the receive signal to a desired carrier frequency (e.g., $f_1$). In such cases, a difference between the first carrier frequency and second carrier frequency may be large enough to avoid VCO injection pulling while enabling analog heterodyning of a received signal. As an example, the carrier frequency the signal was received on (e.g., $f_0$) may be far enough away (e.g., enabling better filtering) from a second frequency that the signal is to be heterodyned to (e.g., $f_1$), that more than one carrier tracking PLL 1076 may be used by the repeater.

In some cases, and as described herein, an optional secondary link may be used, and may provide a clock reference for each carrier tracking PLL 1076. For instance, the secondary link may be provided between a base station 105 and the repeater, and may be used as a reference by which to produce the frequency generated by one or both of the first carrier tracking PLL 1076-*a* and 1076-*b*. In such cases, the use of the reference clock from the secondary link may enable a reduced amount of digital processing (e.g., beam modulation) at the repeater, thus improving the efficiency of the signal processing chain 1000.

In some cases, the upconversion and downconversion may be performed with ZIF, low-IF, or super-heterodyne RF architectures. Different frequency synthesizers (e.g., different from the carrier tracking PLLs 1076 illustrated) may be used for the upconversion, downconversion, or heterodyning of a signal by the repeater.

The circuit diagram of a signal processing chain 1000 may include various aspects and components as described in architecture 700 and signal processing chains 800 and 900. The particular architecture selected to implement a circuit such as signal processing chain 1000 may be based on desired linearity, range, die-size, power of RF components, or any combinations thereof. The example architecture provided for signal processing chain is just one example, and as described herein other configurations may be utilized, in addition to those not explicitly described herein.

Figure 11:
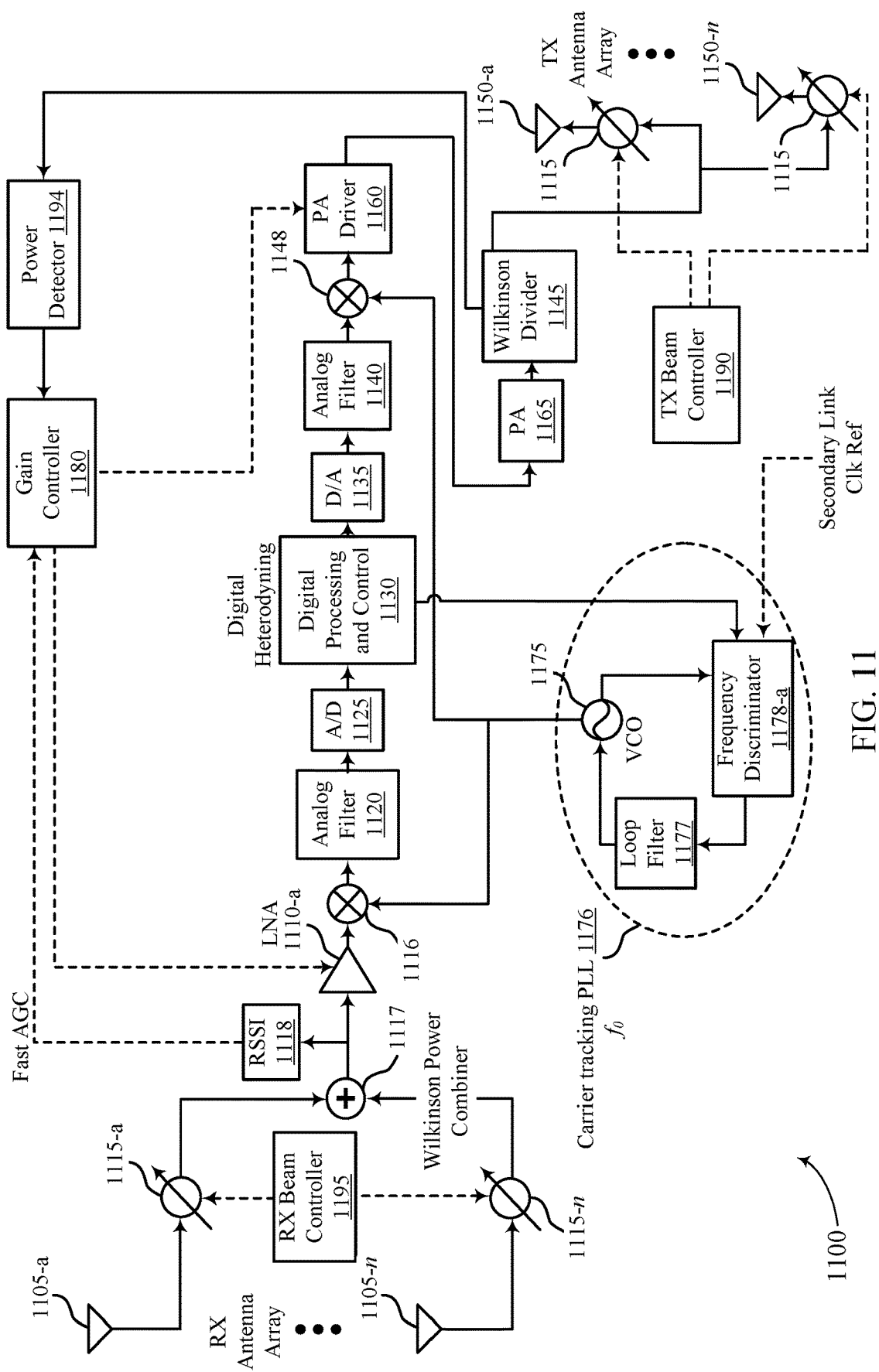

FIG. 11 illustrates an example of a circuit diagram of a signal processing chain 1100 that supports analog phased-array repeaters with digitally-assisted frequency translation and phase adjustment in accordance with one or more aspects of the present disclosure. In some examples, the circuit diagram of a signal processing chain 1000 may implement aspects of wireless communications systems 100 and 200. Additionally, the aspects of the circuit diagram of the signal processing chain 1100 may be an example of the architecture 700 described with reference to FIG. 7. For example, the circuit diagram of a signal processing chain 1100 may be implemented in a repeater (e.g., a wireless repeater 215) in aspects of wireless communications system 200. The signal processing chain 1100 includes a number of components between a receive antenna array including one or more antennas 1105 and a transmit antenna array including one or more antennas 1150, and may further include one or more LNA 1110 components, one or more phase shifter 1115 components, and one or more mixers 1116 (e.g., downconversion mixers). The circuit diagram of a signal processing chain 1100 may support the use of a single RF chain, digital frequency tracking, digital time tracking, digital frequency translation, digital phase-rotation adjustment, digital filtering, and in some cases digital control via mmW link.

The signal processing chain 1100 in this example uses single LNA, single PLL and single PA for receiving and transmitting signals, and includes a number of components between a receive antenna array (e.g., including antennas 1105) and a transmit antenna array (e.g., including antennas 1150). As illustrated, antennas 1105-*a* through 1105-*n* may receive a beamformed signal, which may be transmitted to phase shifters 1115. In this example, phase shifters 1115-*a* through 1115-*n* may be associated with each antenna element (e.g., antenna 1105) of the receive antenna array. In some examples, the RX beam controller 1195 may route the signals to a combiner 1117, which may be an example of a Wilkinson Power Combiner or other RF signal combining circuit that combines the instances of the signal into a combined signal. The combined signal may be provided to an estimator for RSSI 1118, which may determine, for example, RSSI for fast AGC. An LNA 1110-*a* may receive the combined signal and amplify the signal based on input from gain controller 1180.

A mixer 1116-*a* may receive the amplified signal, along with inputs from carrier tracking PLL 1176-*a*. Mixer 1116 may output the signal to analog filter 1120, which may output a filtered signal to an A/D converter 1125. The A/D converter 1125 may convert the filtered signal to a digital filtered signal, which may be provided to digital processing and control circuitry 1130. The digital processing and control circuitry 1130 may perform digital processing, such as digital filtering, demodulation and decoding, channel estimation, carrier tracking, or combinations thereof, on the received filtered digital signal to output a processed digital signal. Additionally, the digital processing and control circuitry 1130 may apply a phase rotation adjustment of the received signal. For example, the phase rotation adjustment may account for heterodyning of the received signal from a first carrier frequency to a second carrier frequency. In such cases, the phase rotation adjustment may be determined using an Equation 6. In some cases, the digital processing and control circuitry 1130 may output the processed digital signal to a D/A converter 1135 that converts the estimate to an analog signal that is filtered by an analog filter 1140. In some cases, filtering may use a combination of analog, piezo-electric (SAW/BAW/FBAR), and digital filters.

The signal may be provided to combiner 1148 which may receive input from VCO 1175 and may transmit the combined signal to a PA driver 1160 and a PA 1165, and then to divider circuit 1145, which may be an example of a Wilkinson power divider or other RF signal dividing circuit. Divider circuit 1145 may divide the output of the PA 1165 to a one or more transmit paths corresponding to the one or more antennas 1150 of the transmit antenna array. Each transmit path may include a phase shifter 1115. In some examples, each analog filter (e.g., analog filter 1120 and 1140) may perform image rejection of microwave signals. In some examples, the gain controller 1080 may adjust a gain of one or more of the PA drivers 1160, the gain of the LNAs 1110, or any combinations thereof. This adjustment may be based on the monitored output and the RSSI 1118. Accordingly, the gain controller 1180 may increase or maintain stability of signal transmission within the signal processing chain.

In some cases, components between the RX antenna array including antennas 1105 and the TX antenna array including antennas 1150 may be considered the signal processing chain and may be implemented using an RFIC, one or more digital processing components, or combinations thereof. The baseband signals may be downconverted or upconverted by mixing a signal at an LO frequency that is generated by a VCO 1175. For instance, at mixer 1116, the downconversion may include mixing a signal generated by a VCO 1175. In this example, a first carrier tracking PLL 1176 may tune the VCO 1175 using a first loop filter 1177 and a first frequency discriminator 1178, where the first carrier tracking PLL 1176 may be associated with a first carrier frequency (e.g., $f_0$).

In some cases, and as described herein, an optional secondary link may be used, and may provide a clock reference for each carrier tracking PLL 1176. For instance, the secondary link may be provided between a base station 105 and the repeater, and may be used as a reference by which to produce the frequency generated by carrier tracking PLL 1176. In such cases, the use of the reference clock from the secondary link may enable a reduced amount of digital processing (e.g., beam modulation) at the repeater, thus improving the efficiency of the signal processing chain 1100.

In some cases, the upconversion and downconversion may be performed with ZIF, low-IF, or super-heterodyne RF architectures. Different frequency synthesizers (e.g., different from the carrier tracking PLLs 1176 illustrated) may be used for the upconversion, downconversion, or heterodyning of a signal by the repeater, or a combination of these.

The circuit diagram of a signal processing chain 1100 may include various aspects and components as described in architecture 700 as well as signal processing chains 800, 900, and 1000. The particular architecture selected to implement a circuit such as signal processing chain 1100 may be based on desired linearity, range, die-size, power of RF components, or any combinations thereof. The example architecture provided for signal processing chain is just one example, and as described herein, other configurations may be utilized, in addition to those not explicitly described herein.

Figure 12:
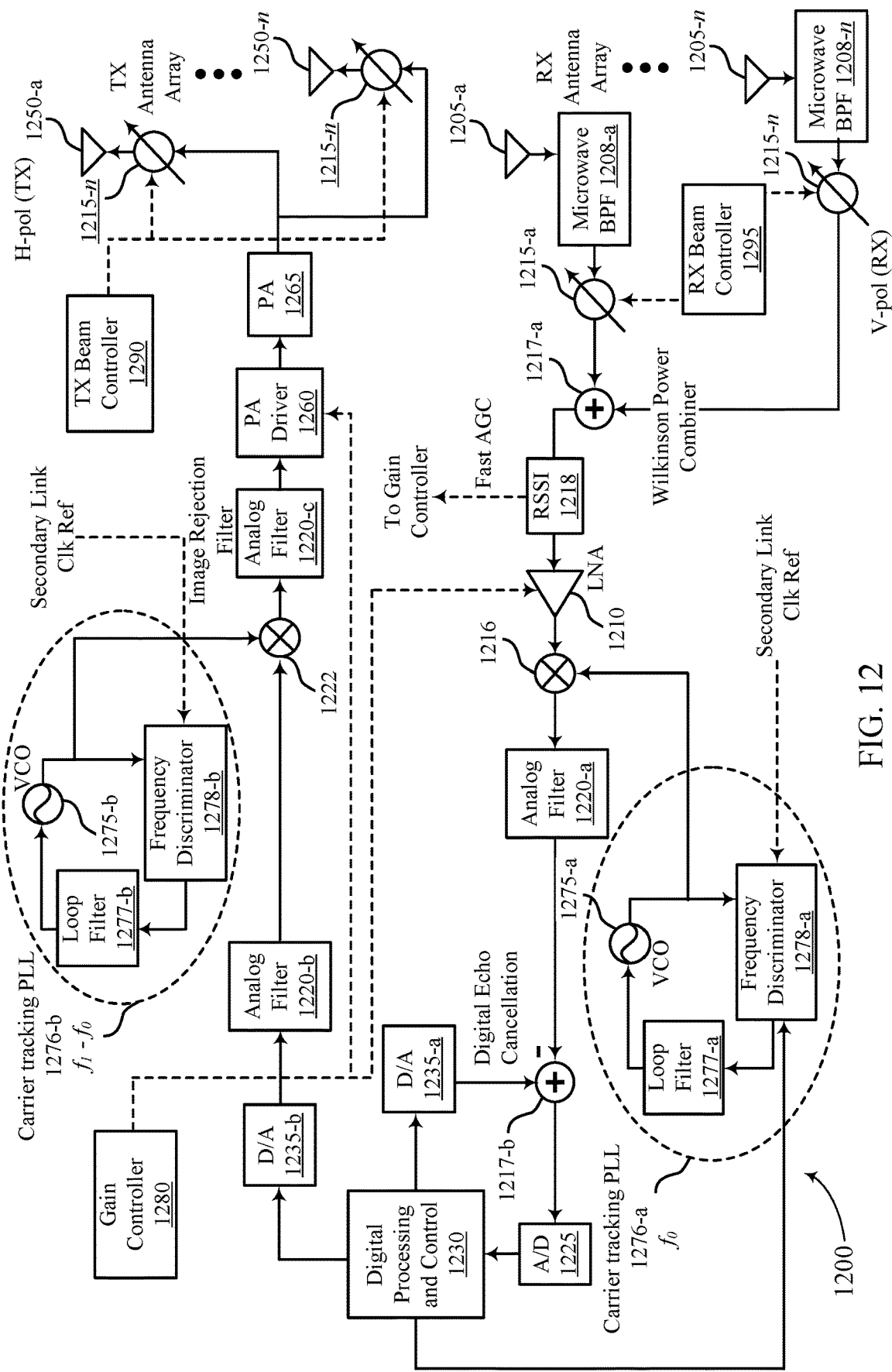

FIG. 12 illustrates an example of a circuit diagram of a signal processing chain 1200 that supports analog phased-array repeaters with digitally-assisted frequency translation and phase adjustment in accordance with one or more aspects of the present disclosure. In some examples, the circuit diagram of a signal processing chain 1000 may implement aspects of wireless communications systems 100 and 200. Additionally, the aspects of the circuit diagram of the signal processing chain 1200 may be an example of the architecture 700 described with reference to FIG. 7. For example, the circuit diagram of a signal processing chain 1200 may be implemented in a repeater (e.g., a wireless repeater 215) in aspects of wireless communications system 200. The signal processing chain 1200 includes a number of components between a receive antenna array including one or more antennas 1205 and a transmit antenna array including one or more antennas 1250, and may also include one or more BPFs 1208, one or more LNA 1210 components, one or more phase shifter 1215 components, one or more mixers 1216 (e.g., downconversion mixers). The circuit diagram of a signal processing chain 1200 may support the use of one set of dual-polarity antennas, analog frequency translation, digital frequency tracking, digital phase rotation adjustment, digital filtering, and in some cases digital control via mmW link.

The signal processing chain 1200 in this example uses single LNA, dual PLL, and single PA for receiving and transmitting signals, and includes a number of components between a receive antenna array (e.g., including antenna(s) 1205) and a transmit antenna array (e.g., including antenna(s) 1250). As illustrated, antennas 1205-$a$ through 1205-$n$ may receive a beamformed signal, which may be filtered through the microwave BPFs 1208-$a$ through 1208-$n$. In this example, phase shifters 1215-$a$ through 1215-$n$ may be associated with each antenna element (e.g., antenna 1205) of the receive antenna array. In some examples, the RX beam controller 1295 may route the signals to a combiner 1217, which may be an example of a Wilkinson Power Combiner or other RF signal combining circuit that combines the instances of the signal into a combined signal. The combined signal may be provided to an estimator for RSSI 1218, which may determine, for example, RSSI for fast AGC. An LNA 1210-$a$ may receive the combined signal and amplify the signal based on input from gain controller 1280.

A mixer 1216 may receive the amplified signal, along with inputs from carrier tracking PLL 1276-$a$. Mixer 1216 may output the signal to analog filter 1220-$a$, which may output a filtered signal to a second combiner 1217-$b$ as part of a feedback loop. The output from combiner 1217-$b$ may be provided to an A/D converter 1225. The A/D converter 1225 may convert the filtered signal to a digital filtered signal, which may be provided to digital processing and control circuitry 1230. The digital processing and control circuitry 1230 may perform digital processing, such as digital filtering, demodulation and decoding, channel estimation, carrier tracking, or combinations thereof, on the received filtered digital signal to output a processed digital signal. Additionally, the digital processing and control circuitry 1230 may apply a phase rotation adjustment of the received signal. For example, the phase rotation adjustment may account for heterodyning of the received signal from a first carrier frequency to a second carrier frequency. In such cases, the phase rotation adjustment may be determined using Equation 6. Digital processing and control circuitry 1230 may output the processed digital signal to D/A converter 1235-*a* which may input a converted signal to combiner 1217-*b*. In some cases, the digital processing and control circuitry 1230 may output the processed digital signal to a D/A converter 1235-*b* that converts the estimate to an analog signal that is filtered by an analog filter 1220-*b*. In some cases, filtering may use a combination of analog, piezo-electric (SAW/BAW/FBAR), and digital filters. Analog filter 1220-*b* may provide the signal to mixer 1222 which may then mix the signal with input from VCO 1275-*b*. The mixer 1222 may provide the combined signal to analog filter 1220-*c*, which may filter the signal.

The signal may then be provided from analog filter 1220-*b* to a PA driver 1260 and a PA 1265, and then to the one or more antennas 1250 of the transmit antenna array. Each transmit path may include a phase shifter 1215. In some examples, analog filter 1220-*b* may perform digital-to-analog (DAC) image rejection, and analog filter 1220-*c* may perform image rejection of microwave signals. In some examples, the gain controller 1280 may adjust a gain of the PA driver 1260, the gain of the LNA 1210, or any combinations thereof. This adjustment may be based on the monitored output and the RSSI 1218. Accordingly, the gain controller 1280 may increase or maintain stability of signal transmission within the signal processing chain.

In some cases, components between the RX antenna array including antennas 1205 and the TX antenna array including antennas 1250 may be considered the signal processing chain and may be implemented using an RFIC, one or more digital processing components, or combinations thereof. The baseband signals may be downconverted or upconverted by mixing a signal at an LO frequency that is generated by a VCO 1275. For instance, at mixer 1216, the downconversion may include mixing a signal generated by a VCO 1275-*a*. In this example, a first carrier tracking PLL 1276-*a* may tune the VCO 1275-*a* using a first loop filter 1277-*a* and a first frequency discriminator 1278-*a*, where the first carrier tracking PLL 1276-*a* may be associated with a first carrier frequency (e.g., $f_0$). Likewise, the upconversion of the signal at the one or more mixers 1222 may mix a signal generated by a VCO 1275. Here, a second carrier tracking PLL 1276-*b* may tune the VCO 1275-*b* using a first loop filter 1277-*b* and second frequency discriminator 1278-*b*, where the first carrier tracking PLL may be associated with a difference between the first carrier frequency and a second carrier frequency (e.g., $f_1-f_0$), which may translate the receive signal to a desired carrier frequency (e.g., $f_1$). In such cases, a difference between the first carrier frequency and second carrier frequency may be large enough to avoid VCO injection pulling while enabling analog heterodyning of a received signal. As an example, the carrier frequency the signal was received on (e.g., $f_0$) may be far enough away (e.g., enabling better filtering) from a second frequency that the signal is to be heterodyned to (e.g., $f_1$), that more than one carrier tracking PLL 1276 may be used by the repeater.

In some cases, and as described herein, an optional secondary link may be used, and may provide a clock reference for each carrier tracking PLL 1276. For instance, the secondary link may be provided between a base station 105 and the repeater, and may be used as a reference by which to produce the frequency generated by one or both of the first carrier tracking PLL 1276-*a* and 876-*b*. In such cases, the use of the reference clock from the secondary link may enable a reduced amount of digital processing (e.g., beam modulation) at the repeater, thus improving the efficiency of the signal processing chain 1200.

In some cases, the upconversion and downconversion may be performed with ZIF, low-IF, or super-heterodyne RF architectures. Different frequency synthesizers (e.g., different from the carrier tracking PLLs 876 illustrated) may be used for the upconversion, downconversion, or heterodyning of a signal by the repeater, or a combination of these.

The circuit diagram of a signal processing chain 1200 may include various aspects and components as described in architecture 700 or signal processing chains 800, 900, 1000, and 1100, or a combination of these. The particular architecture selected to implement a circuit such as signal processing chain 1200 may be based on desired linearity, range, die-size, power of RF components, or any combinations thereof. The example architecture provided for signal processing chain is just one example, and as described herein, other configurations may be utilized, in addition to those not explicitly described herein.

Figure 13:
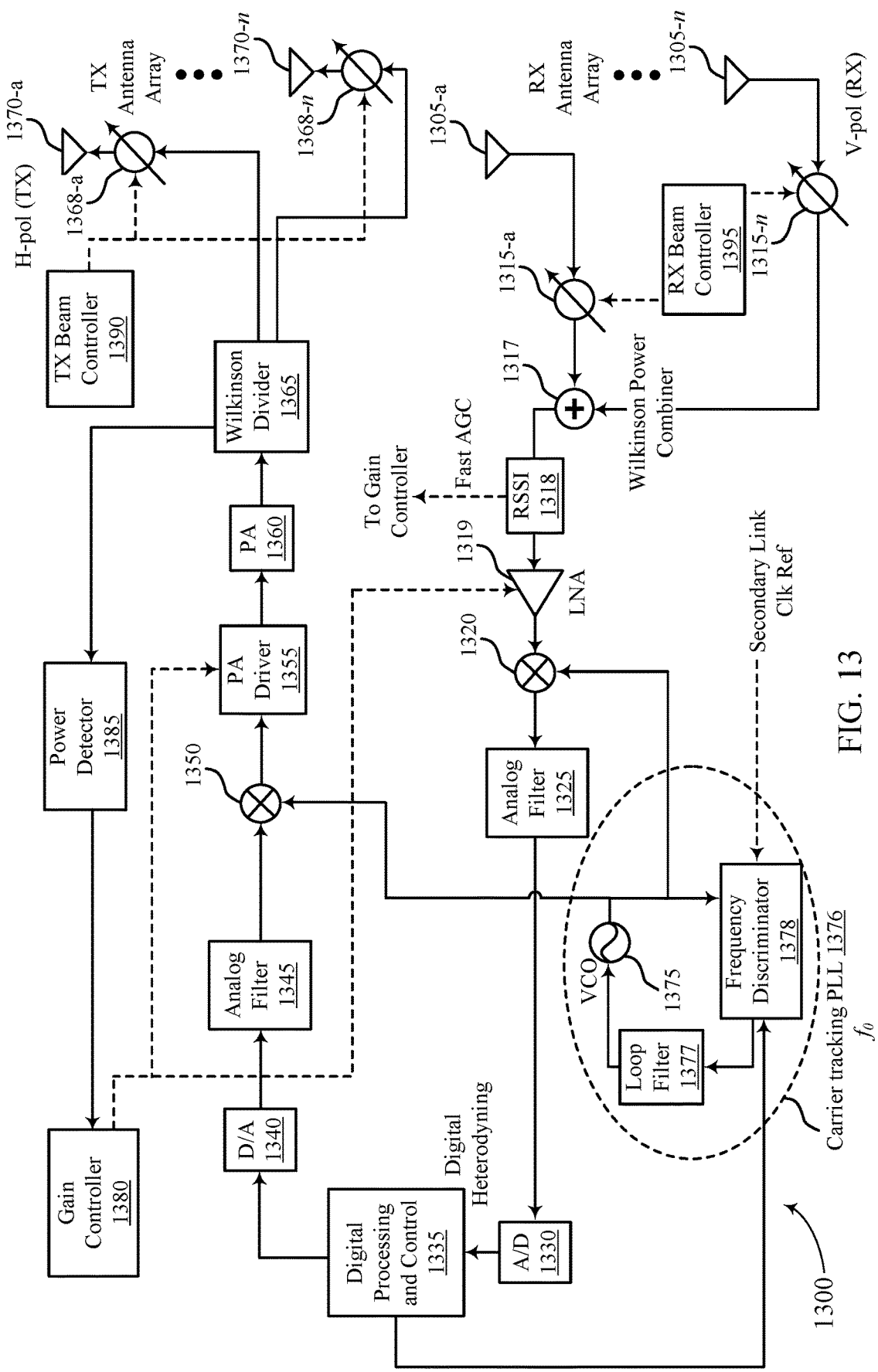

FIG. 13 illustrates an example of a circuit diagram of a signal processing chain 1300 that supports analog phased-array repeaters with digitally-assisted frequency translation and phase adjustment in accordance with one or more aspects of the present disclosure. In some examples, the circuit diagram of a signal processing chain 1300 may implement aspects of wireless communications systems 100 and 200. Additionally, the aspects of the circuit diagram of the signal processing chain 1300 may be an example of the architecture 700 described with reference to FIG. 7. For example, the circuit diagram of a signal processing chain 1300 may be implemented in a repeater (e.g., a wireless repeater 215) in aspects of wireless communications system 200. The signal processing chain 1300 includes a number of components between a receive antenna array including one or more antennas 1305 and a transmit antenna array including one or more antennas 1370, and may also include one or more one or more phase shifter 815 components. The circuit diagram of the signal processing chain 1300 may represent a signal processing chain with one set of dual polarity antennas (e.g., horizontal and vertical polarity antennas), and may further support digital frequency tracking, digital frequency translation and phase correction, digital filtering, and may optionally support digital control signaling over a mmW link.

The signal processing chain 1300 in this example uses a single LNA and PA for receiving and transmitting signals, and includes a number of components between a receive antenna array (e.g., including antenna(s) 1305) and a transmit antenna array (e.g., including antenna(s) 1370). In this example, phase shifters 1315 may be associated with each antenna element (e.g., antenna 1305) of the receive antenna array. In some examples, the RX beam controller 1395 may adjust phase shifters 1315 (e.g., phase shifters 1315-*a* through 1315-*n*) in accordance with receive beamforming parameters. Associated antennas 1305-*a* through 1305-*n* may receive a signal, which is routed to combiner 1317, which may be an example of a Wilkinson power combiner or other RF signal combining circuit, that combines the instances of the signal into a combined signal. The combined signal may be provided to an estimator for RSSI 1318, which may determine, for example, RSSI for fast AGC. An LNA 1319 may receive the combined signal and amplify the signal based on input from gain controller 1380.

A downconversion mixer 1320 may receive the amplified signal and downconvert the signal to baseband. Analog filter 1325 may be located after the downconversion mixer 1320. The analog filter 1325 may output a filtered signal an A/D converter 1330, which may convert the filtered signal to a digital filtered signal. The digital filtered signal may be provided to digital processing and control circuitry 1335. The digital processing and control circuitry 1335 may perform digital processing and control similarly as discussed with respect to FIGS. 3 and 7 through 12. In some examples, the digital processing and control circuitry 1335 may perform digital heterodyning of the digital signal from a first carrier frequency to a second carrier frequency. In other cases, digital filtering may be performed on the digital signal.

The signal may then be provided to D/A convertor 1340 to convert the signal to an analog signal that is provided to an analog filter 1345 and then to upconversion mixer 1350. The upconverted signal may be provided to a PA driver 1355, PA 1360, and divider circuit 1365, which may be an example of a Wilkinson divider circuit, or may be another type of divider circuit. In any case, the divider circuit 1365 may divide the output to a plurality of transmit paths corresponding to the plurality of antennas 1370 of the transmit antenna array. Each transmit path may include a phase shifter 1368 that adjusts phase based on signals from TX beam controller 1390. The signal may then be transmitted by one or more antennas 1370 (e.g., antennas 1370-*a* through 1370-*n*).

Power detector 1385 may be coupled to the divider circuit 1365 and monitor the output of the PA 1360. Based on the monitored output provided from the power detector 1385 and the RSSI 1318, the gain controller 1380 may adjust a gain of the PA driver 1355, the gain of the LNA 1319, or both. Accordingly, using the PA output, the gain controller 1380 may increase or maintain stability of signal transmission within the signal processing chain.

In some cases, components between the RX antenna array including antennas 1305 and the TX antenna array including antennas 1370 may be considered the signal processing chain and may be implemented as a RFIC, digital component(s), or combinations thereof, similarly as discussed with respect to FIG. 9. The received signals may be downconverted to baseband at downconversion mixer 1320 by mixing the received signal with a signal at an LO frequency that is generated by VCO 1375. In this example, a carrier tracking PLL 1376 that is associated with a first carrier frequency (e.g., $f_0$) may tune the VCO 1375 using frequency discriminator 1378 and loop filter 1377. Likewise the filtered and processed baseband signals may be upconverted back to RF at upconversion mixer 1350 by mixing the baseband signal with the LO frequency that is generated by VCO 1375. In some examples, an optional secondary link may be used, and may provide a clock reference for carrier tracking PLL 1376. For instance, the secondary link may be provided between a base station 105 and the repeater, and may be used as a reference by which to produce the frequency generated by carrier tracking PLL 1376.

Figure 14:
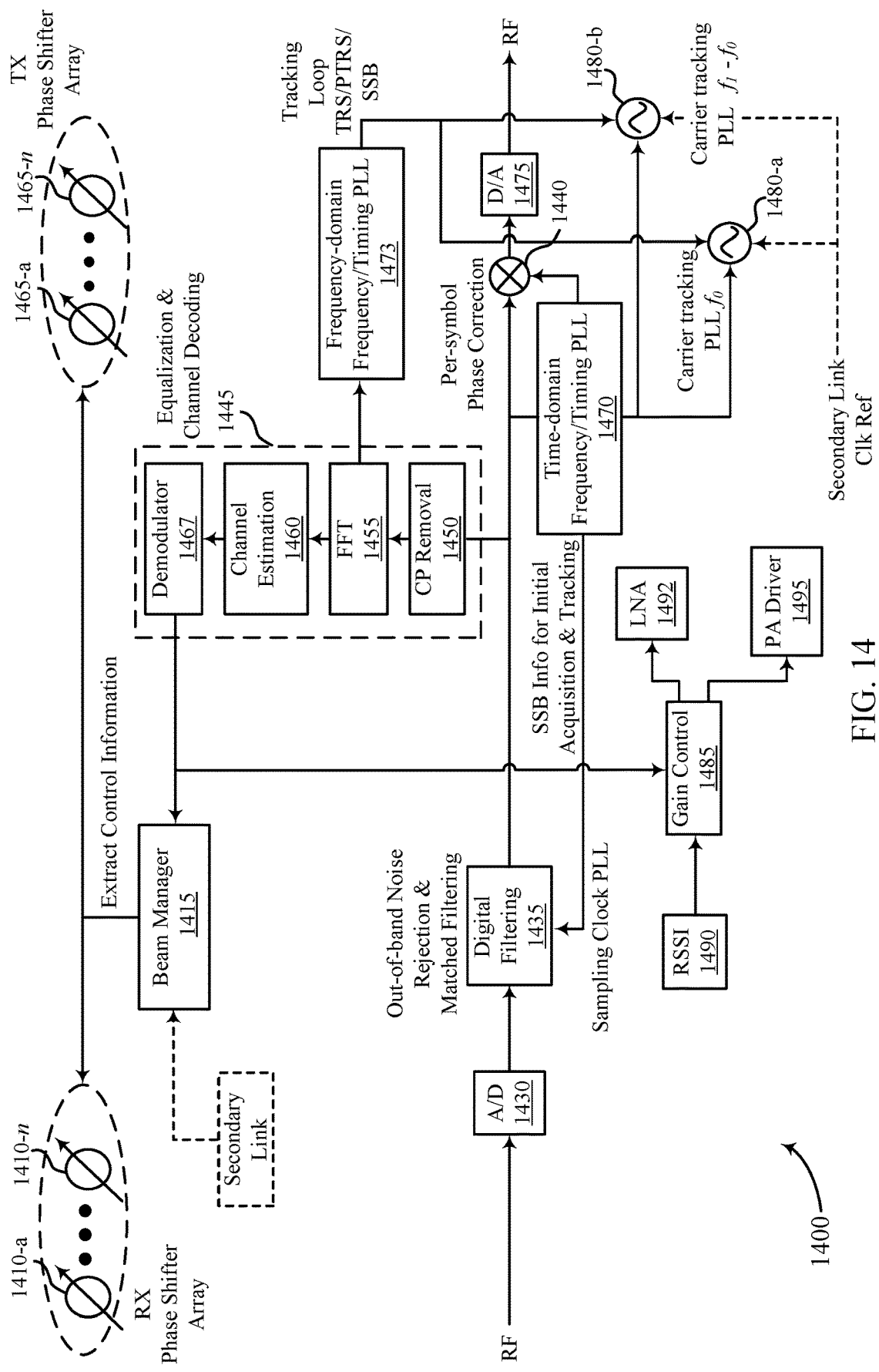
FIGS. 14 and 15 illustrate examples of digital flows that support analog phased-array repeaters with digitally-assisted frequency translation and phase adjustment in accordance with one or more aspects of the present disclosure.

FIG. 14 illustrates an example of a digital flow 1400 that supports analog phased-array repeaters with digitally-assisted frequency translation and phase adjustment in accordance with one or more aspects of the present disclosure. In some examples, the digital flow 1400 may implement aspects of wireless communications systems 100 and 200. Additionally, the digital flow 1400 may include aspects of the architecture 700 described with reference to FIG. 7. In some examples, digital flow 1400 may be implemented in a repeater (e.g., a wireless repeater 215) in aspects of wireless communications system 200. In such cases, the repeater may be an example of an analog heterodyning repeater. In some examples, various digital components of the digital flow 1400 may be implemented in digital processing and control circuitry (e.g., digital processing and control circuitry described with reference to FIGS. 8, 10, and 12) within a repeater (e.g., repeater 215).

In this example, a receive phase shifter array 1410 may include a number of phase shifters 1410-*a* through 1410-*n*, which may be coupled with respective antenna elements. Likewise, a transmit phase shifter array 1465 may include a number of phase shifters 1465-*a* through 1465-*n*, which may be coupled with respective antenna elements. A beam manager 1415 may control an amount of phase shift applied at each phase shifter according to beamforming parameters or control information that are determined based on an optional control link (e.g., a secondary control link established on FR1) or based on optional in-band signaling circuitry 1445, or a combination of these. In some cases, the beam manager 1415 may be an example of the beam controller 310 described with reference to FIG. 3.

A digital filtering component 1435 may receive a digital input from an A/D converter 1430, which converts an analog baseband signal to a digital signal. The digital filtering component 1435 may include one or more digital filters (e.g., finite impulse response (FIR), infinite impulse response (IIR) filters) that are used to perform out-of-band noise rejection and matched filtering. In some cases, carrier tracking and acquisition may be performed by a time-domain frequency/timing PLL 1470 using SSB information from a received beamformed signal. The timing information may be provided to A/D converter 1430 as a sampling clock PLL. The output of the digital filtering component 1435 may be provided to a mixer 1440, where phase rotation correction may be applied to the digital signal. In such cases, the phase rotation may be applied on a per-symbol basis, where symbol timing information may be based on the acquisition and tracking. The per-symbol phase correction may be based on the translation of a carrier frequency to frequency $f_1-f_0$. The signal may be provided to a D/A converter 1475 for conversion back to an analog baseband signal for upconversion to RF and retransmission.

In some cases, a gain control component 1485 may provide gain control to LNA(s) 1492 and PA driver(s) 1495, which may be based on input from beam manager 1415 and RSSI measurement component 1490, which may each operate as discussed with respect to FIGS. 8 through 13. In some cases, a repeater may be a self-configuring repeater that does not rely on a separate control link to provide beamforming parameters or carrier tracking information. In such cases, the in-band signaling circuitry 1445 may be used to determine such control information. In the example of FIG. 14, the in-band signaling circuitry 1445 includes a CP removal component 1450, an FFT component 1455, a channel estimation component 1460, and a demodulator 1467. As such, the in-band signaling circuitry 1445 may be optional.

The in-band signaling circuitry 1445 may, in some cases, demodulate one or more SSBs from a base station and derive beamforming parameters from a physical broadcast channel (PBCH) transmission in the SSBs. Further, the in-band signaling circuitry 1445 may receive one or more synchronization signals or reference signals (e.g., a PSS, SSS, tracking reference signal (TRS), phase tracking reference signal (PTRS), or any combinations thereof), which may be used for channel estimation and equalization. Carrier tracking may be provided in a repeater using multiple PLL synthesizers 1480 (e.g., a first carrier tracking PLL synthesizer 1480-*a* associated with a first carrier frequency and a second carrier tracking PLL synthesizer 1480-*b* associated with a second carrier frequency) that receive input from a frequency-domain frequency/timing PLL 1473 coupled with from FFT component 1455 and initial acquisition and tracking information from SSB information provided by the in-band signaling circuitry 1445, as well as the time-domain frequency/timing PLL 1470. In other cases where the repeater has a separate control link (e.g., a secondary link, as described herein), the PLL synthesizers 1480-*a* and 1480-*b* may receive initial acquisition and tracking information from the separate control link, which may further serve as a clock reference for each PLL synthesizer 1480. Such carrier frequency tracking, and symbol timing acquisition from SSB information, may help to prevent inter-carrier interference (ICI) and spectral regrowth due to re-modulation of leakage terms.

Figure 15:
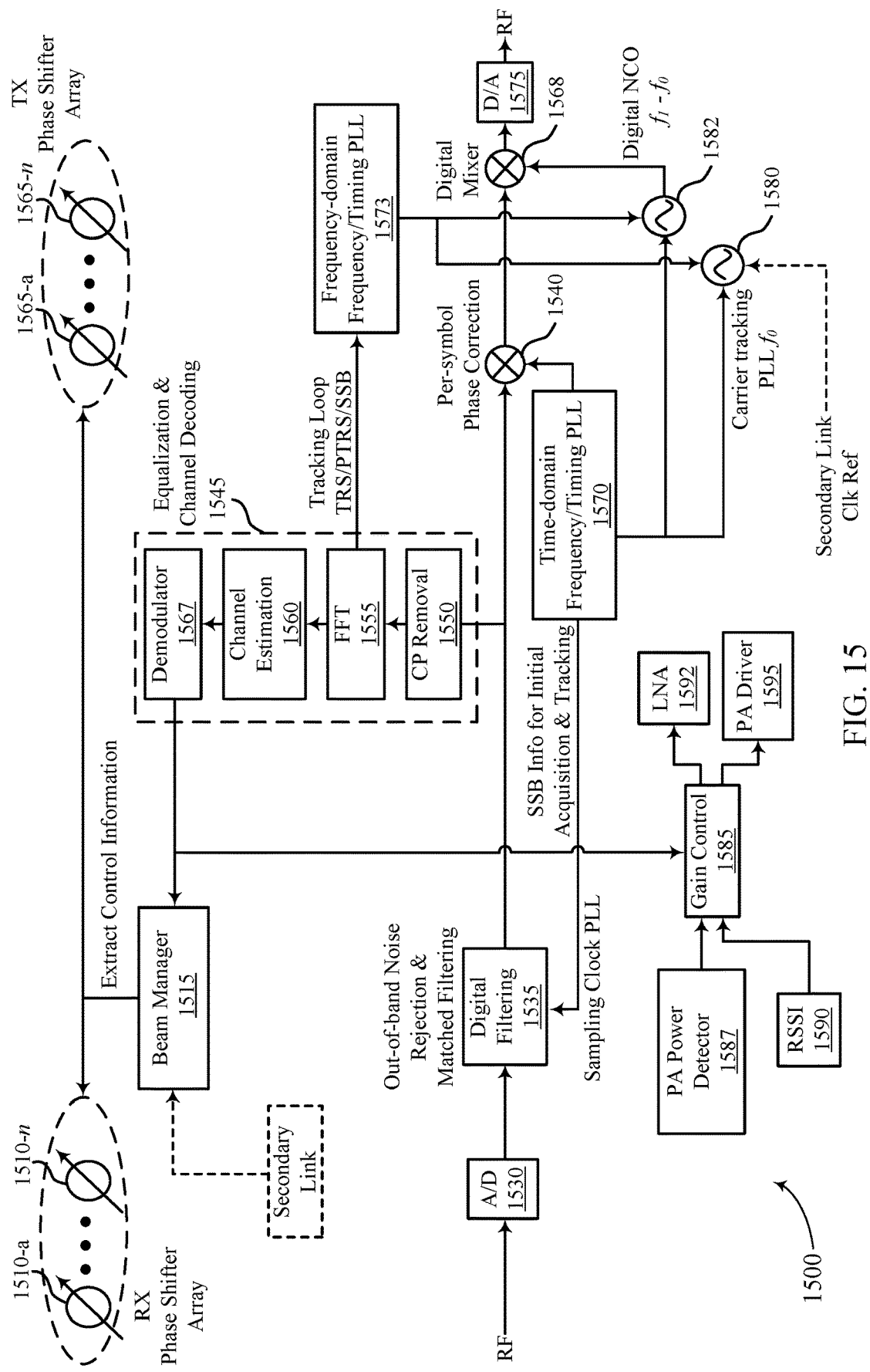

FIG. 15 illustrates an example of a digital flow 1500 that supports analog phased-array repeaters with digitally-assisted frequency translation and phase adjustment in accordance with one or more aspects of the present disclosure. In some examples, the digital flow 1500 may implement aspects of wireless communications systems 100 and 200. Additionally, the digital flow 1500 may include aspects of the architecture 700 described with reference to FIG. 7. In some examples, digital flow 1500 may be implemented in a repeater (e.g., a wireless repeater 215) in aspects of wireless communications system 200. In such cases, the repeater may be an example of a digital heterodyning repeater. In some examples, various digital components of the digital flow 1500 may be implemented in digital processing and control circuitry (e.g., digital processing and control circuitry described with reference to FIGS. 8, 10, and 12) within a repeater (e.g., repeater 215).

In this example, a receive phase shifter array 1510 may include a number of phase shifters 1510-*a* through 1510-*n*, which may be coupled with respective antenna elements. Likewise, a transmit phase shifter array 1565 may include a number of phase shifters 1565-*a* through 1565-*n*, which may be coupled with respective antenna elements. A beam manager 1515 may control an amount of phase shift applied at each phase shifter according to beamforming parameters or control information that are determined based on an optional control link (e.g., a secondary control link established on FR1) or based on optional in-band signaling circuitry 1545, or a combination of these. In some cases, the beam manager 1515 may be an example of the beam controller 310 described with reference to FIG. 3.

A digital filtering component 1535 may receive a digital input from an A/D converter 1530, which converts an analog baseband signal to a digital signal. The digital filtering component 1535 may include one or more digital filters (e.g., FIR, IIR filters) that are used to perform out-of-band noise rejection and matched filtering. In some cases, carrier tracking and acquisition may be performed by a time-domain frequency/timing PLL 1570 using SSB information from a received beamformed signal. The timing information may be provided to A/D converter 1530 as a sampling clock PLL. The output of the digital filtering component 1535 may be provided to a mixer 1540, where phase rotation correction may be applied to the digital signal. In such cases, the phase rotation may be applied on a per-symbol basis, where symbol timing information may be based on the acquisition and tracking. The per-symbol phase correction may be based on the translation of a carrier frequency to frequency $f_1$–$f_0$. The signal may be provided to a digital mixer 1568 for upconversion, then to D/A converter 1575 for conversion back to an analog baseband signal for upconversion to RF and retransmission.

In some cases, a gain control component 1585 may provide gain control to LNA(s) 1592 and PA driver(s) 1595, which may be based on input from beam manager 1515 and RSSI measurement component 1590, which may each operate as discussed with respect to FIGS. 8 through 13. In some cases, a repeater may be a self-configuring repeater that does not rely on a separate control link to provide beamforming parameters or carrier tracking information. In such cases, the in-band signaling circuitry 1545 may be used to determine such control information. In the example of FIG. 15, the in-band signaling circuitry 1545 includes a CP removal component 1550, an FFT component 1555, a channel estimation component 1560, and a demodulator 1567. As such, the in-band signaling circuitry 1545 may be optional.

The in-band signaling circuitry 1545 may, in some cases, demodulate one or more SSBs from a base station and derive beamforming parameters from a physical broadcast channel (PBCH) transmission in the SSBs. Further, the in-band signaling circuitry 1545 may receive one or more synchronization signals or reference signals (e.g., a PSS, SSS, tracking reference signal (TRS), PTRS, or any combinations thereof), which may be used for channel estimation and equalization. Carrier tracking may be provided in a repeater using a PLL synthesizers 1580 (e.g., a carrier tracking PLL synthesizer 1580) that receives input from a frequency-domain frequency/timing PLL 1573 coupled with from FFT component 1555 and initial acquisition and tracking information from SSB information provided by the in-band signaling circuitry 1545, as well as the time-domain frequency/timing PLL 1570. Additionally, a numerically controlled oscillator (NCO) 1582 may be used to provide the signaling to the digital mixer 1568, where the NCO 1582 may receive input from the frequency-domain frequency/timing PLL 1573 and the time-domain frequency/timing PLL 1570. In some cases, the NCO 1582 may be associated with a different carrier frequency (e.g., $f_1$–$f_0$) used for heterodyning the signal. In other cases where the repeater has a separate control link (e.g., a secondary link, as described herein), the PLL synthesizer 1580 may receive initial acquisition and tracking information from the separate control link, which may further serve as a clock reference for the PLL synthesizer 1580. Such carrier frequency tracking, and symbol timing acquisition from SSB information, may help to prevent ICI and spectral regrowth due to re-modulation of leakage terms.

Figure 16:
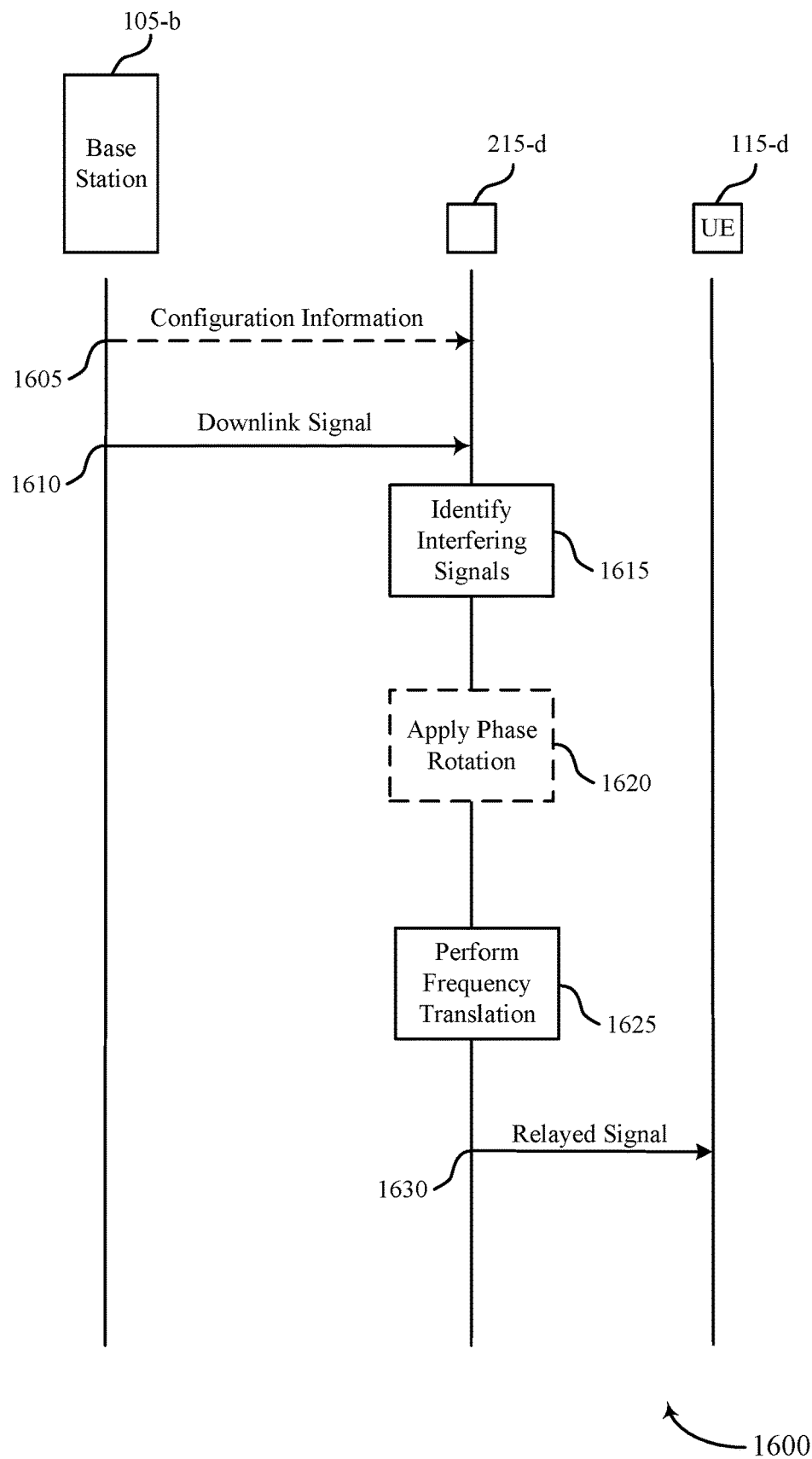
FIG. 16 illustrates an example of a process flow in a system that supports analog phased-array repeaters with digitally-assisted frequency translation and phase adjustment in accordance with one or more aspects of the present disclosure.

FIG. 16 illustrates an example of a process flow 1600 in a system that supports analog phased-array repeaters with digitally-assisted frequency translation and phase adjustment in accordance with one or more aspects of the present disclosure. Process flow 1600 may illustrate an example frequency translation and phase rotation adjustment by a repeater. Base station 105-*b* may be an example of base station 105 as described with reference with FIGS. 1 and 2. UE 115-*d* may be an example of UEs 115 described with reference to FIGS. 1 and 2.

Base station 105-*b* may determine a configuration of a repeating device (e.g., repeater 215-*d*). The configuration may be based on communicating with one or more UEs 115. At 1605, base station 105-*d* may transmit a beamformed signal including an indication of the configuration to repeater 215-*d*. The beamformed signal may include control information indicating the configuration. The configuration may include one or more transmission directions, one or more gains, a beam width for one or more receive beams, or a combination thereof. The transmission of configuration information may in some cases be transmitted to a repeating device along with a downlink signal or at another transmission time.

At 1605, repeater 215-d may receive, at the first antenna array, control information including a configuration for repeater 215-d. The performed frequency translation and the applied phase rotation correction may be based on the configuration. The configuration may include an indication of one or more transmission directions, one or more gains, a beam width for one or more transmission beams, a beam width for one or more receive beams, or a combination thereof.

At 1610, base station 105-d may transmit a downlink signal. At 1610, a repeating device (e.g., a repeater or a wireless repeater) 215-d may receive, at a first antenna array, the signal at a first carrier frequency from base station 105-b. The downlink signal may be transmitted by a beamforming network at base station 105-b, and may be intended for UE 115-d. In some cases, the transmission of the downlink signal may be interfered with by an RF jammer or a physical blocker. Repeater 215-d may be designated to relay the downlink signal from base station 105-b to UE 115-d. In some cases, the relaying of the signal from base station 105-b to UE 115-d may cause additional interference. For example, the transmission of the signal by the transmit antenna array of repeater 215-d may interfere with the reception of the downlink signal by the receive antenna array of repeater 215-d.

At 1615, repeater 215-d may identify one or more interfering signals affecting at least one of the first antenna array or the second antenna array of repeater 215-d. The interfering signals may include interference from the TX antenna array of repeater 215, including mutual coupling of the TX antenna lobes and RX antenna lobes, as well as reflection of the transmitted signals interfering with the received signals from base station 105-b. Interfering signals may also include signals from an RF jammer, other RF interference, or interference from other physical blockers reflecting other RF signals.

At 1620, repeater 215-d may apply a phase rotation adjustment to the received signal based on a frequency translation of the received signal. The phase rotation adjustment may correspond to a second carrier frequency, which may be the frequency that the first carrier frequency is translated to. For instance, the frequency translation to the second carrier frequency may cause a phase rotation error based on an initial phase rotation that may have been applied at base station 105-b. Repeater 215-d may apply a phase rotation adjustment to correct for a predicted phase rotation error based on the frequency translation that may be performed by the repeater.

After repeater 215-d receives the signal at 1605, repeater 215-d may demodulate the received signal. Repeater 215-d may then identify one or more reference signals, one or more SSBs, or a combination thereof, based on the demodulated signal. The demodulation of the received signal may include performing a channel estimation and equalization on the received signal. Repeater 215-d may perform carrier frequency tracked based on the one or more reference signals, the one or more SSBs, or a combination thereof, where the phase rotation adjustment that is applied at 1620 may be based on the carrier frequency tracking. Repeater 215-d may also acquire symbol timing information for each of one or more symbol periods of the received signal, where the phase rotation adjustment may be applied to the one of more symbol periods based on the symbol timing information.

In some cases, repeater 215-d may receive control information via a secondary link with another device. The secondary link may be different from a link associated with the first antenna array. repeater 215-d may identify a clock signal associated with the secondary link, and may also perform the carrier frequency tracking based on the identified clock signal. The carrier frequency tracking may be performed using one or more PLL circuits. In some cases, the first PLL circuit of the one or more PLL circuits may operate at a frequency including a difference between the first carrier frequency and the second carrier frequency. The second PLL circuit of the one or more PLL circuit may operate at the first carrier frequency. Repeater 215-d may select the second carrier frequency based on a first VCO of the first PLL circuit and the second VCO of the second PLL circuit. The second carrier frequency may be selected to avoid interference between the first VCO and the second VCO.

Repeater 215-d may convert the received signal from an analog signal to a digital signal, and may apply the phase rotation adjustment by applying the phase rotation adjustment to the digital signal based on the second carrier frequency. The phase rotation adjustment may be based on Equation 6.

Repeater 215-d may also determine a first antenna gain associated with the first antenna array, determine a second antenna gain associated with the second antenna array, and perform a digital gain control for the first antenna array, the second antenna array, or a combination thereof. Performing the digital gain control may be based on the first antenna gain and the second antenna gain.

Repeater 215-d may downconvert the received signal to an IF frequency, and may filter the IF signal using an analog filter, a SAW filter, a BAW filer, an FBAR filter, a digital filter, or a combination thereof. The received signal may be downconverted using a zero IF architecture, a low IF architecture, or a super-heterodyne architecture.

At 1625, repeater 215-d may perform a frequency translation of the received signal from the first carrier frequency to a second carrier frequency. The translation may be based on one or more of the identified interfering signals, and may be based on what frequencies the interfering signals interfere with.

In some cases, repeater 215-d may determine that a difference between the first carrier frequency (e.g., $f_0$) and the second carrier frequency (e.g., $f_1$) satisfies a first threshold. In this case, repeater 215-d may perform analog heterodyning (e.g., wideband analog heterodyning) of the received signal from the first carrier frequency to the second carrier frequency (e.g., as described with respect to filtering technique 400). In this case, the first carrier frequency may be associated with a first RF spectrum band and the second carrier frequency may be associated with a second RF spectrum band different from the first RF spectrum band, and therefore the frequency translation may be handled by wideband analog heterodyning.

The process of wideband analog heterodyning may include downconverting the received signal to a baseband signal, identifying a first analog filter for the received signal, and filtering the received signal using the first analog filter based on the one or more interfering signals. In some cases, the first analog filter may be one or more of a microwave filter, an IF filter, a SAW filter, a BAW filter, or an FBAR filter. The process may also include identifying a second analog filter for the received signal, where the second analog filter may also include one or more of an IF filter, a SAW filter, a BAW filter, or an FBAR filter. Repeater 215-*b* may filter, during the downconverting, the received signal using the second analog filter based on the one or more interfering signals. Repeater 215-*b* may convert the received signal to a digital signal and filter the digital signal based on the one or more interfering signals. When performing the frequency translation of the received signal, repeater 215-*b* may digitally heterodyne the signal from the first carrier frequency from the second carrier frequency.

In another case, repeater 215-*d* may determine that a difference between the first carrier frequency and the second carrier frequencies satisfies a second threshold. In this case, repeater 215-*d* may perform digital heterodyning (e.g., narrowband digital heterodyning) of the received signal from the first carrier frequency to the second carrier frequency (e.g., as described with respect to filtering technique 500). In this case, the first carrier frequency and the second carrier frequency may be associated with the same RF spectrum band, and therefore the frequency translation may be handled by the process of narrowband digital heterodyning.

At 1630, repeater 215-*d* may transmit, by the second antenna array, the translated signal including the phase rotation adjustment to UE 115-*d*. The translated signal may be transmitted at the second carrier frequency. The transmission of the translated signal may include upconverting the received signal from baseband using a zero IF architecture, low IF architecture, or a super-heterodyne architecture.

Repeater 215-*d* may transmit the translated signal as a beamformed signal based on analog beamforming, digital beamforming, or a combination thereof. One or more of the first antenna array or the second antenna array may include a phased antenna array.

Figure 17:
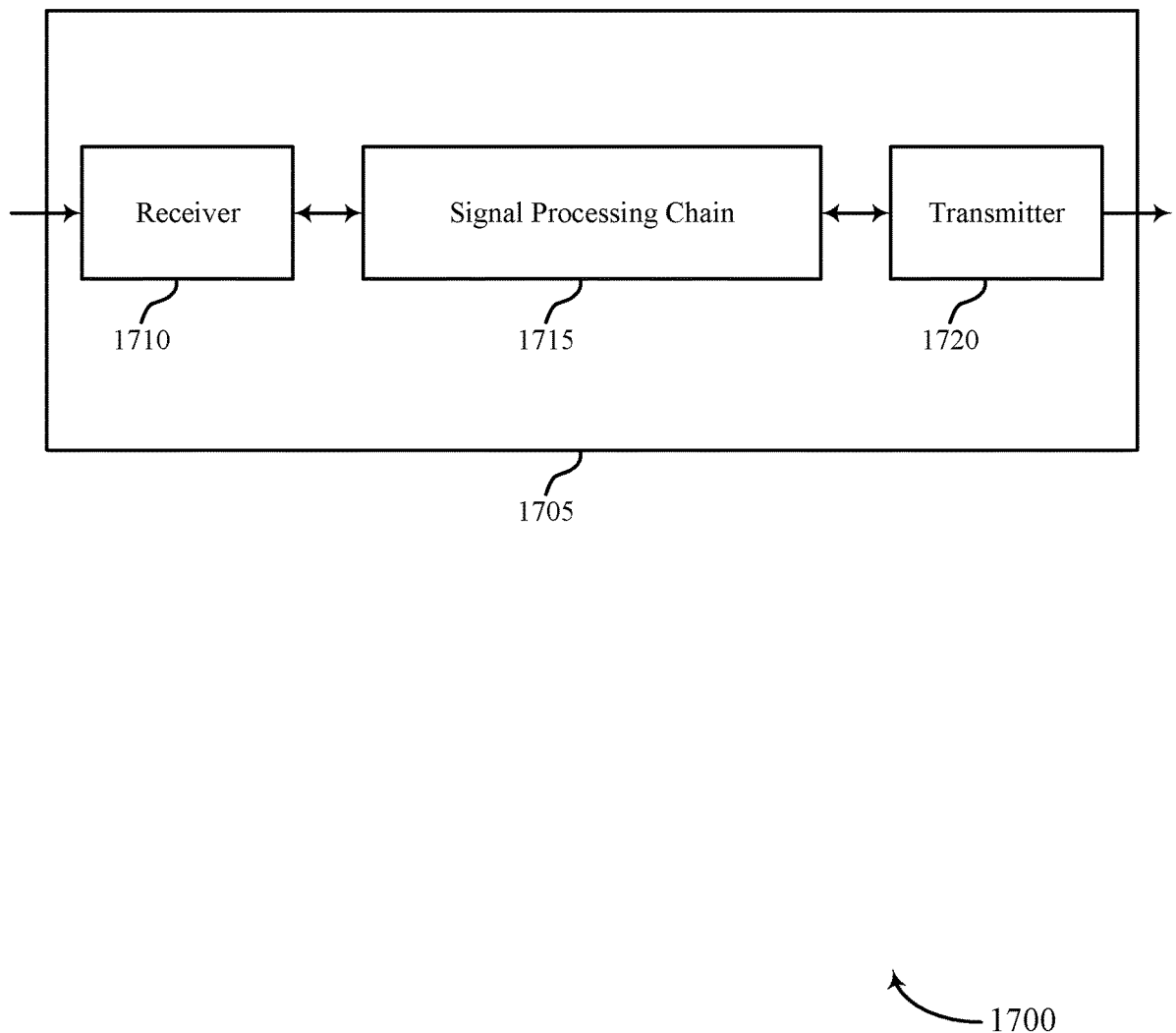
FIGS. 17 and 18 show block diagrams of devices that support analog phased-array repeaters with digitally-assisted frequency translation and phase adjustment in accordance with one or more aspects of the present disclosure.

FIG. 17 shows a block diagram 1700 of a device 1705 that supports analog phased-array repeaters with digitally-assisted frequency translation and phase adjustment in accordance with one or more aspects of the present disclosure. The device 1705 may be an example of aspects of a repeater 140 or a repeater 215 as described herein. The device 1705 may include a receiver 1710, a signal processing chain 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to analog phased-array repeaters with digitally-assisted frequency translation and phase adjustment, etc.). Information may be passed on to other components of the device 1705. The receiver 1710 may be an example of aspects of a transceiver. The receiver 1710 may utilize a single antenna or a set of antennas (such as a receive antenna array). In some cases, the receiver 1710 may receive a signal at a first carrier frequency from a first device in a wireless network.

The signal processing chain 1715 may identify one or more interfering signals affecting at least one of the first antenna array or a second antenna array of the repeating device (e.g., a first device), apply a phase rotation adjustment to the received signal based on a frequency translation of the received signal, the phase rotation adjustment corresponding to a second carrier frequency, and perform the frequency translation of the received signal from the first carrier frequency to the second carrier frequency based on the one or more interfering signals.

The signal processing chain 1715, or its sub-components, may be implemented in hardware, code (e.g., software or firmware) executed by a processor, or any combination thereof. If implemented in code executed by a processor, the functions of the signal processing chain 1715, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The signal processing chain 1715, or its sub-components, may be physically located at various positions, including being distributed such that portions of functions are implemented at different physical locations by one or more physical components. In some examples, the signal processing chain 1715, or its sub-components, may be a separate and distinct component in accordance with various aspects of the present disclosure. In some examples, the signal processing chain 1715, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 18:
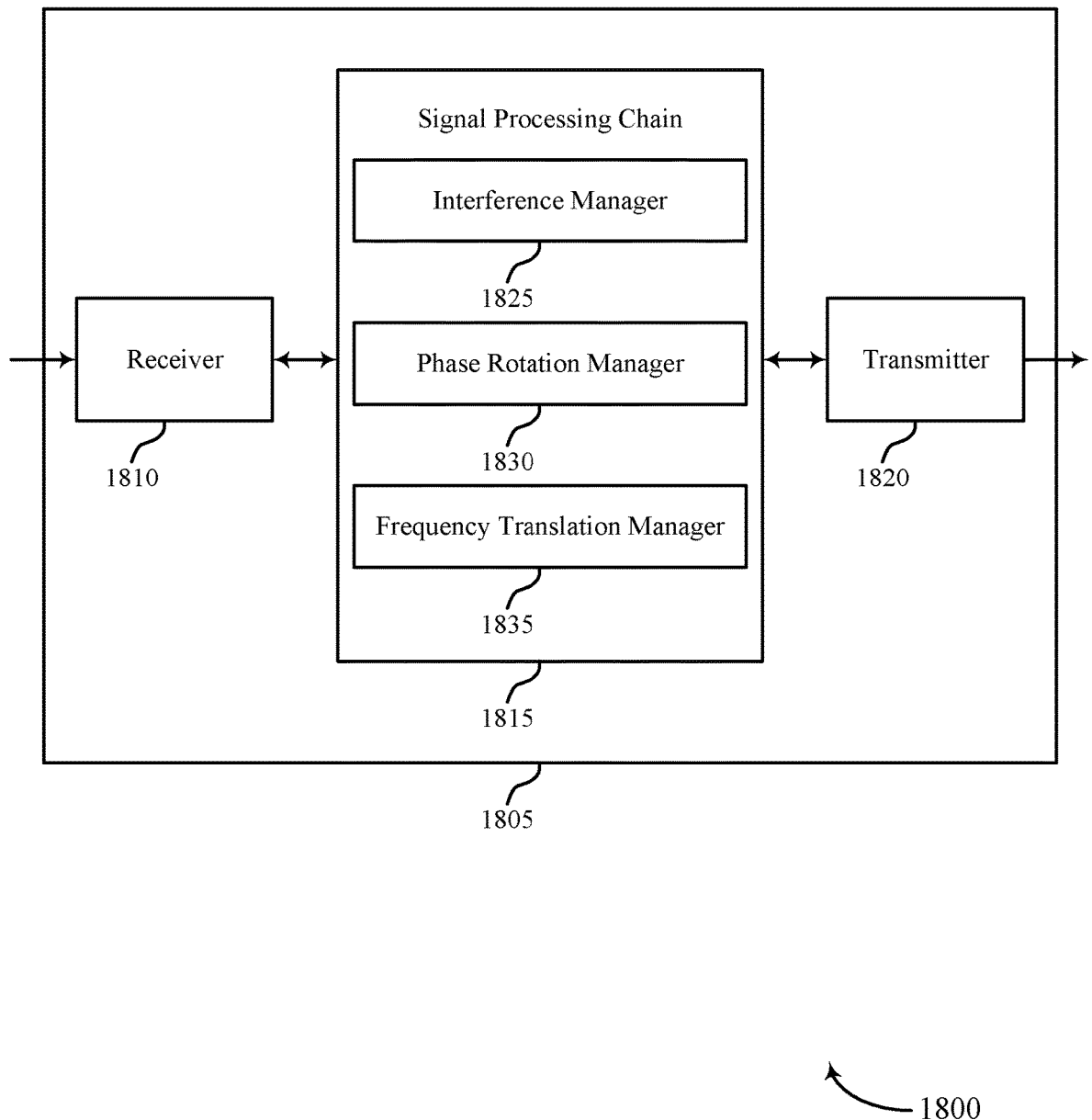

The transmitter 1720 may transmit signals generated by other components of the device 1705. In some examples, the transmitter 1720 may be collocated with a receiver 1710 in a transceiver module. The transmitter 1720 may utilize a single antenna or a set of antennas (such as a transmit antenna array). In some examples, the transmitter 1720 may transmit the translated signal including the phase rotation adjustment to a second device in the wireless network, the translated signal being transmitted at the second carrier frequency FIG. 18 shows a block diagram 1800 of a device 1805 that supports analog phased-array repeaters with digitally-assisted frequency translation and phase adjustment in accordance with one or more aspects of the present disclosure. The device 1805 may be an example of aspects of a device 1705, or a repeater 140 or repeater 215 as described herein. The device 1805 may include a receiver 1810, a signal processing chain 1815, and a transmitter 1845. The device 1805 may also include a processor. Each of these components may be in communication with one another (e.g., via one or more buses).

The receiver 1810 may receive information such as packets, user data, or control information associated with various information channels (e.g., control channels, data channels, and information related to analog phased-array repeaters with digitally-assisted frequency translation and phase adjustment, etc.). Information may be passed on to other components of the device 1805. The receiver 1810 may utilize a single antenna or a set of antennas. The receiver 1810 may receive, at a first antenna array of a repeating device, a signal at a first carrier frequency from a first device in a wireless network.

The signal processing chain 1815 may be an example of aspects of the signal processing chain 1715 as described herein. The signal processing chain 1815 may include an interference manager 1825, a phase rotation manager 1830, and a frequency translation manager 1835. The signal processing chain 1815 may be an example of aspects of the architecture 700 described herein.

The interference manager 1825 may identify one or more interfering signals affecting at least one of the first antenna array or a second antenna array of the repeating device. The phase rotation manager 1830 may apply a phase rotation adjustment to the received signal based on a frequency translation of the received signal, the phase rotation adjustment corresponding to a second carrier frequency. The frequency translation manager 1835 may perform the frequency translation of the received signal from the first carrier frequency to the second carrier frequency based on the one or more interfering signals.

The transmitter 1845 may transmit signals generated by other components of the device 1805. In some examples, the transmitter 1845 may be collocated with a receiver 1810 in a transceiver module. The transmitter 1845 may utilize a single antenna or a set of antennas. The transmitter 1840 may transmit, by the second antenna array of the repeating device, the translated signal including the phase rotation adjustment to another device (e.g., a third device) in the wireless network, the translated signal being transmitted at the second carrier frequency.

Figure 19:
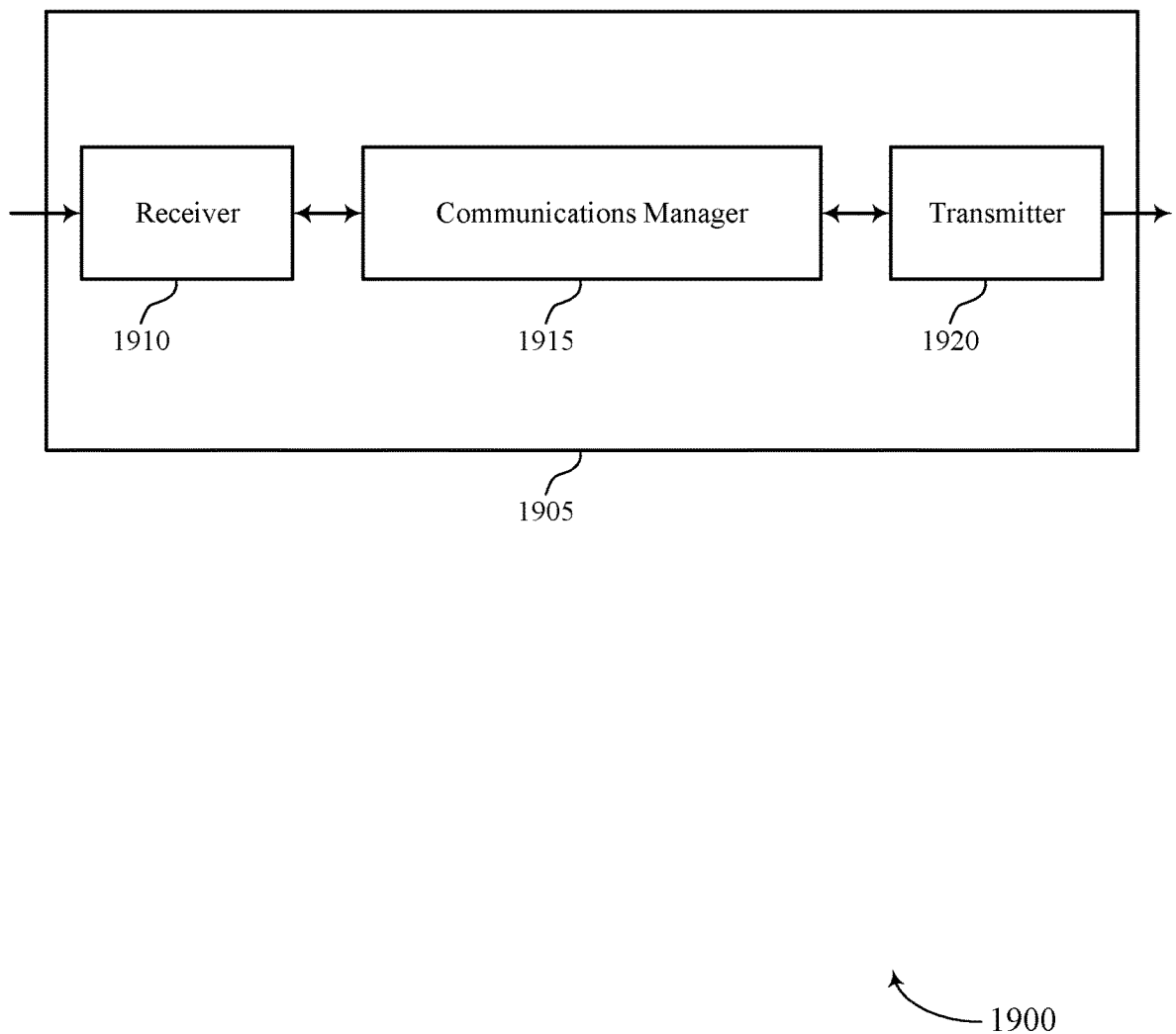
FIGS. 19 and 20 show block diagrams of devices that support analog phased-array repeaters with digitally-assisted frequency translation and phase adjustment in accordance with one or more aspects of the present disclosure.

FIG. 19 shows a block diagram 1900 of a device 1905 that supports analog phased-array repeaters with digitally-assisted frequency translation and phase adjustment in accordance with one or more aspects of the present disclosure. The device 1905 may be an example of aspects of a base station 105 as described herein. The device 1905 may include a receiver 1910, a communications manager 1915, and a transmitter 1920. The device 1905 may also include a processor. Each of these components may be in communication with one another (e.g., via one or more buses).

The receiver 1910 may receive information such as packets, user data, or control information associated with various information channels (e.g., control channels, data channels, and information related to analog phased-array repeaters with digitally-assisted frequency translation and phase adjustment, etc.). Information may be passed on to other components of the device 1905. The receiver 1910 may be an example of aspects of the transceiver 2220 described with reference to FIG. 22. The receiver 1910 may utilize a single antenna or a set of antennas.

The communications manager 1915 may determine a configuration of a repeating device, the configuration being based on communicating with one or more UEs 115 and transmit, to the repeating device, a beamformed signal including an indication of the configuration. The communications manager 1915 may be an example of aspects of the communications manager 2210 described herein.

The communications manager 1915, or its sub-components, may be implemented in hardware, code (e.g., software or firmware) executed by a processor, or any combination thereof. If implemented in code executed by a processor, the functions of the communications manager 1915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1915, or its sub-components, may be physically located at various positions, including being distributed such that portions of functions are implemented at different physical locations by one or more physical components. In some examples, the communications manager 1915, or its sub-components, may be a separate and distinct component in accordance with various aspects of the present disclosure. In some examples, the communications manager 1915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1920 may transmit signals generated by other components of the device 1905. In some examples, the transmitter 1920 may be collocated with a receiver 1910 in a transceiver module. For example, the transmitter 1920 may be an example of aspects of the transceiver 2220 described with reference to FIG. 22. The transmitter 1920 may utilize a single antenna or a set of antennas.

Figure 20:
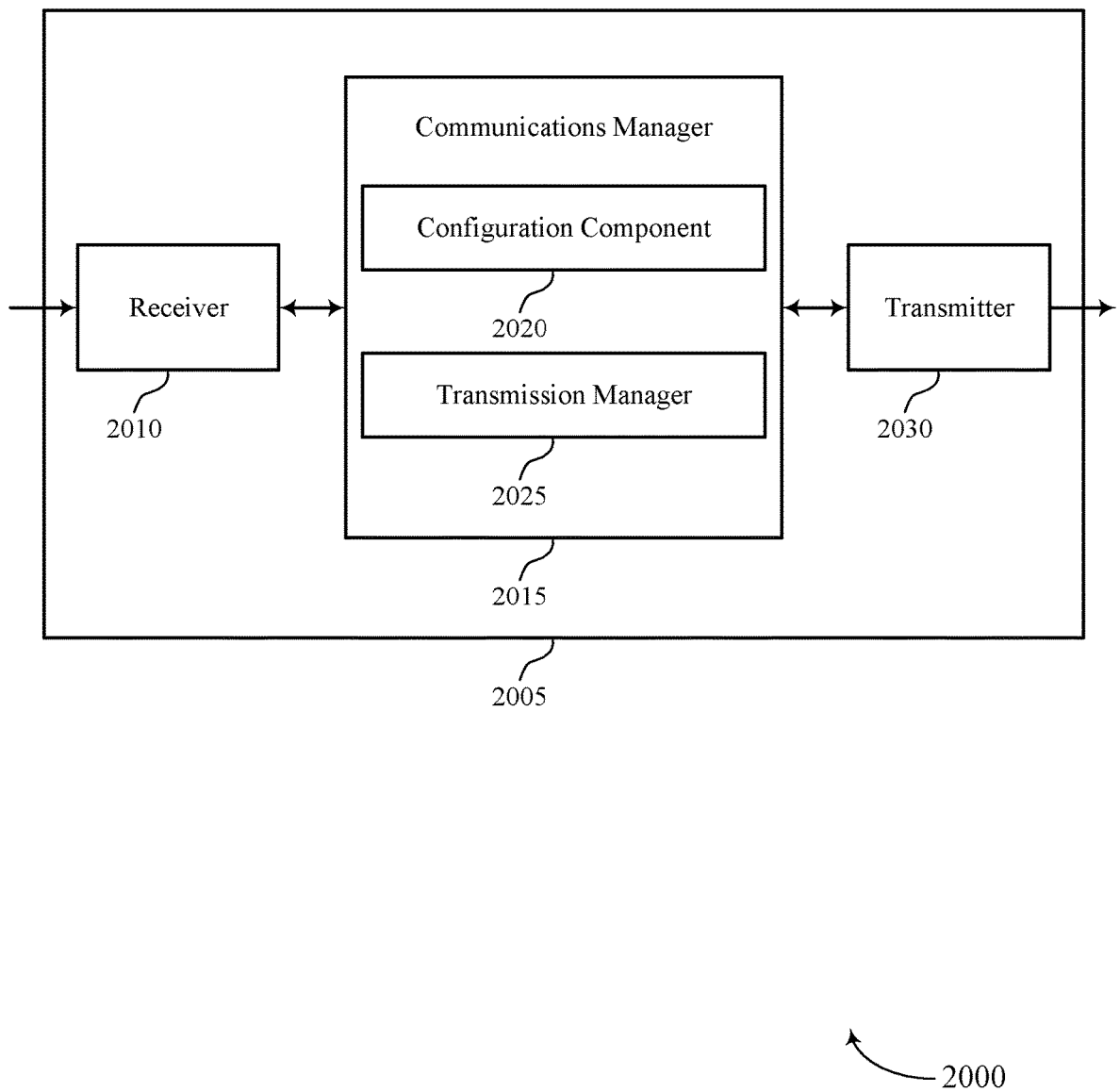

FIG. 20 shows a block diagram 2000 of a device 2005 that supports analog phased-array repeaters with digitally-assisted frequency translation and phase adjustment in accordance with one or more aspects of the present disclosure. The device 2005 may be an example of aspects of a device 1905, or a base station 105 as described herein. The device 2005 may include a receiver 2010, a communications manager 2015, and a transmitter 2030. The device 2005 may also include a processor. Each of these components may be in communication with one another (e.g., via one or more buses).

The receiver 2010 may receive information such as packets, user data, or control information associated with various information channels (e.g., control channels, data channels, and information related to analog phased-array repeaters with digitally-assisted frequency translation and phase adjustment, etc.). Information may be passed on to other components of the device 2005. The receiver 2010 may be an example of aspects of the transceiver 2220 described with reference to FIG. 22. The receiver 2010 may utilize a single antenna or a set of antennas.

The communications manager 2015 may be an example of aspects of the communications manager 1915 as described herein. The communications manager 2015 may include a configuration component 2020 and a transmission manager 2025. The communications manager 2015 may be an example of aspects of the communications manager 2210 described herein.

The configuration component 2020 may determine a configuration of a repeating device, the configuration being based on communicating with one or more UEs 115. The transmission manager 2025 may transmit, to the repeating device, a beamformed signal including an indication of the configuration.

The transmitter 2030 may transmit signals generated by other components of the device 2005. In some examples, the transmitter 2030 may be collocated with a receiver 2010 in a transceiver module. For example, the transmitter 2030 may be an example of aspects of the transceiver 2220 described with reference to FIG. 22. The transmitter 2030 may utilize a single antenna or a set of antennas.

Figure 21:
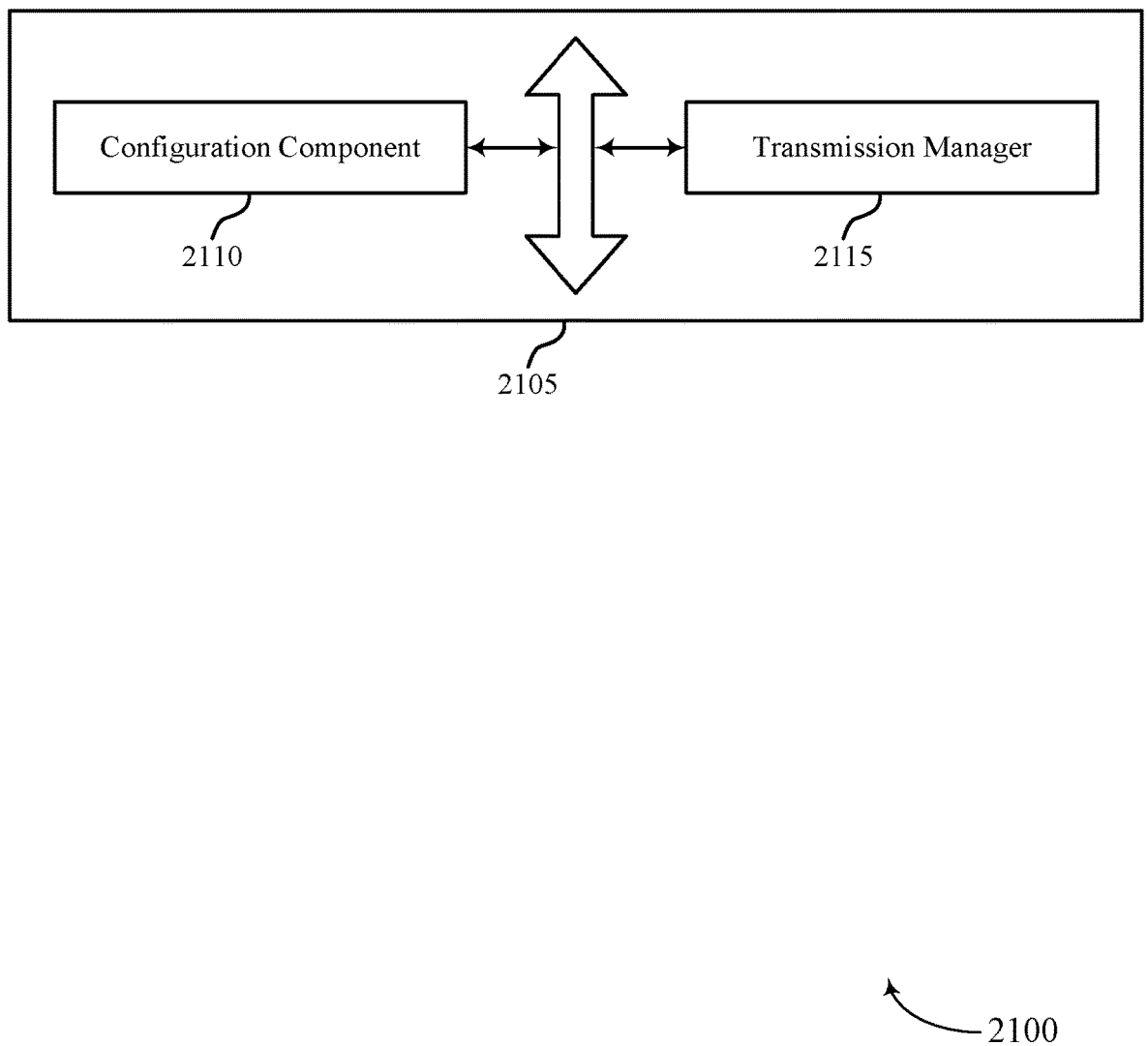
FIG. 21 shows a block diagram of a communications manager that supports analog phased-array repeaters with digitally-assisted frequency translation and phase adjustment in accordance with one or more aspects of the present disclosure.

FIG. 21 shows a block diagram 2100 of a communications manager 2105 that supports analog phased-array repeaters with digitally-assisted frequency translation and phase adjustment in accordance with one or more aspects of the present disclosure. The communications manager 2105 may be an example of aspects of a communications manager 1915, a communications manager 2015, or a communications manager 2210 described herein. The communications manager 2105 may include a configuration component 2110 and a transmission manager 2115. Each of these modules may communicate, directly or indirectly, with one another (e.g., via one or more buses).

The configuration component 2110 may determine a configuration of a repeating device, the configuration being based on communicating with one or more UEs 115. In some cases, the configuration includes one or more transmission directions, one or more gains, a beam width for one or more transmission beams, a beam width for one or more receive beams, or a combination thereof. In some cases, the configuration may be transmitted using downlink control information, radio resource control messaging, or the like.

The transmission manager 2115 may transmit, to the repeating device, a beamformed signal including an indication of the configuration. In some cases, the beamformed signal includes control information indicating the configuration.

Figure 22:
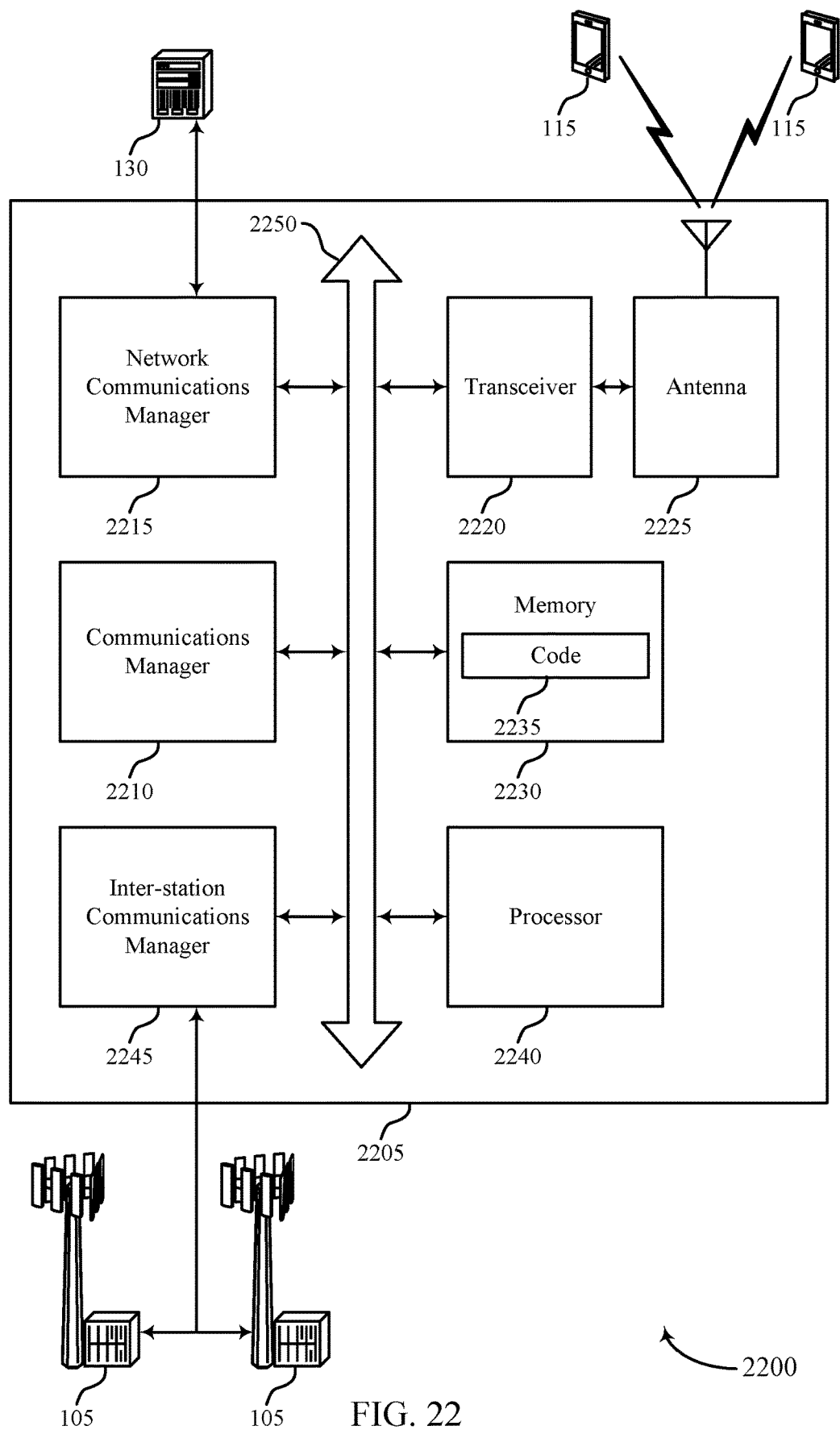
FIG. 22 shows a diagram of a system including a device that supports analog phased-array repeaters with digitally-assisted frequency translation and phase adjustment in accordance with one or more aspects of the present disclosure.

FIG. 22 shows a diagram of a system 2200 including a device 2205 that supports analog phased-array repeaters with digitally-assisted frequency translation and phase adjustment in accordance with one or more aspects of the present disclosure. The device 2205 may be an example of or include the components of device 1905, device 2005, or a base station 105 as described herein. The device 2205 may include components for bi-directional voice and data communications including components for transmitting and receiving communications, including a communications manager 2210, a network communications manager 2215, a transceiver 2220, an antenna 2225, memory 2230, a processor 2240, and an inter-station communications manager 2245. These components may be in electronic communication via one or more buses (e.g., bus 2250).

The communications manager 2210 may determine a configuration of a repeating device, the configuration being based on communicating with one or more UEs 115 and transmit, to the repeating device, a beamformed signal including an indication of the configuration.

The network communications manager 2215 may manage communications with the core network (e.g., via one or more wired backhaul links). For example, the network communications manager 2215 may manage the transfer of data communications for client devices, such as one or more UEs 115.

The transceiver 2220 may communicate bi-directionally, via one or more antennas, wired, or wireless links as described herein. For example, the transceiver 2220 may represent a wireless transceiver and may communicate bi-directionally with another wireless transceiver. The transceiver 2220 may also include a modem to modulate the packets and provide the modulated packets to the antennas for transmission, and to demodulate packets received from the antennas. In some cases, the wireless device may include a single antenna 2225. However, in some cases the device may have more than one antenna 2225, which may be capable of concurrently transmitting or receiving multiple wireless transmissions.

The memory 2230 may include RAM, ROM, or a combination thereof. The memory 2230 may store computer-readable code 2235 including instructions that, when executed by a processor (e.g., the processor 2240) cause the device to perform various functions described herein. In some cases, the memory 2230 may contain, among other things, a basic I/O system (BIOS) which may control basic hardware or software operation such as the interaction with peripheral components or devices.

The processor 2240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some cases, a memory controller may be integrated into processor 2240. The processor 2240 may be configured to execute computer-readable instructions stored in a memory (e.g., the memory 2230) to cause the device 2205 to perform various functions (e.g., functions or tasks supporting analog phased-array repeaters with digitally-assisted frequency translation and phase adjustment).

The inter-station communications manager 2245 may manage communications with other base station 105, and may include a controller or scheduler for controlling communications with UEs 115 in cooperation with other base stations 105. For example, the inter-station communications manager 2245 may coordinate scheduling for transmissions to UEs 115 for various interference mitigation techniques such as beamforming or joint transmission. In some examples, the inter-station communications manager 2245 may provide an X2 interface within an LTE/LTE-A wireless communication network technology to provide communication between base stations 105.

The code 2235 may include instructions to implement aspects of the present disclosure, including instructions to support wireless communications. The code 2235 may be stored in a non-transitory computer-readable medium such as system memory or other type of memory. In some cases, the code 2235 may not be directly executable by the processor 2240 but may cause a computer (e.g., when compiled and executed) to perform functions described herein.

Figure 23:
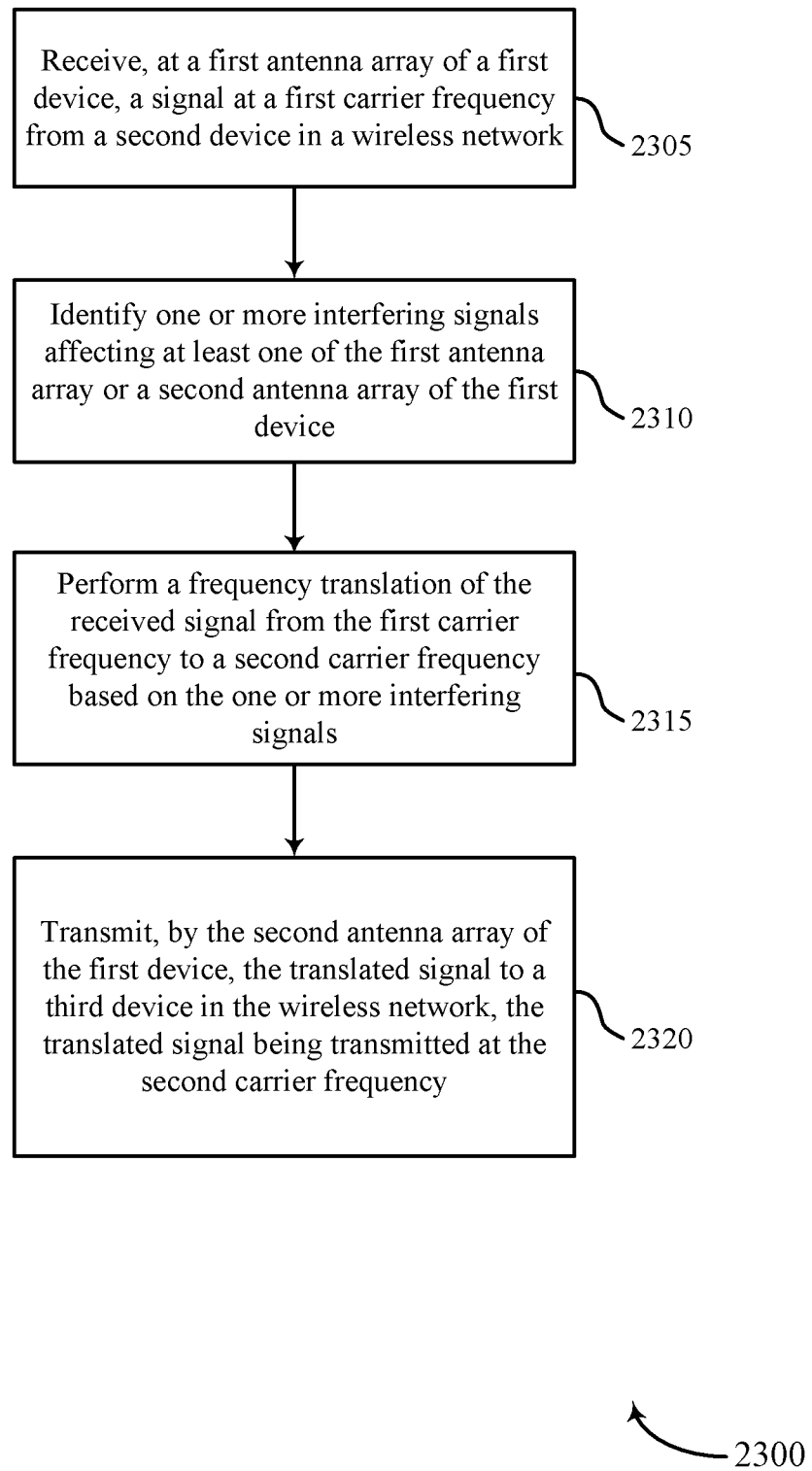
FIGS. 23 through 26 show flowcharts illustrating methods that support analog phased-array repeaters with digitally-assisted frequency translation and phase adjustment in accordance with one or more aspects of the present disclosure.

FIG. 23 shows a flowchart illustrating a method 2300 that supports analog phased-array repeaters with digitally-assisted frequency translation and phase adjustment in accordance with one or more aspects of the present disclosure. The operations of method 2300 may be implemented by a first device or a repeating device (a repeater 140, a repeater 215, a wireless repeater, a mmW repeater, etc.) or its components as described herein. For example, the operations of method 2300 may be performed by a signal processing chain as described with reference to FIGS. 8 through 15, 17, and 18. In some examples, a repeater may execute a set of instructions to control the functional elements of the repeater to perform the functions described herein. Additionally or alternatively, a receiver may perform aspects of the functions described herein using special-purpose hardware.

At 2305, the first device may receive, at a first antenna array, a signal at a first carrier frequency from a second device in a wireless network. The operations of 2305 may be performed according to the methods described herein. In some examples, aspects of the operations of 2305 may be performed by a receive antenna array as described with reference to FIGS. 7 through 13 and 16. Similarly, aspects of the operations of 2305 may be performed by a receiver as described with reference to FIGS. 16 through 18.

At 2310, the first device may identify one or more interfering signals affecting at least one of the first antenna array or a second antenna array of the first device. The operations of 2310 may be performed according to the methods described herein. In some examples, aspects of the operations of 2310 may be performed by an interference manager as described with reference to FIGS. 17 and 18.

At 2315, the first device may perform the frequency translation of the received signal from the first carrier frequency to the second carrier frequency based on the one or more interfering signals. The operations of 2315 may be performed according to the methods described herein. In some examples, aspects of the operations of 2315 may be performed by a frequency translation manager as described with reference to FIGS. 17 and 18.

At 2320, the first device may transmit, by the second antenna array of the first device, the translated signal including the phase rotation adjustment to a third device in the wireless network, the translated signal being transmitted at the second carrier frequency. The operations of 2320 may be performed according to the methods described herein. In some examples, aspects of the operations of 2320 may be performed by a transmit antenna array as described with reference to FIGS. 7 through 13 and 16. Similarly, aspects of the operations of 2320 may be performed by a transmitter as described with reference to FIGS. 16 through 18.

Figure 24:
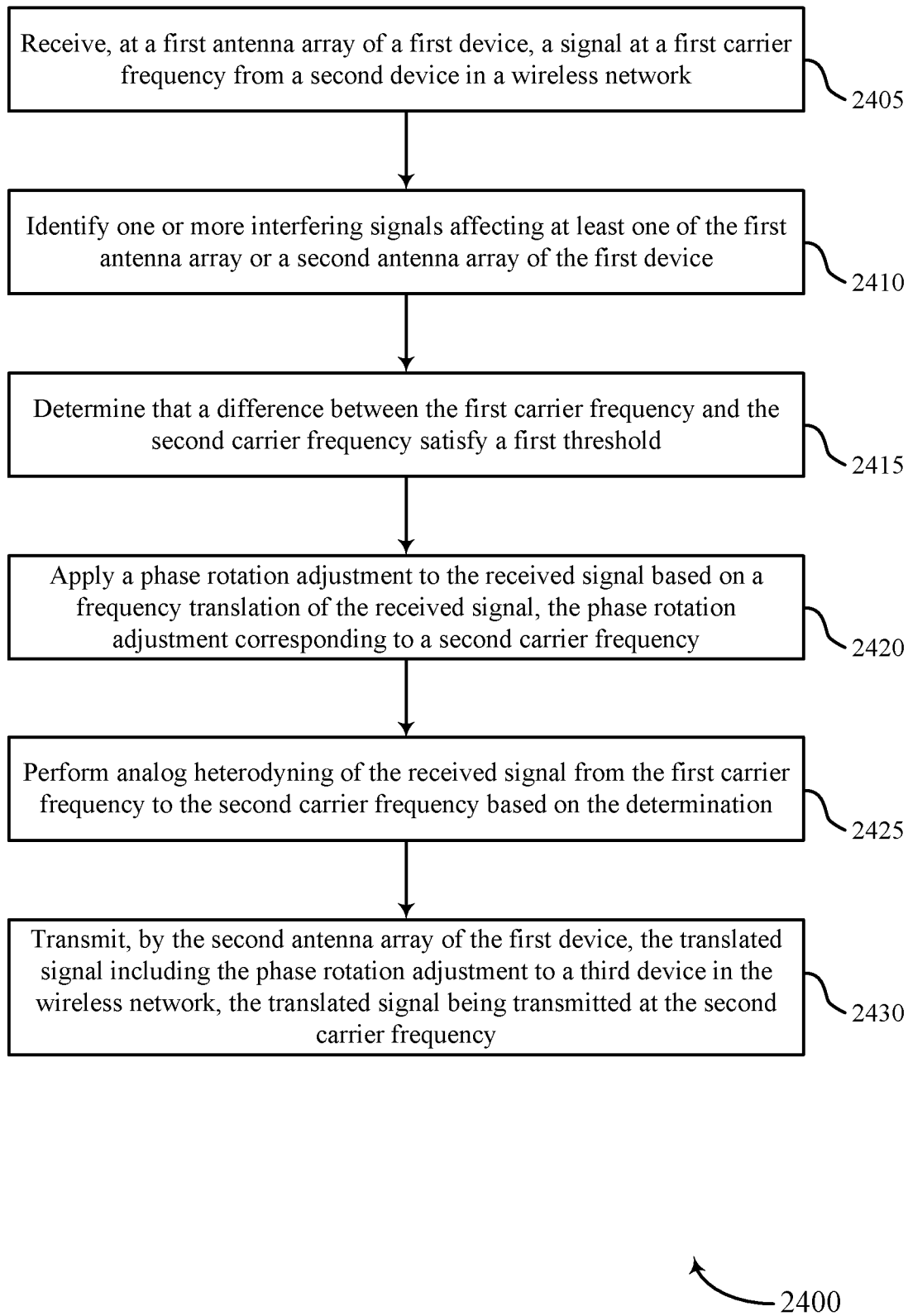

FIG. 24 shows a flowchart illustrating a method 2400 that supports analog phased-array repeaters with digitally-assisted frequency translation and phase adjustment in accordance with one or more aspects of the present disclosure. The operations of method 2400 may be implemented by a first device (e.g., a repeating device, a repeater 140, a repeater 215, a wireless repeater, a mmW repeater, etc.) or its components as described herein. For example, the operations of method 2400 may be performed by a signal processing chain as described with reference to FIGS. 8 through 15, 17, and 18. In some examples, a repeater may execute a set of instructions to control the functional elements of the repeater to perform the functions described herein. Additionally or alternatively, a repeater may perform aspects of the functions described herein using special-purpose hardware.

At 2405, the first device may receive, at a first antenna array, a signal at a first carrier frequency from a second device in a wireless network. The operations of 2405 may be performed according to the methods described herein. In some examples, aspects of the operations of 2405 may be performed by a receive antenna array as described with reference to FIGS. 7 through 13 and 16. Similarly, aspects of the operations of 2405 may be performed by a receiver as described with reference to FIGS. 16 through 18.

At 2410, the first device may identify one or more interfering signals affecting at least one of the first antenna array or a second antenna array of the repeating device. The operations of 2410 may be performed according to the methods described herein. In some examples, aspects of the operations of 2410 may be performed by an interference manager as described with reference to FIGS. 17 and 18.

At 2415, the first device may determine that a difference between the first carrier frequency and the second carrier frequency satisfies a first threshold. The operations of 2415 may be performed according to the methods described herein. In some examples, aspects of the operations of 2415 may be performed by a frequency translation manager as described with reference to FIGS. 17 and 18.

At 2420, the first device may apply a phase rotation adjustment to the received signal based on a frequency translation of the received signal, the phase rotation adjustment corresponding to a second carrier frequency. The operations of 2420 may be performed according to the methods described herein. In some examples, aspects of the operations of 2420 may be performed by a phase rotation manager as described with reference to FIGS. 17 and 18.

At 2425, the first device may perform analog heterodyning of the received signal from the first carrier frequency to the second carrier frequency based on the determination. The operations of 2425 may be performed according to the methods described herein. In some examples, aspects of the operations of 2425 may be performed by a frequency translation manager as described with reference to FIGS. 17 and 18.

At 2430, the first device may transmit, using the second antenna array, the translated signal including the phase rotation adjustment to a third device in the wireless network, the translated signal being transmitted at the second carrier frequency. The operations of 2430 may be performed according to the methods described herein. In some examples, aspects of the operations of 2430 may be performed by a transmit antenna array as described with reference to FIGS. 7 through 13 and 16. Similarly, aspects of the operations of 2430 may be performed by a transmitter as described with reference to FIGS. 16 through 18.

Figure 25:
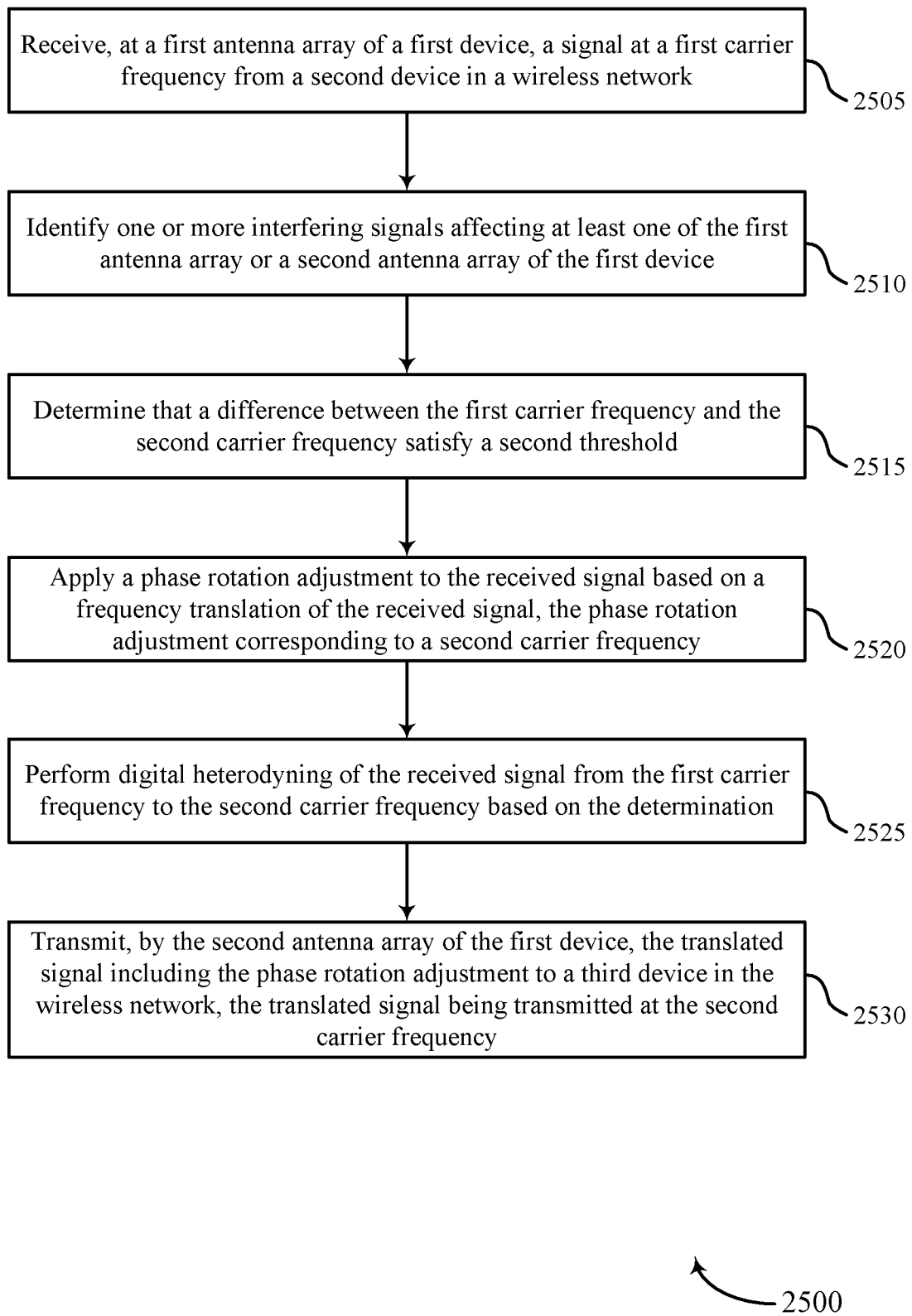

FIG. 25 shows a flowchart illustrating a method 2500 that supports analog phased-array repeaters with digitally-assisted frequency translation and phase adjustment in accordance with one or more aspects of the present disclosure. The operations of method 2500 may be implemented by a first device (e.g., a repeating device, a repeater 140, a repeater 215, a wireless repeater, a mmW repeater, etc.) or its components as described herein. For example, the operations of method 2500 may be performed by a signal processing chain as described with reference to FIGS. 8 through 15, 17, and 18. In some examples, a repeater may execute a set of instructions to control the functional elements of the repeater to perform the functions described herein. Additionally or alternatively, a repeater may perform aspects of the functions described herein using special-purpose hardware.

At 2505, the first device may receive, at a first antenna array, a signal at a first carrier frequency from a second device in a wireless network. The operations of 2505 may be performed according to the methods described herein. In some examples, aspects of the operations of 2505 may be performed by a receive antenna array as described with reference to FIGS. 7 through 13 and 16. Additionally or alternatively, aspects of the operations of 2505 may be performed by a receiver as described with reference to FIGS. 16 through 18.

At 2510, the first device may identify one or more interfering signals affecting at least one of the first antenna array or a second antenna array of the first device. The operations of 2510 may be performed according to the methods described herein. In some examples, aspects of the operations of 2510 may be performed by an interference manager as described with reference to FIGS. 17 and 18.

At 2515, the first device may determine that a difference between the first carrier frequency and the second carrier frequency satisfies a second threshold. The operations of 2515 may be performed according to the methods described herein. In some examples, aspects of the operations of 2515 may be performed by a frequency translation manager as described with reference to FIGS. 17 and 18.

At 2520, the first device may apply a phase rotation adjustment to the received signal based on a frequency translation of the received signal, the phase rotation adjustment corresponding to a second carrier frequency. The operations of 2520 may be performed according to the methods described herein. In some examples, aspects of the operations of 2520 may be performed by a phase rotation manager as described with reference to FIGS. 17 and 18.

At 2525, the first device may perform digital heterodyning of the received signal from the first carrier frequency to the second carrier frequency based on the determination. The operations of 2525 may be performed according to the methods described herein. In some examples, aspects of the operations of 2525 may be performed by a frequency translation manager as described with reference to FIGS. 17 and 18.

At 2530, the first device may transmit, by the second antenna array, the translated signal including the phase rotation adjustment to a third device in the wireless network, the translated signal being transmitted at the second carrier frequency. The operations of 2530 may be performed according to the methods described herein. In some examples, aspects of the operations of 2530 may be performed by a transmit antenna array as described with reference to FIGS. 7 through 13 and 16. additionally or alternatively, aspects of the operations of 2530 may be performed by a transmitter as described with reference to FIGS. 16 through 18.

Figure 26:
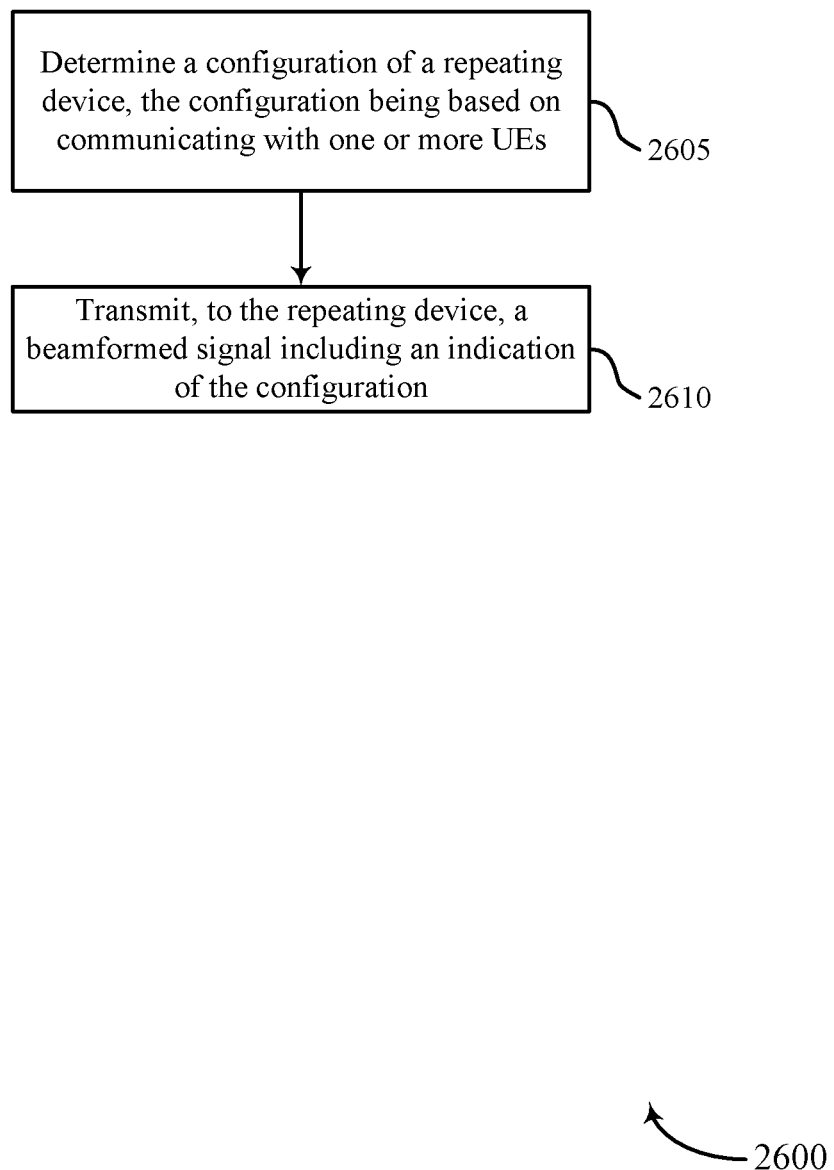

FIG. 26 shows a flowchart illustrating a method 2600 that supports analog phased-array repeaters with digitally-assisted frequency translation and phase adjustment in accordance with one or more aspects of the present disclosure. The operations of method 2600 may be implemented by a base station 105 or its components as described herein. For example, the operations of method 2600 may be performed by a communications manager as described with reference to FIGS. 19 through 22. In some examples, a base station may execute a set of instructions to control the functional elements of the base station to perform the functions described herein. Additionally or alternatively, a base station may perform aspects of the functions described herein using special-purpose hardware.

At 2605, the base station may determine a configuration of a repeating device, the configuration being based on communicating with one or more UEs 115. The operations of 2605 may be performed according to the methods described herein. In some examples, aspects of the operations of 2605 may be performed by a configuration component as described with reference to FIGS. 19 through 22.

At 2610, the base station may transmit, to the repeating device, a beamformed signal including an indication of the configuration. The operations of 2610 may be performed according to the methods described herein. In some examples, aspects of the operations of 2610 may be performed by a transmission manager as described with reference to FIGS. 19 through 22.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1

A method for wireless communications, comprising: receiving, at a first antenna array of a repeating device, a signal at a first carrier frequency from a first device in a wireless network; identifying one or more interfering signals affecting at least one of the first antenna array or a second antenna array of the repeating device; performing a frequency translation of the received signal from the first carrier frequency to a second carrier frequency based at least in part on the one or more interfering signals; and transmitting, by the second antenna array of the repeating device, the translated signal to a second device in the wireless network, the translated signal being transmitted at the second carrier frequency.

Example 2

The method of claim 1, wherein performing the frequency translation comprises determining that a difference between the first carrier frequency and the second carrier frequency satisfies a first threshold; and performing analog heterodyning of the received signal from the first carrier frequency to the second carrier frequency based at least in part on the determination.

Example 3

The method of any one of examples 1 and 2, wherein the first carrier frequency is associated with a first radio frequency spectrum band and the second carrier frequency is associated with a second radio frequency spectrum band different from the first radio frequency spectrum band.

Example 4

The method of any one of examples 1 through 3, further comprising applying a phase rotation adjustment to the received signal based at least in part on the frequency translation of the received signal, the phase rotation adjustment corresponding to the second carrier frequency, wherein the translated signal comprises the phase rotation adjustment.

Example 5

The method of any one of examples 1 through 4, further comprising receiving, at the first antenna array, control information comprising a configuration for the repeating device, wherein one or more of the frequency translation or the phase rotation adjustment is based at least in part on the configuration.

Example 6

The method of any one of examples 1 through 5, wherein the configuration comprises an indication of one or more transmission directions, one or more gains, a beam width for one or more transmission beams, a beam width for one or more receive beams, or a combination thereof.

Example 7

The method of any one of examples 1 through 6, further comprising demodulating the received signal; identifying one or more reference signals, one or more synchronization signal blocks, or a combination thereof, based at least in part on the demodulated signal; and performing carrier frequency tracking based at least in part on the one or more reference signals, the one or more synchronization signal blocks, or a combination thereof, wherein the phase rotation adjustment is applied based at least in part on the carrier frequency tracking.

Example 8

The method of any one of examples 1 through 7, further comprising acquiring symbol timing information for each of one or more symbol periods of the received signal, wherein the phase rotation adjustment is applied to the one or more symbol periods based at least in part on the symbol timing information.

Example 9

The method of any one of examples 1 through 8, further comprising receiving control information for the repeating device via a secondary link with another device, the secondary link being different from a link associated with the first antenna array; identifying a clock signal associated with the secondary link; and performing the carrier frequency tracking based at least in part on the identified clock signal.

Example 10

The method of any one of examples 1 through 9, wherein the carrier frequency tracking is performed using one or more phase-locked loop circuits.

Example 11

The method of any one of examples 1 through 10, wherein a first phase-locked loop circuit of the one or more phase-locked loop circuits operates at a frequency comprising a difference between the first carrier frequency and the second carrier frequency; and a second phase-locked loop circuit of the one or more phase-locked loop circuits operates at the first carrier frequency.

Example 12

The method of any one of examples 1 through 11, further comprising selecting the second carrier frequency based at least in part on a first voltage control oscillator of a first phase-locked loop circuit and second voltage control oscillator of a second phase-locked loop circuit, wherein the second carrier frequency is selected to avoid interference between the first voltage control oscillator and the second voltage control oscillator.

Example 13

The method of any one of examples 1 through 10, further comprising converting the received signal from an analog signal to a digital signal, wherein applying the phase rotation adjustment comprises applying the phase rotation adjustment to the digital signal based at least in part on the second carrier frequency.

Example 14

The method of any one of examples 1 through 13, wherein the phase rotation adjustment is based at least in part on an equation comprising $e^{-j2\pi f_n t_{start,l}^\mu + N_{CP,l}^\mu T_c}$, wherein $t_{start,l}^\mu$ comprises a starting position of a symbol 1 for a subcarrier spacing configuration $\mu$ in a subframe; $N_{CP,l}^\mu$ comprises a cyclic prefix length in samples for the symbol 1; and $T_c$ comprises a sampling interval in a baseband.

Example 15

The method of any one of examples 1 through 14, further comprising determining a first antenna gain associated with the first antenna array; determining a second antenna gain associated with the second antenna array; and performing digital gain control for the first antenna array, the second antenna array, or a combination thereof, based at least in part on the first antenna gain and the second antenna gain.

Example 16

The method of any one of examples 1 through 15, wherein demodulating the received signal comprises performing a channel estimation and equalization on the received signal.

Example 17

The method of any one of examples 1 through 16, further comprising downconverting the received signal to a baseband signal; identifying a first analog filter for the received signal; and filtering the received signal using the first analog filter based at least in part on the one or more interfering signals.

Example 18

The method of any one of examples 1 through 17, wherein the first analog filter comprises one or more of a microwave filter, an intermediate frequency filter, a surface acoustic wave filter, a bulk acoustic wave filter, or a film bulk acoustic resonator filter.

Example 19

The method of any one of examples 1 through 18, further comprising identifying a second analog filter for the received signal, the second analog filter comprising one or more of an intermediate frequency filter, a surface acoustic wave filter, a bulk acoustic wave filter, or a film bulk acoustic resonator filter; and filtering, during the downconverting, the received signal using the second analog filter based at least in part on the one or more interfering signals.

Example 20

The method of any one of examples 1 and 4 through 19, further comprising converting the received signal to a digital signal; and filtering the digital signal based at least in part on the one or more interfering signals.

Example 21

The method of any one of examples 1 and 4 through 20, wherein performing the frequency translation of the received signal comprises digitally heterodyning the digital signal from the first carrier frequency to the second carrier frequency.

Example 22

The method of any one of examples 1 through 21, wherein transmitting the translated signal comprises upconverting the received signal from baseband using a zero intermediate frequency architecture, low-intermediate frequency architecture, or a super-heterodyne architecture.

Example 23

The method of any one of examples 1 through 22, further comprising downconverting the received signal to an intermediate frequency signal; and filtering the intermediate frequency signal using an analog filter, a surface acoustic wave filter, a bulk acoustic wave filter, a film bulk acoustic wave resonator filter, a digital filter, or a combinations thereof.

Example 24

The method of any one of examples 1 through 23, wherein the received signal is downconverted using a zero intermediate frequency architecture, low-intermediate frequency architecture, or a super-heterodyne architecture.

Example 25

The method of any one of examples 1 through 24, wherein transmitting the translated signal comprises transmitting the translated signal as a beamformed signal based at least in part on analog beamforming, digital beamforming, or a combination thereof, wherein one or more of the first antenna array or the second antenna array comprise a phased antenna array.

Example 26

The method of any one of examples 1 and 4 through 25, further comprising determining that a difference between the first carrier frequency and the second carrier frequency satisfies a second threshold; and performing digital heterodyning of the received signal from the first carrier frequency to the second carrier frequency based at least in part on the determination.

Example 27

The method of any one of examples 1 and 4 through 26, wherein the first carrier frequency and the second carrier frequency are associated with a same radio frequency spectrum band.

Example 28

An apparatus for wireless communication comprising at least one means for performing a method of any one of examples 1 through 27.

Example 29

An apparatus for wireless communication comprising a processor, memory in electronic communication with the processor, and instructions stored in the memory and executable by the processor to cause the apparatus to perform a method of any one of examples 1 through 27.

Example 30

A non-transitory computer-readable medium storing code for wireless communication comprising a processor, memory in electronic communication with the processor, and instructions stored in the memory and executable by the processor to cause the apparatus to perform a method of any one of examples 1 through 27.

Example 31

A method for wireless communications at a base station, comprising: determining a configuration of a repeating device, the configuration being based at least in part on communicating with one or more UEs; and transmitting, to the repeating device, a beamformed signal comprising an indication of the configuration.

Example 32

The method of example 31, wherein the beamformed signal comprises control information indicating the configuration.

Example 33

The method of any one of examples 31 and 32, wherein the configuration comprises one or more transmission directions, one or more gains, a beam width for one or more transmission beams, a beam width for one or more receive beams, or a combination thereof.

Example 34

An apparatus for wireless communication comprising at least one means for performing a method of any one of examples 31 through 33.

Example 35

An apparatus for wireless communication comprising a processor, memory in electronic communication with the processor, and instructions stored in the memory and executable by the processor to cause the apparatus to perform a method of any one of examples 31 through 33.

Example 36

A non-transitory computer-readable medium storing code for wireless communication comprising a processor, memory in electronic communication with the processor, and instructions stored in the memory and executable by the processor to cause the apparatus to perform a method of any one of examples 31 through 33.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a first antenna array of a first device, a signal at a first carrier frequency from a second device in a wireless network;
   performing a frequency translation of the received signal from the first carrier frequency to a second carrier frequency based at least in part on one or more interfering signals, the one or more interfering signals affecting at least one of the first antenna array or a second antenna array of the first device, and wherein the frequency translation is based at least in part on a difference between the first carrier frequency and the second carrier frequency satisfying a threshold; and
   transmitting, by the second antenna array of the first device, the translated signal to a third device in the wireless network, the translated signal being transmitted at the second carrier frequency.

2. The method of claim 1, wherein performing the frequency translation comprises:
   performing analog heterodyning of the received signal from the first carrier frequency to the second carrier frequency based at least in part on the difference between the first carrier frequency and the second carrier frequency satisfying a first threshold, wherein the threshold is the first threshold.

3. The method of claim 2, wherein the first carrier frequency is associated with a first radio frequency spectrum band and the second carrier frequency is associated with a second radio frequency spectrum band different from the first radio frequency spectrum band.

4. The method of claim 1, further comprising:
   applying a phase rotation adjustment to the received signal based at least in part on the frequency translation of the received signal, the phase rotation adjustment corresponding to the second carrier frequency, wherein the translated signal comprises the phase rotation adjustment.

5. The method of claim 4, further comprising:
   receiving, at the first antenna array, control information comprising a configuration for the first device, wherein one or more of the frequency translation or the phase rotation adjustment is based at least in part on the configuration.

6. The method of claim 5, wherein the configuration comprises an indication of one or more transmission directions, one or more gains, a beam width for one or more transmission beams, a beam width for one or more receive beams, or a combination thereof.

7. The method of claim 4, further comprising:
   demodulating the received signal;
   identifying one or more reference signals, one or more synchronization signal blocks, or a combination thereof, based at least in part on the demodulated signal; and
   performing carrier frequency tracking based at least in part on the one or more reference signals, the one or more synchronization signal blocks, or a combination thereof, wherein the phase rotation adjustment is applied based at least in part on the carrier frequency tracking.

8. The method of claim 7, further comprising:
   acquiring symbol timing information for each of one or more symbol periods of the received signal, wherein the phase rotation adjustment is applied to the one or more symbol periods based at least in part on the symbol timing information.

9. The method of claim 7, further comprising:
   receiving control information for the first device via a secondary link with another device, the secondary link being different from a link associated with the first antenna array;
   identifying a clock signal associated with the secondary link; and
   performing the carrier frequency tracking based at least in part on the identified clock signal.

10. The method of claim 7, wherein the carrier frequency tracking is performed using one or more phase-locked loop circuits.

11. The method of claim 7, wherein demodulating the received signal comprises:
    performing a channel estimation and equalization on the received signal.

12. The method of claim 4, further comprising:
    converting the received signal from an analog signal to a digital signal, wherein applying the phase rotation adjustment comprises:
    applying the phase rotation adjustment to the digital signal based at least in part on the second carrier frequency.

13. The method of claim 4, wherein the phase rotation adjustment is based at least in part on an equation comprising $e^{-j2\pi f_n t_{start,l}^{\mu} + N_{CP,l}^{\mu} T_c}$, wherein:
    $t_{start,l}^{\mu}$ comprises a starting position of a symbol l for a subcarrier spacing configuration $\mu$ in a subframe;
    $N_{CP,l}^{\mu}$ comprises a cyclic prefix length in samples for the symbol l; and
    $T_c$ comprises a sampling interval in a baseband.

14. The method of claim 4, further comprising:
    determining a first antenna gain associated with the first antenna array;
    determining a second antenna gain associated with the second antenna array; and
    performing digital gain control for the first antenna array, the second antenna array, or a combination thereof, based at least in part on the first antenna gain and the second antenna gain.

15. The method of claim 1, further comprising:
    downconverting the received signal to a baseband signal;
    identifying a first analog filter for the received signal; and
    filtering the received signal using the first analog filter based at least in part on the one or more interfering signals.

16. The method of claim 15, wherein the first analog filter comprises one or more of a microwave filter, an intermediate frequency filter, a surface acoustic wave filter, a bulk acoustic wave filter, or a film bulk acoustic resonator filter.

17. The method of claim 15, further comprising:
    identifying a second analog filter for the received signal, the second analog filter comprising one or more of an intermediate frequency filter, a surface acoustic wave filter, a bulk acoustic wave filter, or a film bulk acoustic resonator filter; and
    filtering, during the downconverting, the received signal using the second analog filter based at least in part on the one or more interfering signals.

18. The method of claim 17, further comprising:
    converting the received signal to a digital signal; and
    filtering the digital signal based at least in part on the one or more interfering signals.

19. The method of claim 18, wherein performing the frequency translation of the received signal comprises:
    digitally heterodyning the digital signal from the first carrier frequency to the second carrier frequency.

20. The method of claim 1, wherein transmitting the translated signal comprises:
upconverting the received signal from baseband using a zero intermediate frequency architecture, low-intermediate frequency architecture, or a super-heterodyne architecture.

21. The method of claim 1, further comprising:
downconverting the received signal to an intermediate frequency signal; and
filtering the intermediate frequency signal using an analog filter, a surface acoustic wave filter, a bulk acoustic wave filter, a film bulk acoustic wave resonator filter, a digital filter, or a combinations thereof.

22. The method of claim 21, wherein the received signal is downconverted using a zero intermediate frequency architecture, low-intermediate frequency architecture, or a super-heterodyne architecture.

23. The method of claim 1, wherein transmitting the translated signal comprises:
transmitting the translated signal as a beamformed signal based at least in part on analog beamforming, wherein one or more of the first antenna array or the second antenna array comprise a phased antenna array.

24. The method of claim 1, wherein performing the frequency translation comprises:
performing digital heterodyning of the received signal from the first carrier frequency to the second carrier frequency based at least in part on the difference between the first carrier frequency and the second carrier frequency satisfying a second threshold, wherein the threshold is the second threshold.

25. The method of claim 24, wherein the first carrier frequency and the second carrier frequency are associated with a same radio frequency spectrum band.

26. An apparatus for wireless communications, comprising:
at least one processor; and
at least one memory coupled with the at least one processor, the at least one processor configured to:
receive, at a first antenna array of a first device, a signal at a first carrier frequency from a second device in a wireless network;
perform a frequency translation of the received signal from the first carrier frequency to a second carrier frequency based at least in part on one or more interfering signals, the one or more interfering signals affecting at least one of the first antenna array or a second antenna array of the first device, and wherein the frequency translation is based at least in part on a difference between the first carrier frequency and the second carrier frequency satisfying a threshold; and
transmit, by the second antenna array of the first device, the translated signal to a third device in the wireless network, the translated signal being transmitted at the second carrier frequency.

27. The method of claim 1, wherein transmitting the translated signal comprises:
transmitting the translated signal as a beamformed signal based at least in part on digital beamforming, wherein one or more of the first antenna array or the second antenna array comprise a phased antenna array.

28. The apparatus of claim 26, the apparatus further comprising:
one or more circuits configured to perform analog heterodyning of the received signal from the first carrier frequency to the second carrier frequency based at least in part on the difference between the first carrier frequency and the second carrier frequency satisfying a first threshold, wherein the threshold is the first threshold.

29. The apparatus of claim 26, wherein the at least one processor is further configured to:
apply a phase rotation adjustment to the received signal based at least in part on the frequency translation of the received signal, the phase rotation adjustment corresponding to the second carrier frequency, wherein the translated signal comprises the phase rotation adjustment.

30. The apparatus of claim 29, wherein the at least one processor is further configured to:
receive, at the first antenna array, control information comprising a configuration for the first device, wherein one or more of the frequency translation or the phase rotation adjustment is based at least in part on the configuration.

31. The apparatus of claim 29, wherein the at least one processor is further configured to:
demodulate the received signal;
identify one or more reference signals, one or more synchronization signal blocks, or a combination thereof, based at least in part on the demodulated signal; and
perform carrier frequency tracking based at least in part on the one or more reference signals, the one or more synchronization signal blocks, or a combination thereof, wherein the phase rotation adjustment is applied based at least in part on the carrier frequency tracking.

32. The apparatus of claim 31, wherein the at least one processor is further configured to:
acquire symbol timing information for each of one or more symbol periods of the received signal, wherein the phase rotation adjustment is applied to the one or more symbol periods based at least in part on the symbol timing information.

33. The apparatus of claim 31, wherein the at least one processor is further configured to:
receive control information for the first device via a secondary link with another device, the secondary link being different from a link associated with the first antenna array;
identify a clock signal associated with the secondary link; and
perform the carrier frequency tracking based at least in part on the identified clock signal.

34. The apparatus of claim 29, wherein the at least one processor is further configured to:
convert the received signal from an analog signal to a digital signal, and wherein to apply the phase rotation adjustment, the at least one processor is configured to:
apply the phase rotation adjustment to the digital signal based at least in part on the second carrier frequency.

35. The apparatus of claim 29, wherein the phase rotation adjustment is based at least in part on an equation comprising $e^{-j2\pi f_n t_{start,l}^{\mu} + N_{CP,l}^{\mu} T_c}$, wherein:
$t_{start,l}^{\mu}$ comprises a starting position of a symbol l for a subcarrier spacing configuration μ in a subframe;
$N_{CP,l}^{\mu}$ comprises a cyclic prefix length in samples for the symbol l; and
$T_c$ comprises a sampling interval in a baseband.

36. The apparatus of claim 29, wherein the at least one processor is further configured to:

determine a first antenna gain associated with the first antenna array;
determine a second antenna gain associated with the second antenna array; and
perform digital gain control for the first antenna array, the second antenna array, or a combination thereof, based at least in part on the first antenna gain and the second antenna gain.

37. The apparatus of claim 26, wherein the at least one processor is further configured to:
downconvert the received signal to a baseband signal;
identify a first analog filter for the received signal; and
filter the received signal using the first analog filter based at least in part on the one or more interfering signals.

38. The apparatus of claim 26, wherein the at least one processor is further configured to:
upconvert the received signal from baseband using a zero intermediate frequency architecture, low-intermediate frequency architecture, or a super-heterodyne architecture.

39. The apparatus of claim 26, wherein the at least one processor is further configured to:
downconvert the received signal to an intermediate frequency signal; and
filter the intermediate frequency signal using an analog filter, a surface acoustic wave filter, a bulk acoustic wave filter, a film bulk acoustic wave resonator filter, a digital filter, or a combinations thereof.

40. The apparatus of claim 26, wherein, to transmit the translated signal, the at least one processor is configured to:
transmit the translated signal as a beamformed signal based at least in part on analog beamforming, wherein one or more of the first antenna array or the second antenna array comprise a phased antenna array.

41. The apparatus of claim 26, wherein, to transmit the translated signal, the at least one processor is configured to:
transmit the translated signal as a beamformed signal based at least in part on digital beamforming, wherein one or more of the first antenna array or the second antenna array comprise a phased antenna array.

42. The apparatus of claim 26, the apparatus further comprising:
one or more circuits configured to perform digital heterodyning of the received signal from the first carrier frequency to the second carrier frequency based at least in part on the difference between the first carrier frequency and the second carrier frequency satisfying a second threshold, wherein the threshold is the second threshold.

43. A non-transitory computer-readable medium storing code for wireless communications, the code comprising instructions executable by at least one processor to:
receive, at a first antenna array of a first device, a signal at a first carrier frequency from a second device in a wireless network;
perform a frequency translation of the received signal from the first carrier frequency to a second carrier frequency based at least in part on a one or more interfering signals, the one or more interfering signals affecting at least one of the first antenna array or a second antenna array of the first device, and wherein the frequency translation is based at least in part on a difference between the first carrier frequency and the second carrier frequency satisfying a threshold; and transmit, by the second antenna array of the first device, the translated signal to a third device in the wireless network, the translated signal being transmitted at the second carrier frequency.

44. The non-transitory computer-readable medium of claim 43, wherein, the instructions to perform the frequency translation are executable by the at least one processor to:
perform analog heterodyning of the received signal from the first carrier frequency to the second carrier frequency based at least in part on the difference between the first carrier frequency and the second carrier frequency satisfying a first threshold, wherein the threshold is the first threshold.

45. The non-transitory computer-readable medium of claim 43, wherein the instructions are further executable by the at least one processor to:
apply a phase rotation adjustment to the received signal based at least in part on the frequency translation of the received signal, the phase rotation adjustment corresponding to the second carrier frequency, wherein the translated signal comprises the phase rotation adjustment.

46. The non-transitory computer-readable medium of claim 45, wherein the instructions are further executable by the at least one processor to:
receive, at the first antenna array, control information comprising a configuration for the first device, wherein one or more of the frequency translation or the phase rotation adjustment is based at least in part on the configuration.

47. The non-transitory computer-readable medium of claim 45, wherein the instructions are further executable by the at least one processor to:
demodulate the received signal;
identify one or more reference signals, one or more synchronization signal blocks, or a combination thereof, based at least in part on the demodulated signal; and
perform carrier frequency tracking based at least in part on the one or more reference signals, the one or more synchronization signal blocks, or a combination thereof, wherein the phase rotation adjustment is applied based at least in part on the carrier frequency tracking.

48. The non-transitory computer-readable medium of claim 47, wherein the instructions are further executable by the at least one processor to:
acquire symbol timing information for each of one or more symbol periods of the received signal, wherein the phase rotation adjustment is applied to the one or more symbol periods based at least in part on the symbol timing information.

49. The non-transitory computer-readable medium of claim 47, wherein the instructions are further executable by the at least one processor to:
receive control information for the first device via a secondary link with another device, the secondary link being different from a link associated with the first antenna array;
identify a clock signal associated with the secondary link; and
perform the carrier frequency tracking based at least in part on the identified clock signal.

50. The non-transitory computer-readable medium of claim 45, wherein the instructions are further executable by the at least one processor to:

convert the received signal from an analog signal to a digital signal, and wherein to apply the phase rotation adjustment, the instructions are further executable by the at least one processor to:
apply the phase rotation adjustment to the digital signal based at least in part on the second carrier frequency.

51. The non-transitory computer-readable medium of claim 45, wherein the phase rotation adjustment is based at least in part on an equation comprising $e^{-j2\pi f_n t_{start,l}^\mu + N_{CP,l}^\mu T_c}$, wherein:
$t_{start,l}^\mu$ comprises a starting position of a symbol l for a subcarrier spacing configuration μ in a subframe;
$N_{CP,l}^\mu$ comprises a cyclic prefix length in samples for the symbol l; and
$T_c$ comprises a sampling interval in a baseband.

52. The non-transitory computer-readable medium of claim 45, wherein the instructions are further executable by the at least one processor to:
determine a first antenna gain associated with the first antenna array;
determine a second antenna gain associated with the second antenna array; and
perform digital gain control for the first antenna array, the second antenna array, or a combination thereof, based at least in part on the first antenna gain and the second antenna gain.

53. The non-transitory computer-readable medium of claim 43, wherein the instructions are further executable by the at least one processor to:
downconvert the received signal to a baseband signal;
identify a first analog filter for the received signal; and
filter the received signal using the first analog filter based at least in part on the one or more interfering signals.

54. The non-transitory computer-readable medium of claim 43, wherein the instructions are further executable by the at least one processor to:
upconvert the received signal from baseband using a zero intermediate frequency architecture, low-intermediate frequency architecture, or a super-heterodyne architecture.

55. The non-transitory computer-readable medium of claim 43, wherein the instructions are further executable by the at least one processor to:
downconvert the received signal to an intermediate frequency signal; and
filter the intermediate frequency signal using an analog filter, a surface acoustic wave filter, a bulk acoustic wave filter, a film bulk acoustic wave resonator filter, a digital filter, or a combinations thereof.

56. The non-transitory computer-readable medium of claim 43, wherein the instructions to transmit the translated signal are further executable by the at least one processor to:
transmit the translated signal as a beamformed signal based at least in part on analog beamforming, wherein one or more of the first antenna array or the second antenna array comprise a phased antenna array.

57. The non-transitory computer-readable medium of claim 43, wherein the instructions to transmit the translated signal are further executable by the at least one processor to:
transmit the translated signal as a beamformed signal based at least in part on digital beamforming, wherein one or more of the first antenna array or the second antenna array comprise a phased antenna array.

58. The non-transitory computer-readable medium of claim 43, wherein the instructions to perform the frequency translation are executable by the at least one processor to:
perform digital heterodyning of the received signal from the first carrier frequency to the second carrier frequency based at least in part on the difference between the first carrier frequency and the second carrier frequency satisfying a second threshold, wherein the threshold is the second threshold.

59. An apparatus for wireless communications, comprising:
means for receiving a signal at a first carrier frequency from a second device in a wireless network;
means for performing a frequency translation of the received signal from the first carrier frequency to a second carrier frequency based at least in part on one or more interfering signals, the one or more interfering signals affecting at least one antenna array of the first device, and wherein the frequency translation is based at least in part on a difference between the first carrier frequency and the second carrier frequency satisfying a threshold; and
means for transmitting the translated signal to a third device in the wireless network, the translated signal being transmitted at the second carrier frequency.

60. The apparatus of claim 59, further comprising:
means for performing analog heterodyning of the received signal from the first carrier frequency to the second carrier frequency based at least in part on the difference between the first carrier frequency and the second carrier frequency satisfying a first threshold, wherein the threshold is the first threshold.

61. The apparatus of claim 59, further comprising:
means for applying a phase rotation adjustment to the received signal based at least in part on the frequency translation of the received signal, the phase rotation adjustment corresponding to the second carrier frequency, wherein the translated signal comprises the phase rotation adjustment.

62. The apparatus of claim 61, further comprising:
means for receiving control information comprising a configuration for the first device, wherein one or more of the frequency translation or the phase rotation adjustment is based at least in part on the configuration.

63. The apparatus of claim 61, further comprising:
means for demodulating the received signal;
means for identifying one or more reference signals, one or more synchronization signal blocks, or a combination thereof, based at least in part on the demodulated signal; and
means for performing carrier frequency tracking based at least in part on the one or more reference signals, the one or more synchronization signal blocks, or a combination thereof, wherein the phase rotation adjustment is applied based at least in part on the carrier frequency tracking.

64. The apparatus of claim 63, further comprising:
means for acquiring symbol timing information for each of one or more symbol periods of the received signal, wherein the phase rotation adjustment is applied to the one or more symbol periods based at least in part on the symbol timing information.

65. The apparatus of claim 63, further comprising:
means for receiving control information for the first device via a secondary link with another device;
means for identifying a clock signal associated with the secondary link; and
means for performing the carrier frequency tracking based at least in part on the identified clock signal.

66. The apparatus of claim 61, further comprising:
means for converting the received signal from an analog signal to a digital signal, and wherein the means for applying the phase rotation adjustment further comprise:
means for applying the phase rotation adjustment to the digital signal based at least in part on the second carrier frequency.

67. The apparatus of claim 61, wherein the phase rotation adjustment is based at least in part on an equation comprising $e^{-j2\pi f_n t_{start,l}^{\mu} + N_{CP,l}^{\mu} T_c}$, wherein:
$t_{start,l}^{\mu}$ comprises a starting position of a symbol l for a subcarrier spacing configuration µ in a subframe;
$N_{CP,l}^{\mu}$ comprises a cyclic prefix length in samples for the symbol l; and
$T_c$ comprises a sampling interval in a baseband.

68. The apparatus of claim 61, further comprising:
means for determining a first antenna gain associated with a first antenna array of the first device;
means for determining a second antenna gain associated with a second antenna array of the first device; and
means for performing digital gain control for the first antenna array, the second antenna array, or a combination thereof, based at least in part on the first antenna gain and the second antenna gain.

69. The apparatus of claim 59, further comprising:
means for downconverting the received signal to a baseband signal;
means for identifying a first analog filter for the received signal; and
means for filtering the received signal using the first analog filter based at least in part on the one or more interfering signals.

70. The apparatus of claim 59, further comprising:
means for upconverting the received signal from baseband using a zero intermediate frequency architecture, low-intermediate frequency architecture, or a super-heterodyne architecture.

71. The apparatus of claim 59, further comprising:
means for downconverting the received signal to an intermediate frequency signal; and
means for filtering the intermediate frequency signal using an analog filter, a surface acoustic wave filter, a bulk acoustic wave filter, a film bulk acoustic wave resonator filter, a digital filter, or a combinations thereof.

72. The apparatus of claim 59, further comprising:
means for transmitting the translated signal as a beamformed signal based at least in part on analog beamforming, wherein one or more of the at least one antenna array comprises a phased antenna array.

73. The apparatus of claim 59, further comprising:
means for transmitting the translated signal as a beamformed signal based at least in part on digital beamforming, wherein one or more of the at least one antenna array comprises a phased antenna array.

74. The apparatus of claim 59, further comprising:
means for performing digital heterodyning of the received signal from the first carrier frequency to the second carrier frequency based at least in part on the difference between the first carrier frequency and the second carrier frequency satisfying a second threshold, wherein the threshold is the second threshold.

* * * * *